(12) United States Patent
Nguyen et al.

(10) Patent No.: US 12,517,770 B1
(45) Date of Patent: Jan. 6, 2026

(54) SYSTEM AND METHOD FOR MONITORING AND MANAGING COMPUTERIZED RESOURCES IN A COMPUTER CLUSTER ENVIRONMENT

(71) Applicant: Morgan Stanley Services Group Inc., New York, NY (US)

(72) Inventors: My Thi Thien Nguyen, Menlo Park, CA (US); Tracy White, Alpharetta, GA (US); Paul Waters, Chicago, IL (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/212,942

(22) Filed: May 20, 2025

(51) Int. Cl.
  *G06F 9/50* (2006.01)
  *G06F 8/60* (2018.01)

(52) U.S. Cl.
  CPC .............. *G06F 9/5083* (2013.01); *G06F 8/60* (2013.01); *G06F 9/5038* (2013.01)

(58) Field of Classification Search
  CPC ......... G06F 9/5083; G06F 8/60; G06F 9/5038
  See application file for complete search history.

(56) References Cited

U.S. PATENT DOCUMENTS

| | | |
|---|---|---|
| 6,363,497 B1 | 3/2002 | Chabaszcz |
| 9,983,860 B1 | 5/2018 | Koty et al. |
| 10,708,135 B1 | 7/2020 | Elliot, IV |
| 11,086,701 B2 | 8/2021 | Gonczi et al. |
| 11,622,591 B2 | 4/2023 | Reiter |
| 11,676,158 B2 | 6/2023 | Kurian et al. |
| 11,693,857 B1 | 7/2023 | Jindal et al. |
| 11,962,620 B2 | 4/2024 | Parekh et al. |
| 12,003,365 B1 | 6/2024 | Willett et al. |
| 12,028,212 B1 | 7/2024 | Vaughan et al. |
| 2015/0019479 A1* | 1/2015 | Buehne ................. G06F 16/214 707/609 |
| 2019/0273655 A1 | 9/2019 | Jones et al. |
| 2020/0097325 A1* | 3/2020 | Vadapandeshwara ....................... G06F 3/0683 |
| 2020/0241563 A1 | 7/2020 | Duvur et al. |
| 2021/0034432 A1 | 2/2021 | Pabari |
| 2022/0029887 A1 | 1/2022 | Gupta et al. |
| 2022/0207061 A1* | 6/2022 | Failer ................. G06F 16/2282 |
| 2023/0056223 A1 | 2/2023 | Kumar |

(Continued)

*Primary Examiner* — Sisley N Kim
(74) *Attorney, Agent, or Firm* — PEARL COHEN ZEDEK LATZER BARATZ LLP

(57) ABSTRACT

A system and method for managing computerized resources, including: associating a first server instance with a plurality of keys defining: a stage within a software development lifecycle, application information, a middleware type, and an operational capability (where each of the plurality of keys refers to a corresponding database); determining application dependencies and/or database dependencies based on one or more of the plurality of keys; and executing computer tasks within a computer cluster based on the determined dependencies, where the computer cluster includes the first server instance associated with the keys. Some embodiments may provide a user interface (UI) to display real time information describing tasks running on the computer cluster. Computer tasks executed according to some embodiments may be included in a deployment process of a software application, where the deployment process includes a plurality of task orchestration tools.

17 Claims, 58 Drawing Sheets

(56) References Cited

U.S. PATENT DOCUMENTS

2024/0179049 A1    5/2024  Sheppard et al.
2024/0192946 A1    6/2024  Vijaywargiya et al.
2024/0403301 A1*  12/2024  Failer .................... G06F 16/287

* cited by examiner

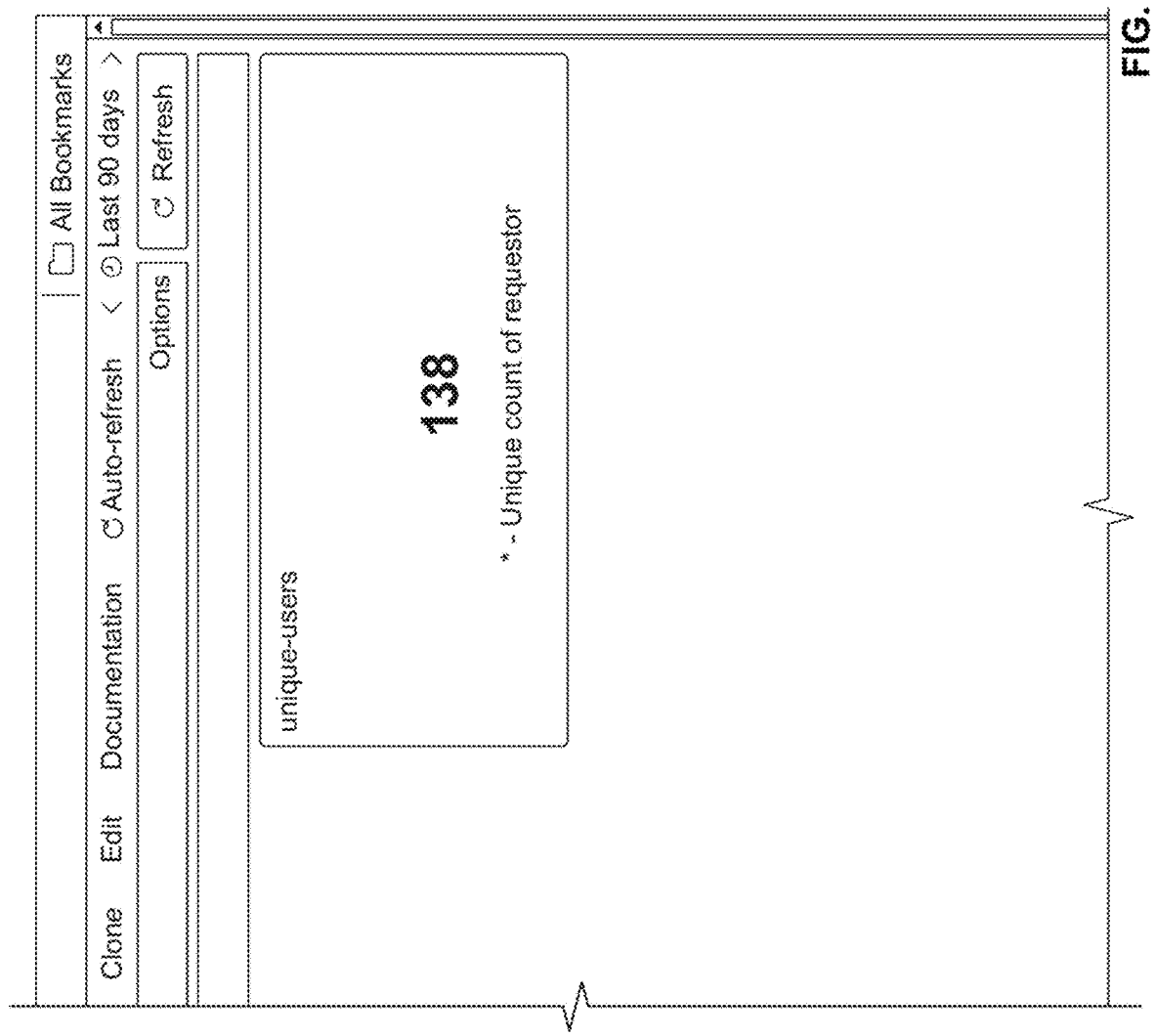
FIG. 10 (Cont... 1)

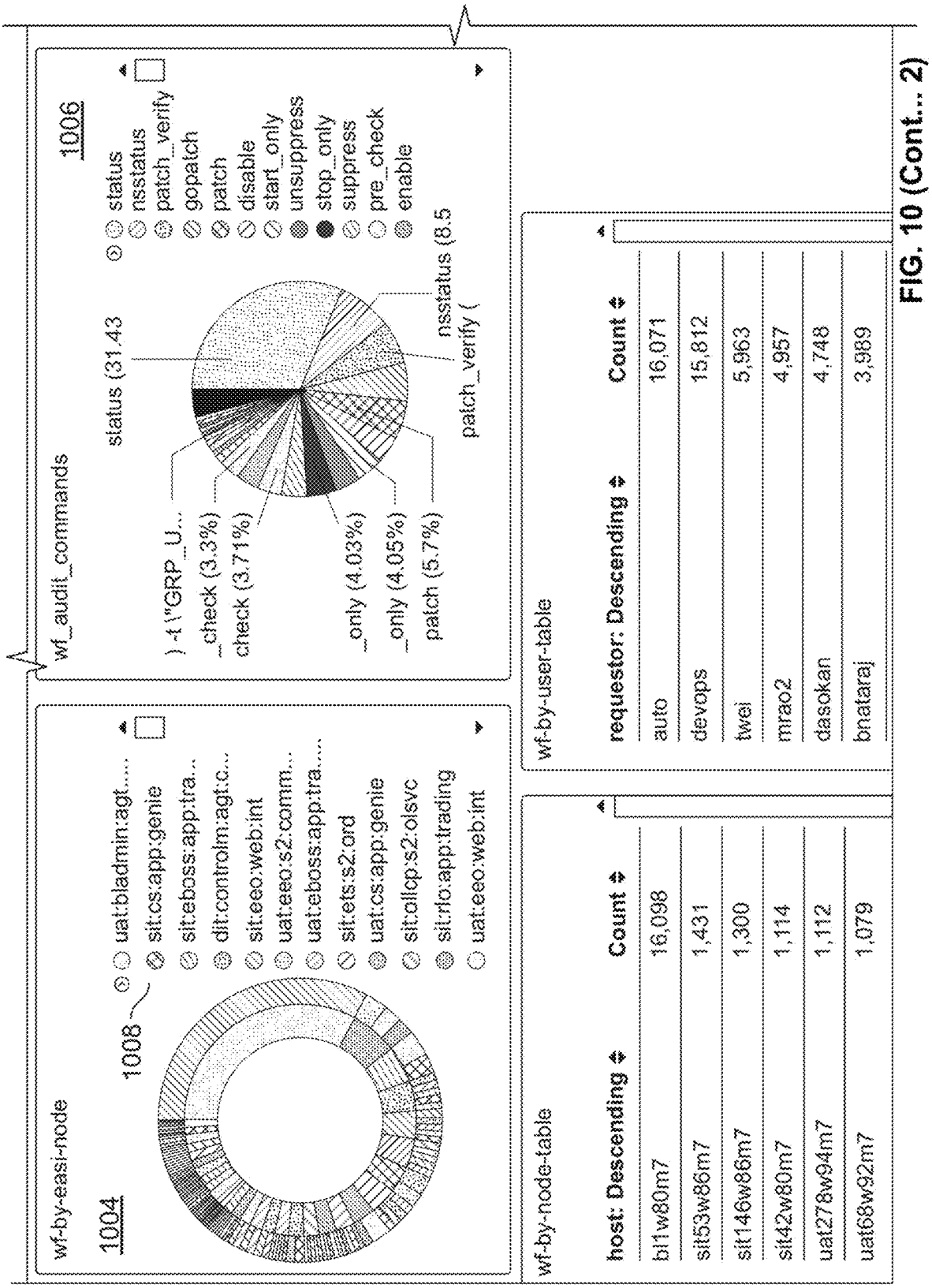
FIG. 10 (Cont... 2)

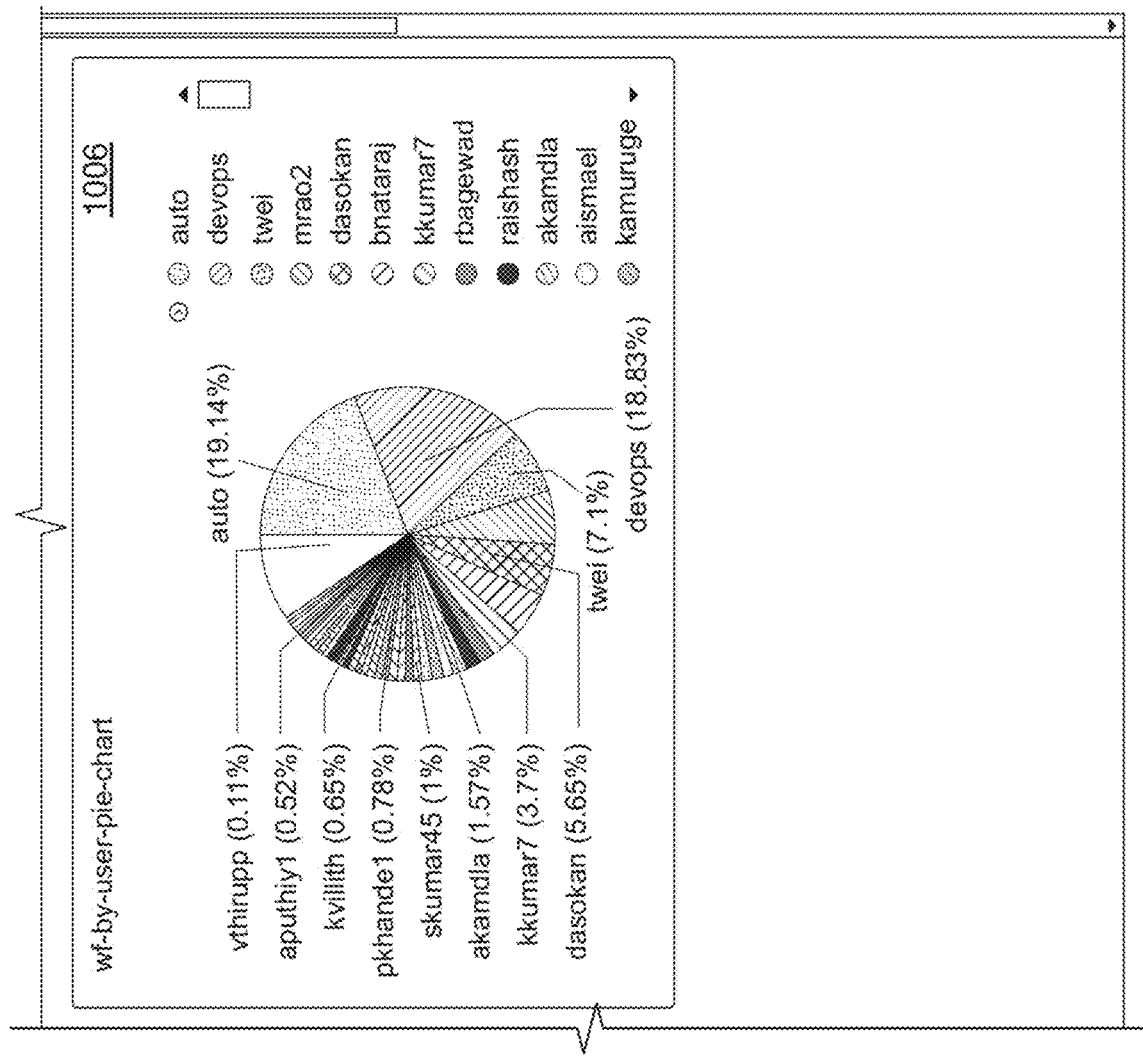
FIG. 10 (Cont... 3)

FIG. 11B

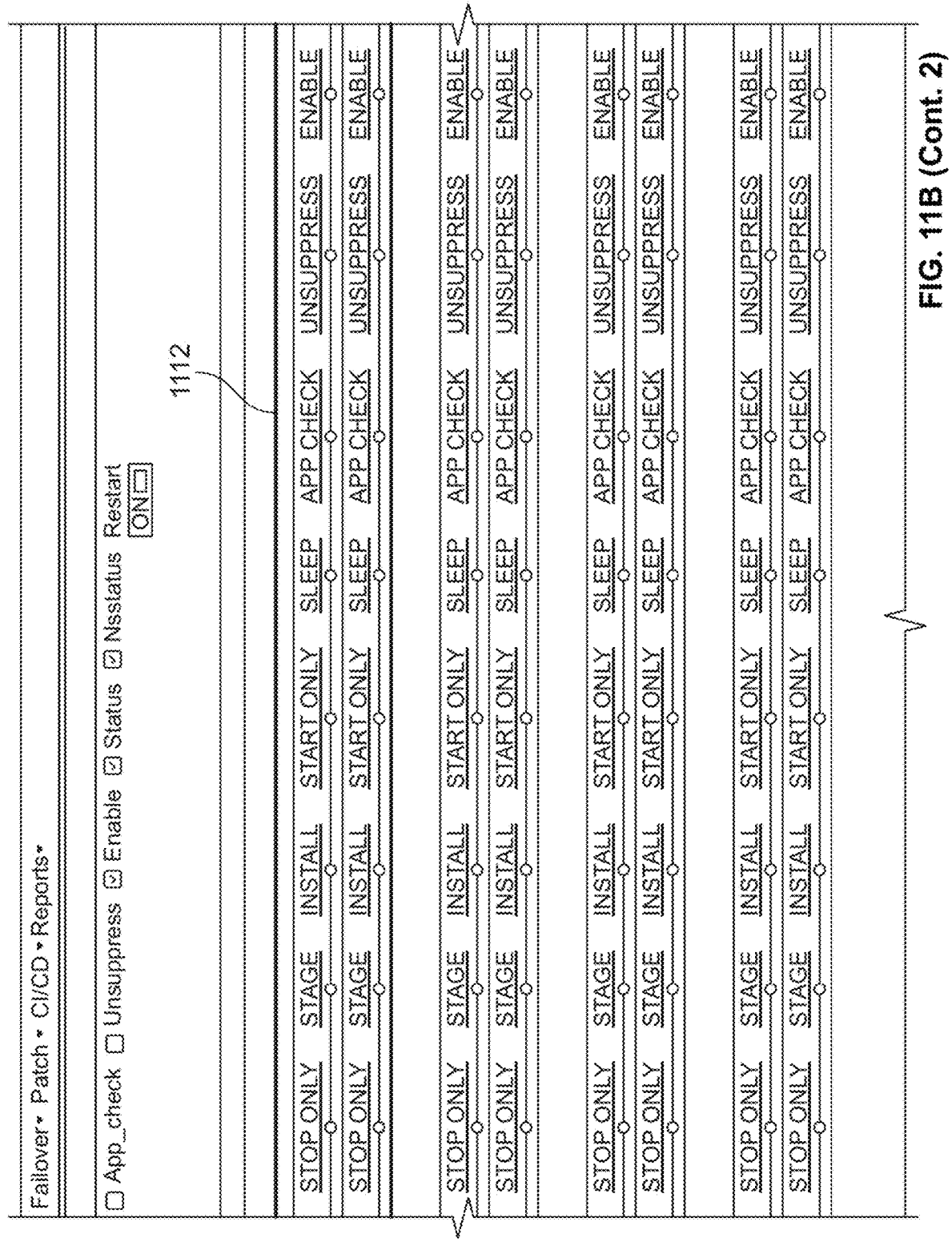
FIG. 11B (Cont. 2)

| | Lock By | Timestamp | WG | RESTRICTION | NAGIOS |
|---|---|---|---|---|---|
| STATUS NSSTATUS | — | in an hour | w88 | patch | None |
| STATUS NSSTATUS | — | in an hour | w80 | patch | None |
| STATUS NSSTATUS | — | in an hour | w224 | patch | SERVER_Stat... |
| STATUS NSSTATUS | — | in an hour | w80 | patch | None |
| STATUS NSSTATUS | — | in an hour | w88 | patch | None |
| STATUS NSSTATUS | — | in an hour | w86 | patch | None |
| STATUS NSSTATUS | — | in an hour | w88 | patch | None |
| STATUS NSSTATUS | — | in an hour | w80 | patch | None |

FIG. 11B (Cont. 3)

| ☐ ⊞ sit:rb:web:_publish (4) | | | |
|---|---|---|---|
| ☐ | sit149w32m15 ⊙ ℮ 2 | 1 | SUPPRESS DISABLE |
| ☐ | sit150w40m15 ⊙ ℮ 2 | 1 | SUPPRESS DISABLE |
| ☐ | sit151w40m15 ⊙ ℮ 1 | 1 | SUPPRESS DISABLE |
| ☐ | sit148w32m15 ⊙ ℮ 1 | 1 | SUPPRESS DISABLE |
| ☐ ⊞ sit:rb:web:_cdnpublish... | | | |
| ☐ | sit79w80m7 ⊙ ℮ 1 | 1 | SUPPRESS DISABLE |
| ☐ | sit3w224m7 ⊙ ℮ 1 | 1 | SUPPRESS DISABLE |

Total Items: 19

FIG. 11B (Cont. 4)

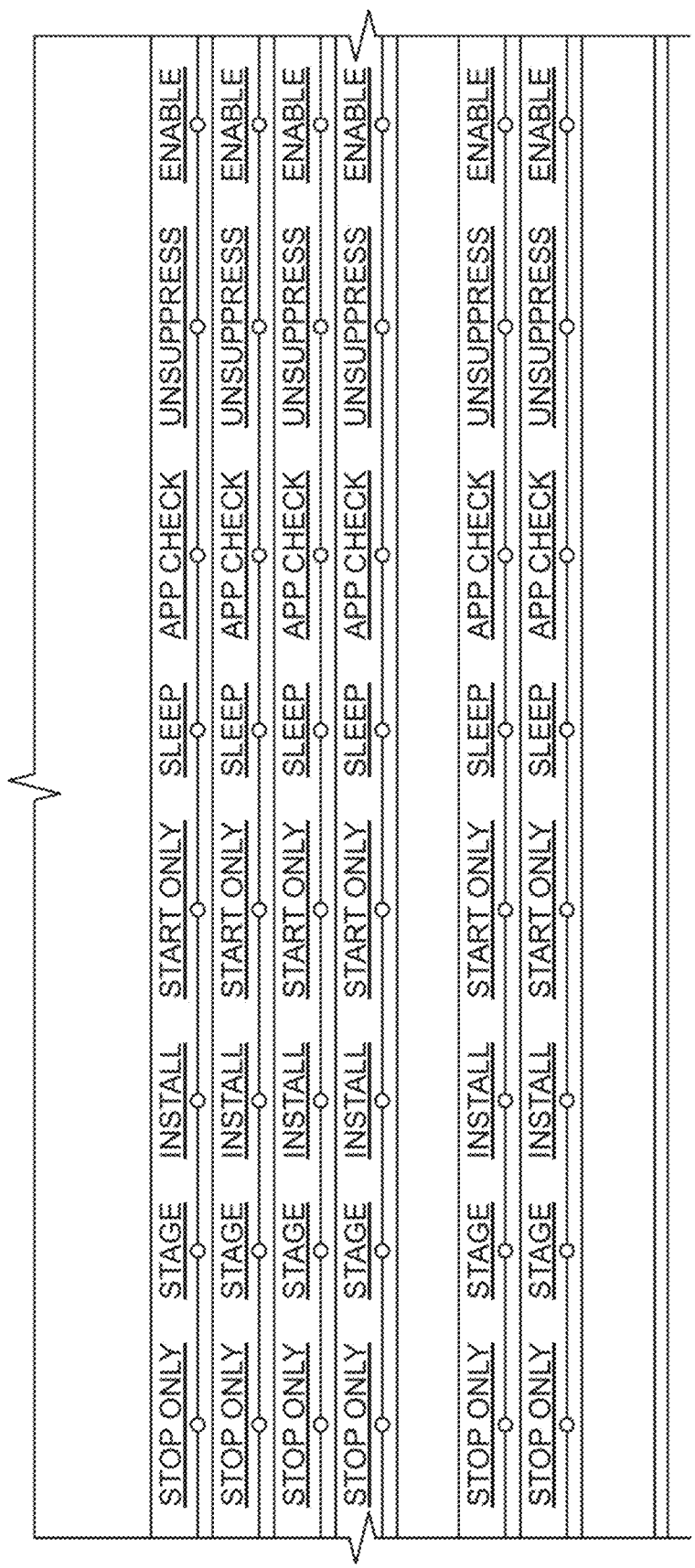
FIG. 11B (Cont. 5)

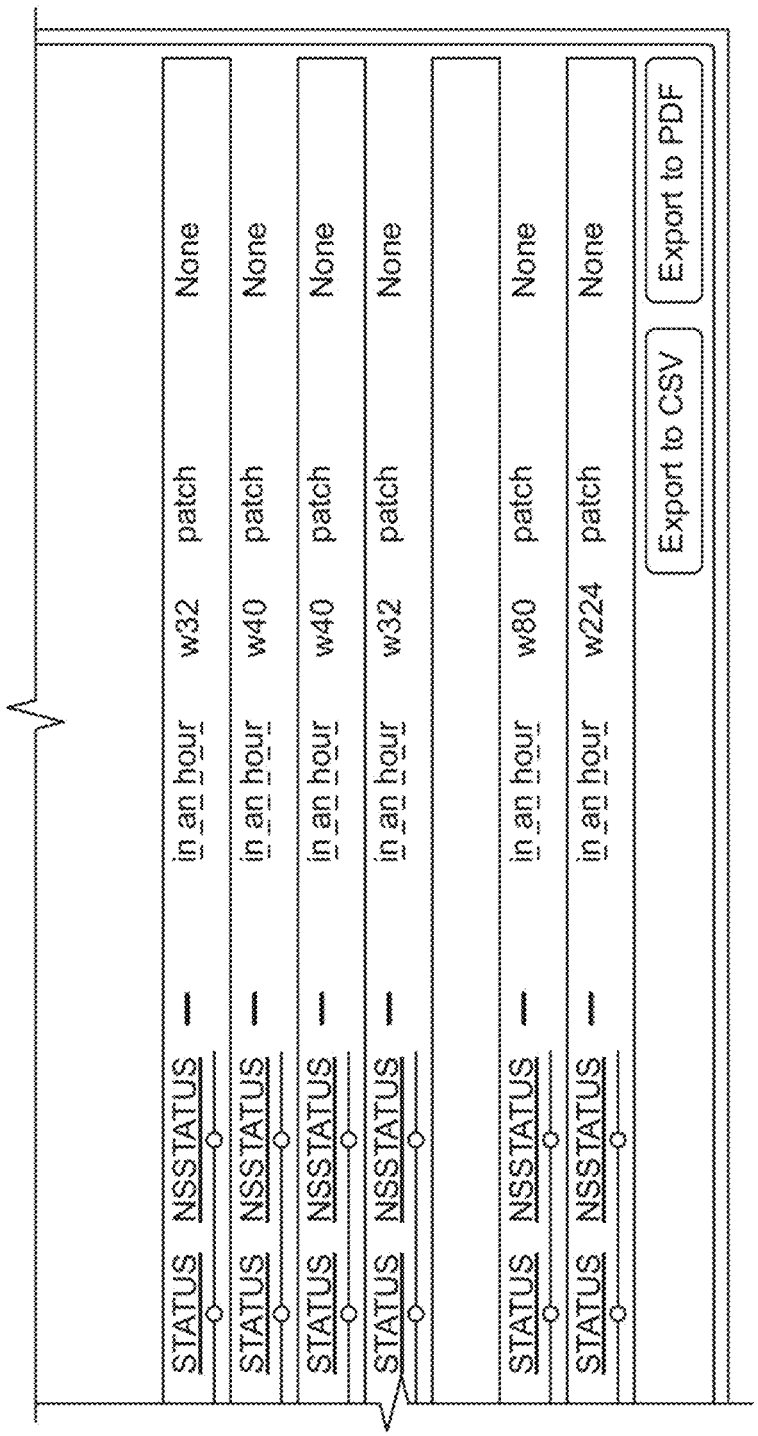
FIG. 11B (Cont. 6)

| | Instances▼ | Node▼ | Apps▼ | Security▼ | AMQ▼ | CServices▼ | DB Dependency▼ | DNS▼ | LoadShed▼ | Circuit Breaker▼ |
|---|---|---|---|---|---|---|---|---|---|---|

Clear All [m15 x]

Environments
[DIT] [SIT] [UAT] [sit]

Datacenter
[PPLT] 1

Search
[2825] m15

Node Management [2825] Selected Items: 1

| | WG ▲ | E:A:S:I | NODE | CH | Mode |
|---|---|---|---|---|---|
| ☑ | w0 | sit.etadm:web:spqc_dash | ditadm1w0m15 ⊕ 1 | | 1 |
| ☐ | w10 | sit.mborrep:SITRS1W46M15 | ditadb29w0m15 ⊕ 1 | | N |
| ☐ | w248 | sit.vrtsadm:cfs:VxLCFS742 | sit8w248m15 ⊕ 1 | | 0 |
| ☐ | w248 | sit.tech:app:itrack | sit15w248m15 ⊕ 2 | | 1 |
| ☐ | w248 | sit.kube:docker:core | sit5w248m15 ⊕ 1 | | PP |
| ☐ | w248 | sit.etdash:docker_mgr:etdash_kaf... | sit12w248m15 ⊕ 1 | | PP |
| ☐ | w248 | sit.k3s:nodes | sit22w248m15 ⊕ 2 | | PP |
| ☐ | w248 | sit.k3s:nodes | sit38w248m15 ⊕ 1 | | PP |
| ☐ | w248 | sit.k3s:ceph | sit35w248m15 ⊕ 1 | | PP |
| ☐ | w248 | sit.k3s:ceph | sit37w248m15 ⊕ 1 | | PP |
| ☐ | w248 | sit.k3s:monitoring | sit35w248m15 ⊕ 1 | | PP |
| ☐ | w248 | sit.k3s:secrets | sit36w248m15 ⊕ 1 | | PP |
| ☐ | w248 | sit.k3s:secrets | sit37w248m15 ⊕ 1 | | PP |
| ☐ | w248 | sit.k3s:pki | sit36w248m15 ⊕ 1 | | PP |
| ☐ | w248 | sit.k3s:pki | sit37w248m15 ⊕ 1 | | PP |
| ☐ | w248 | sit.k3s:nodes | sit32w248m15 ⊕ 1 | | PP |
| ☐ | w248 | sit.k3s:nginx | sit30w248m15 ⊕ 2 | | PP |

Workgroup [12]
Host [1295]

FIG. 11C

Failover ▼ Patch ▼ CI/CD ▼ Reports ▼ &Support▼ ⊙Monitoring▼

Select Command ▼

| EMSTATUS | NS STATUS | APP CHECK | INSTALL STATUS | Lock By | Timestamp | NAGIOS | BranchTag |
|---|---|---|---|---|---|---|---|
| - | | 0 | | cnguyen | 21 days ago | None | |
| - | | 0 | | | 9 days ago | None | |
| - | | 0 | | | 21 days ago | None | |
| - | | 0 | | | 14 days ago | None | |
| - | | 0 | | | 21 days ago | None | |
| - | | 0 | | | 21 days ago | None | |
| - | | 0 | | | 21 days ago | None | |
| - | | 0 | | | 21 days ago | None | |
| - | | 0 | | | 21 days ago | None | |
| - | | 0 | | | 21 days ago | None | |
| - | | 0 | | | 21 days ago | None | |
| - | | 0 | | | 21 days ago | None | |
| - | | 0 | | | 21 days ago | None | |

FIG. 11C (Cont. 1)

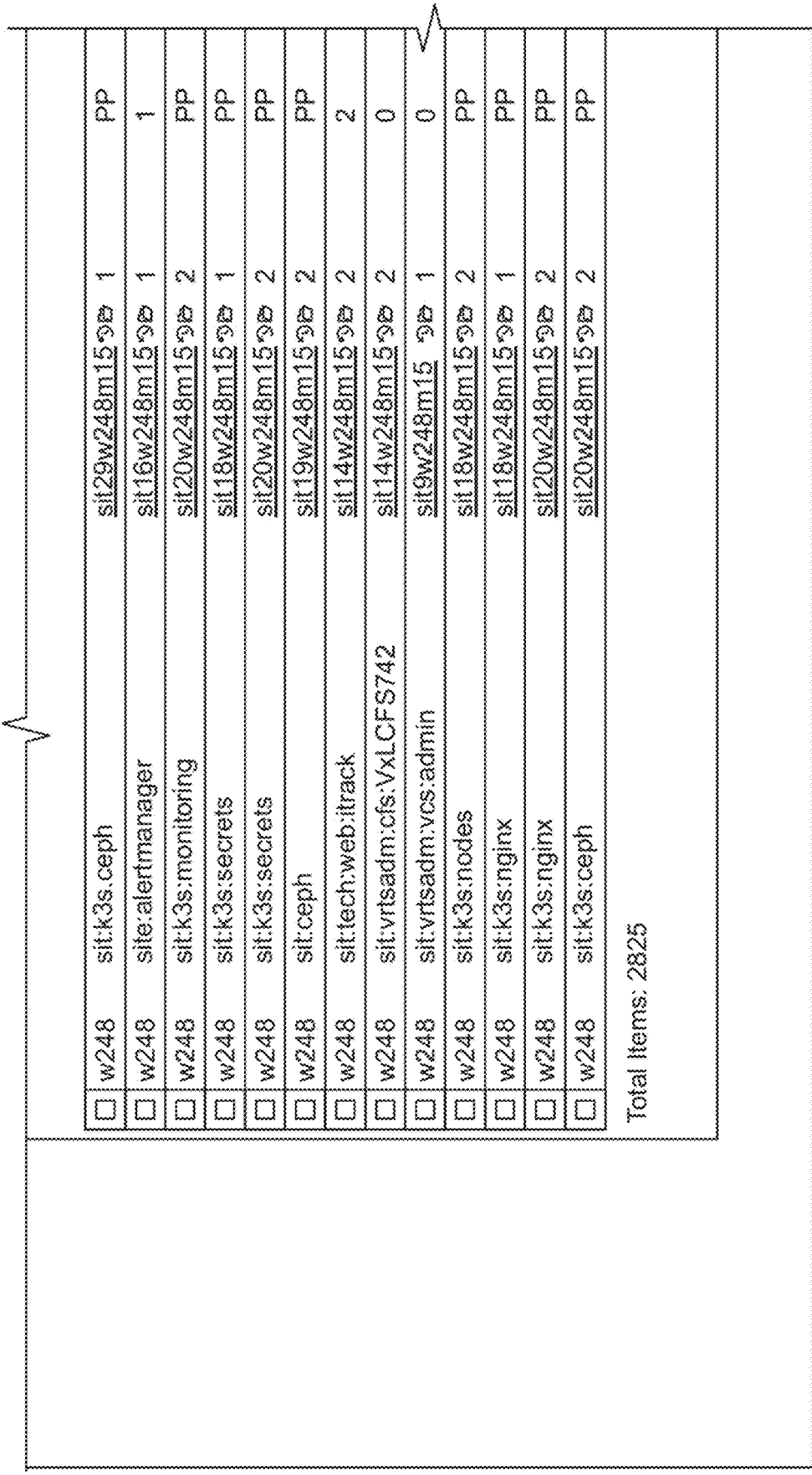
FIG. 11C (Cont. 2)

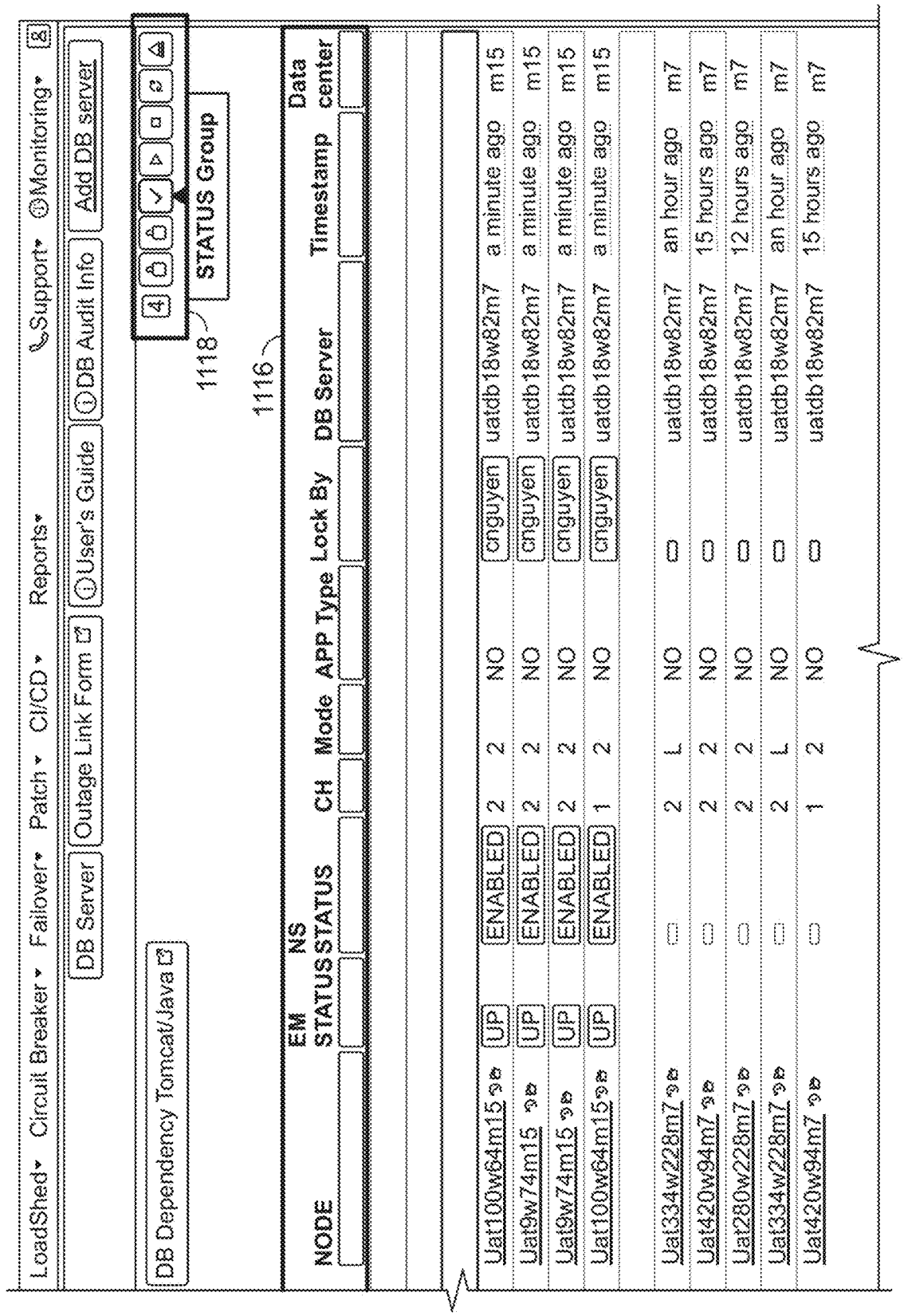
FIG. 11D (Cont. 1)

FIG. 11D (Cont. 2)

| | | | | | | |
|---|---|---|---|---|---|---|
| Uat280w2228m7 🖉 | ☐ | 1 | 2 | NO | 0 | uatdb18w82m7 | 12 hours ago | m7 |
| Uat317w92m7 🖉 | ☐ | 2 | L | NO | 0 | uatdb18w82m7 | an hour ago | m7 |
| Uat317w92m7 🖉 | ☐ | 1 | L | NO | 0 | uatdb18w82m7 | an hour ago | m7 |
| Uat271w94m7 🖉 | ☐ | 2 | 2 | NO | 0 | uatdb18w82m7 | 15 hours ago | m7 |
| Uat271w82m7 🖉 | ☐ | 2 | 2 | NO | 0 | uatdb18w82m7 | 12 hours ago | m7 |
| Uat271w82m7 🖉 | ☐ | 2 | 2 | NO | 0 | uatdb18w82m7 | 12 hours ago | m7 |
| Uat271w94m7 🖉 | ☐ | 1 | 2 | NO | 0 | uatdb18w82m7 | 15 hours ago | m7 |
| Uat100w82m7 🖉 | ☐ | 2 | 1 | NO | 0 | uatdb18w82m7 | 12 hours ago | m7 |
| Uat73w74m15 🖉 | ☐ | 2 | 1 | NO | 0 | uatdb18w82m7 | 12 hours ago | m15 |
| Uat167w64m15 🖉 | ☐ | 1 | 1 | NO | 0 | uatdb18w82m7 | an hour ago | m15 |
| Uat73w74m15 🖉 | ☐ | 2 | 1 | NO | 0 | uatdb18w82m7 | 12 hours ago | m15 |
| Uat167w64m15 🖉 | ☐ | 2 | 1 | NO | 0 | uatdb18w82m7 | an hour ago | m15 |
| Uat100w82m7 🖉 | ☐ | 2 | 1 | NO | 0 | uatdb18w82m7 | 12 hours ago | m7 |
| Uat100w94m7 🖉 | ☐ | 1 | 1 | NO | 0 | uatdb18w82m7 | 15 hours ago | m7 |
| Uat100w94m7 🖉 | ☐ | 2 | 1 | NO | 0 | uatdb18w82m7 | 15 hours ago | m7 |

[ Export to CSV ] [ Export to PDF ]

FIG. 11D (Cont. 3)

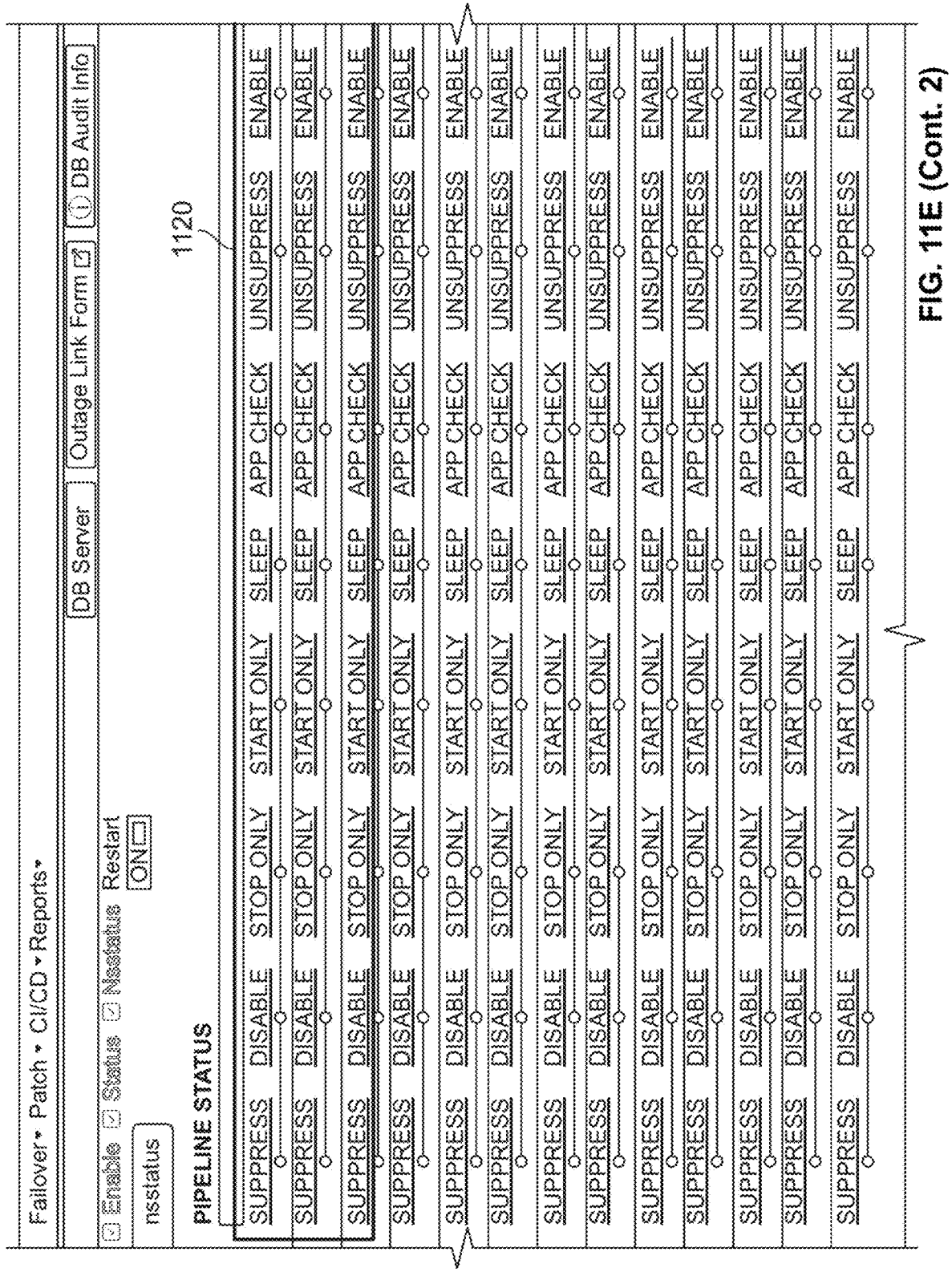
FIG. 11E (Cont. 2)

| | ☐prd:acct:s2:csacctmgmtsvcs (24) | tp211w407m5 ⟳ ⓘ | | |
|---|---|---|---|---|
| | | | tp210w204m1 ⟳ ⓘ | |
| | | | tp210w404m5 ⟳ ⓘ | |
| ☐ | | | | |
| ☐ | | | | |
| ☐ | | | | |
| ☐ | | | | |
| Total Items:279 | | | | |

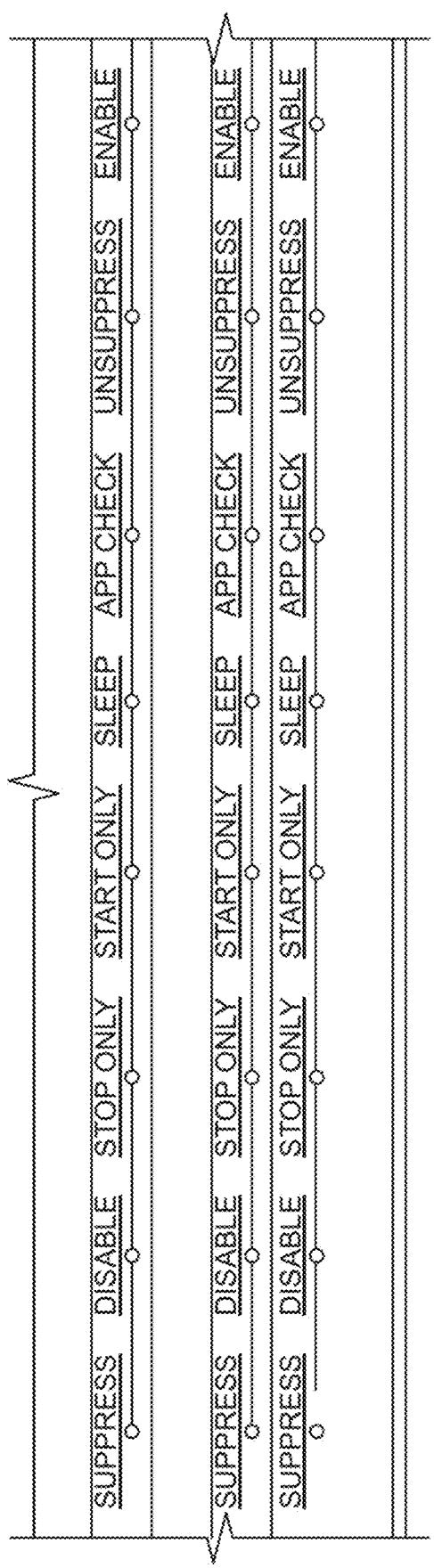
FIG. 11E (Cont. 5)

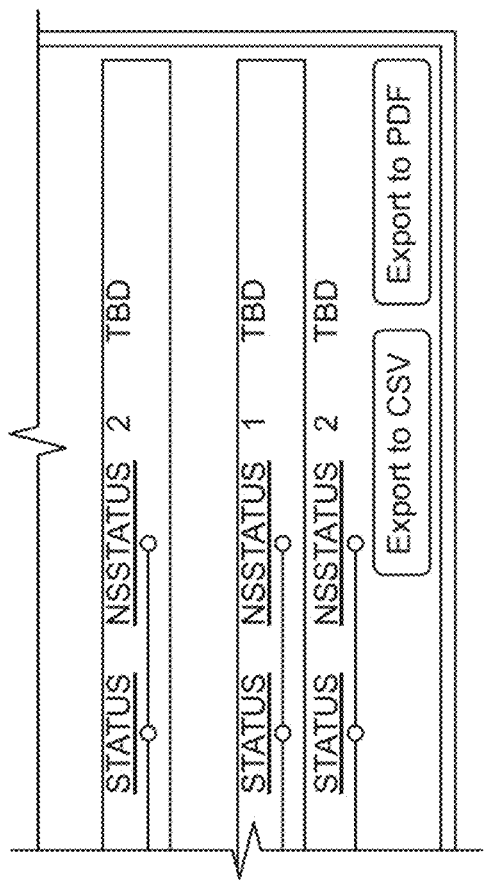
FIG. 11E (Cont. 6)

Instances ▼  Node ▼  Apps ▼  Security ▼  AMQ ▼  CServices ▼  DB Dependency ▼  DNS ▼  LoadShed ▼

PATCH DASHBOARD [27]

| CR | PACKAGE | SELECT PATC | EXECUTE PA* | SUCCESS | ERROR | ROLLEDBAC |
|---|---|---|---|---|---|---|
| Change Control Number 1202 | Package to deploy | | | | | |
| | vmsebatch | [4] | | | | |
| CRQ-345625 | commonbatch | [63] | [0] | [8] | | |
| CRQ-345675 | etsecbatch | [9] | [0] | [6] | | |
| CRQ-345688 | olscripts | [0] | [0] | [24] | | |
| CRQ-345622 | etaf | [590] | [0] | [2] | | |
| CRQ-345365 | vmsebatch | [4] | [0] | [36] | [2] | |
| CRQ-346236 | svcdet | [2749] | [5] | [8] | [16] | |
| CRQ-346222 | etsecbatch | [9] | [0] | [18] | [1] | |
| CRQ-345530 | spa_stockplan | [68] | [42] | [24] | | |

FIG. 12A

| Circuit Breaker ▼ | Failover ▼ | Patch ▼ | CI/CD ▼ | Reports ▼ |

Patch name - naming convention that includes package name, change control number and jira A centralized super orchestration dashboard. All changes to be deployed are auto discovered and properly mapped to the correct e-a-s-i, hosts.

| TYPE | PATCH NAME | Links | | | | |
|---|---|---|---|---|---|---|
| TAR | vmsebatch-BNR-32493-CRQ-344978.tar | STEP1 | STEP2 | View Status | ✕ | 🏷 |
| TAR | commonbatch-BNR-32491-CRQ-345625 | STEP1 | STEP2 | View Status | ✕ | 🏷 |
| TAR | etsecbatch-BNR-32468-CRQ-345675.tar | STEP1 | STEP2 | View Status | ✕ | 🏷 |
| TAR | olscripts-BNR-32478-CRQ-345688.tar | STEP1 | STEP2 | View Status | ✕ | 🏷 | ⚛ |
| TAR | etaf-BNR-32452-CRQ-345622.tar | STEP1 | STEP2 | View Status | ✕ | 🏷 | ⚛ |
| TAR | vmsebatch-BNR-32367-CRQ-345365.tar | STEP1 | STEP2 | View Status | ✕ | 🏷 | ⚛ |
| TAR | svcdet-BNR-32509-CRQ-346236.tar | STEP1 | STEP2 | View Status | ✕ | 🏷 |
| TAR | etsecbatch-BNR-32496-CRQ-346222.tar | STEP1 | STEP2 | View Status | ✕ | 🏷 |
| TAR | spa_stockplan-BNR-32441-CRQ-345530 | STEP1 | STEP2 | View Status | ✕ | 🏷 | ⚛ |

FIG. 12A (Cont. 1)

| DATE | ITRACK | % COMPLETI | % SKIPPED | #NODES | #EASIs | MANI* |
|---|---|---|---|---|---|---|
| | | | | Number of hosts and e-a-s-i to deploy | | |
| 2024-12-13T14:01:00 | BNR-32493 | 100% | 34% | 69 | 11 | 20241* |
| 2024-12-12T21:01:00 | BNR-32491 | 100% | 92% | 33 | 3 | 20241* |
| 2024-12-12T19:52:00 | BNR-32468 | 100% | 28% | 4 | 1 | 20241* |
| 2024-12-12T18:34:00 | BNR-32478 | 50% | 0% | 642 | 24 | 20241* |
| 2024-12-12T17:27:00 | BNR-32452 | 70% | 92% | 12 | 2 | 20241* |
| 2024-12-12T17:23:00 | BNR-32367 | 100% | 34% | 2503 | 167 | 20241* |
| 2024-12-11T19:42:00 | BNR-32509 | 75% | 100% | 33 | 3 | 20241* |
| 2024-12-11T17:58:00 | BNR-32496 | 100% | 28% | 110 | 8 | 20241* |
| 2024-12-11T17:35:00 | BNR-32441 | | 62% | | | |

FIG. 12A (Cont. 2)

| | | | | |
|---|---|---|---|---|
| CRQ-345747 | eeTMS | 50 | 0 | |
| CRQ-345815 | spa_accountsho | 0 | 0 | |
| CRQ-345609 | s2_webapp_cra* | 96 | 0 | 76 | 20 |
| CRQ-345829 | vmsebatch | 4 | 0 | |
| CRQ-345338 | vmsebatch | 12 | 0 | 8 |
| CRQ-346007 | etsecbatch | 9 | 0 | 24 |
| CRQ-344961 | eeDEServer | 30 | 0 | |
| CRQ-344961 | eeReportServer | 30 | 0 | |
| CRQ-344961 | eeTaskManager | 30 | 0 | |
| CRQ-344961 | eeBusinessServ | 30 | 0 | |
| CRQ-345024 | scabatch | 0 | 0 | 4 | 1 |
| CRQ-344961 | eeAdminServer | 30 | 0 | |

FIG. 12A (Cont. 3)

| | | | | | |
|---|---|---|---|---|---|
| TAR | eeTMS-BNR-32495-CRQ-345747.tar | STEP1 | STEP2 | View Status | X |
| TAR | spa_accountshome-BNR-32401-CRQ-34 | STEP1 | STEP2 | View Status | X |
| TAR | s2_webapp_crauploaddocument-BNR-32 | STEP1 | STEP2 | View Status | X |
| TAR | vmsebatch-BNR-32444-CRQ-345829.tar | STEP1 | STEP2 | View Status | X |
| TAR | vmsebatch-BNR-32277-CRQ-345338.tar | STEP1 | STEP2 | View Status | X |
| TAR | etsecbatch-BNR-32485-CRQ-346007.tar | STEP1 | STEP2 | View Status | X |
| TAR | eeDEServer-BNR-32278-CRQ-344961.ta | STEP1 | STEP2 | View Status | X |
| TAR | eeReportServer-BNR-32278-CRQ-3449 | STEP1 | STEP2 | View Status | X |
| TAR | eeTaskManagerServer-BNR-32278-CRQ | STEP1 | STEP2 | View Status | X |
| TAR | eeBusinessServer-BNR-32278-CRQ-344 | STEP1 | STEP2 | View Status | X |
| TAR | scabatch-BNR-32359-CRQ-345024.tar | STEP1 | STEP2 | View Status | X |
| TAR | eeAdminServer-BNR-32278-CRQ-34496 | STEP1 | STEP2 | View Status | X |

FIG. 12A (Cont. 4)

| | | | | | | |
|---|---|---|---|---|---|---|
| 2024-12-11T16:34:00 | BNR-32495 | | 100% | 50 | 2 | 20241* |
| 2024-12-10T19:48:00 | BNR-32401 | 80% | 0% | 96 | 4 | 20241* |
| 2024-12-10T19:26:00 | BNR-32383 | | 100% | 96 | 5 | 20241* |
| 2024-12-10T19:04:00 | BNR-32444 | 100% | 34% | 12 | 2 | 20241* |
| 2024-12-10T08:51:00 | BNR-32277 | | 100% | 12 | 2 | 20241* |
| 2024-12-09T17:36:00 | BNR-32485 | 100% | 28% | 33 | 3 | 20241* |
| 2024-12-03T20:50:00 | BNR-32278 | | 100% | 30 | 1 | 20241* |
| 2024-12-03T20:45:00 | BNR-32278 | | 100% | 30 | 1 | 20241* |
| 2024-12-03T20:44:00 | BNR-32278 | | 100% | 30 | 1 | 20241* |
| 2024-12-03T20:37:00 | BNR-32278 | | 100% | 30 | 1 | 20241* |
| 2024-12-03T20:31:00 | BNR-32359 | 80% | 0% | 5 | 1 | 20241* |
| 2024-12-03T20:27:00 | BNR-32278 | | 100% | 30 | 1 | 20241* |

[Export to CSV] [Export to PDF]

FIG. 12A (Cont. 5)

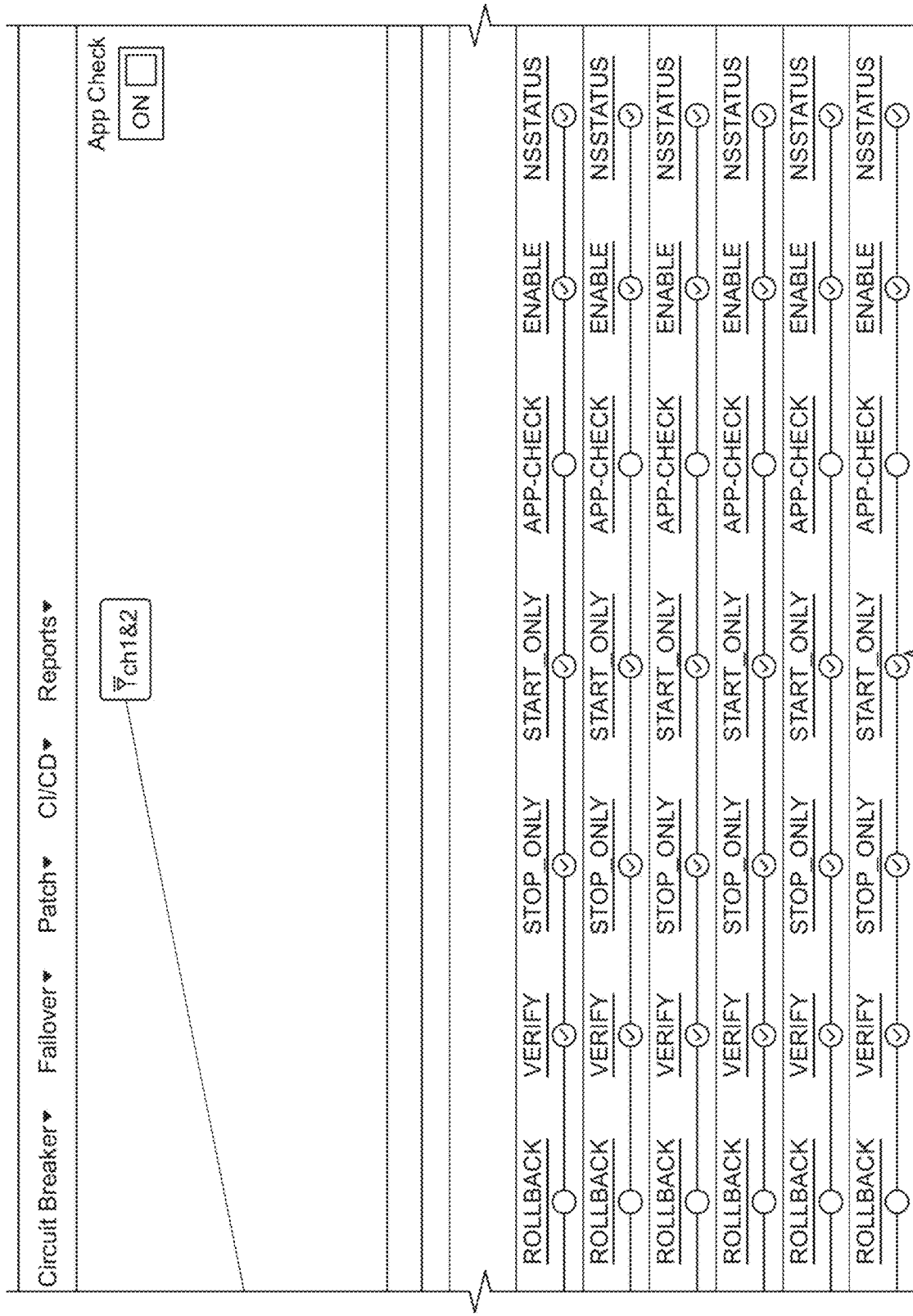
FIG. 12B (Cont. 1)

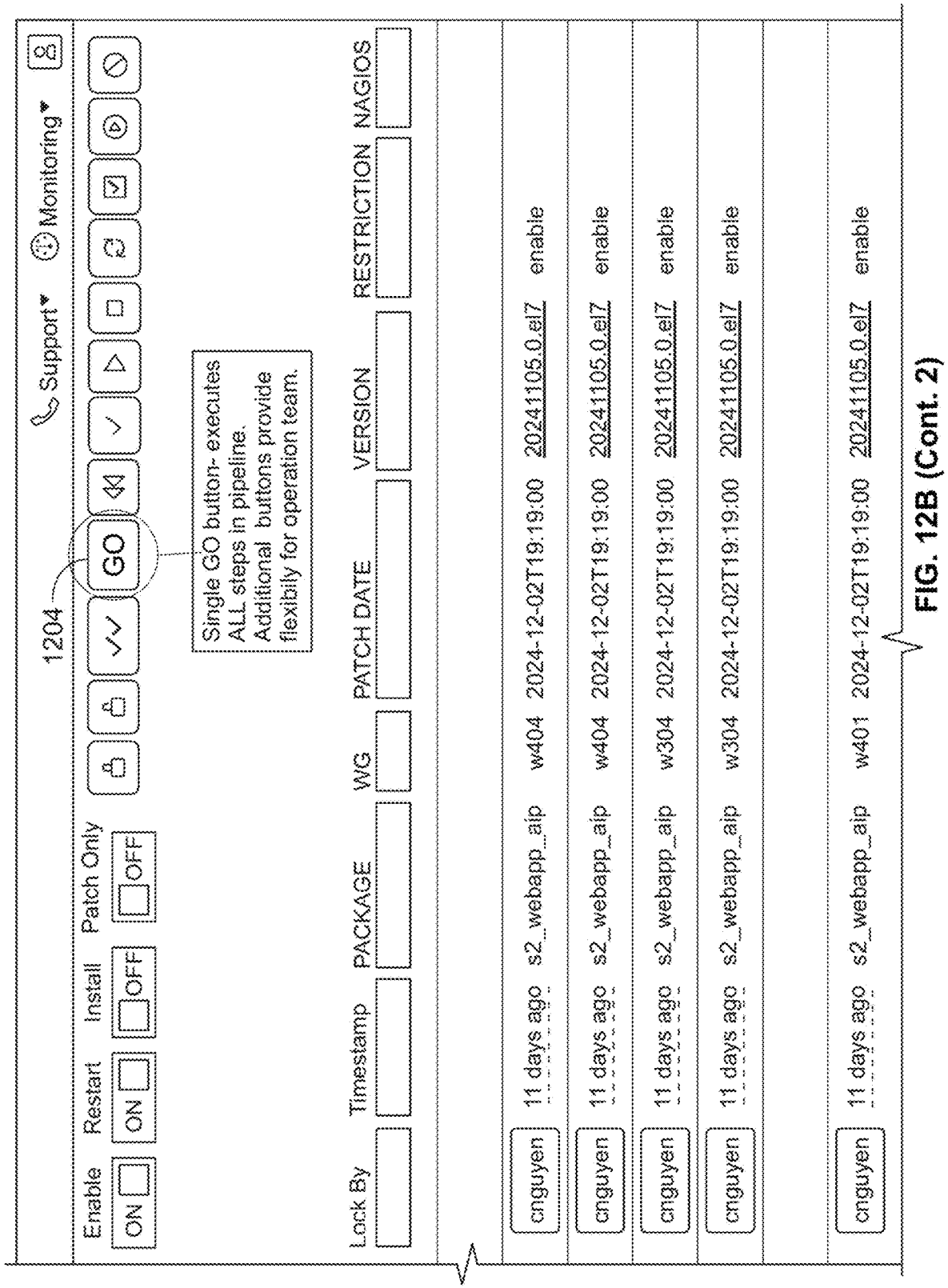
FIG. 12B (Cont. 2)

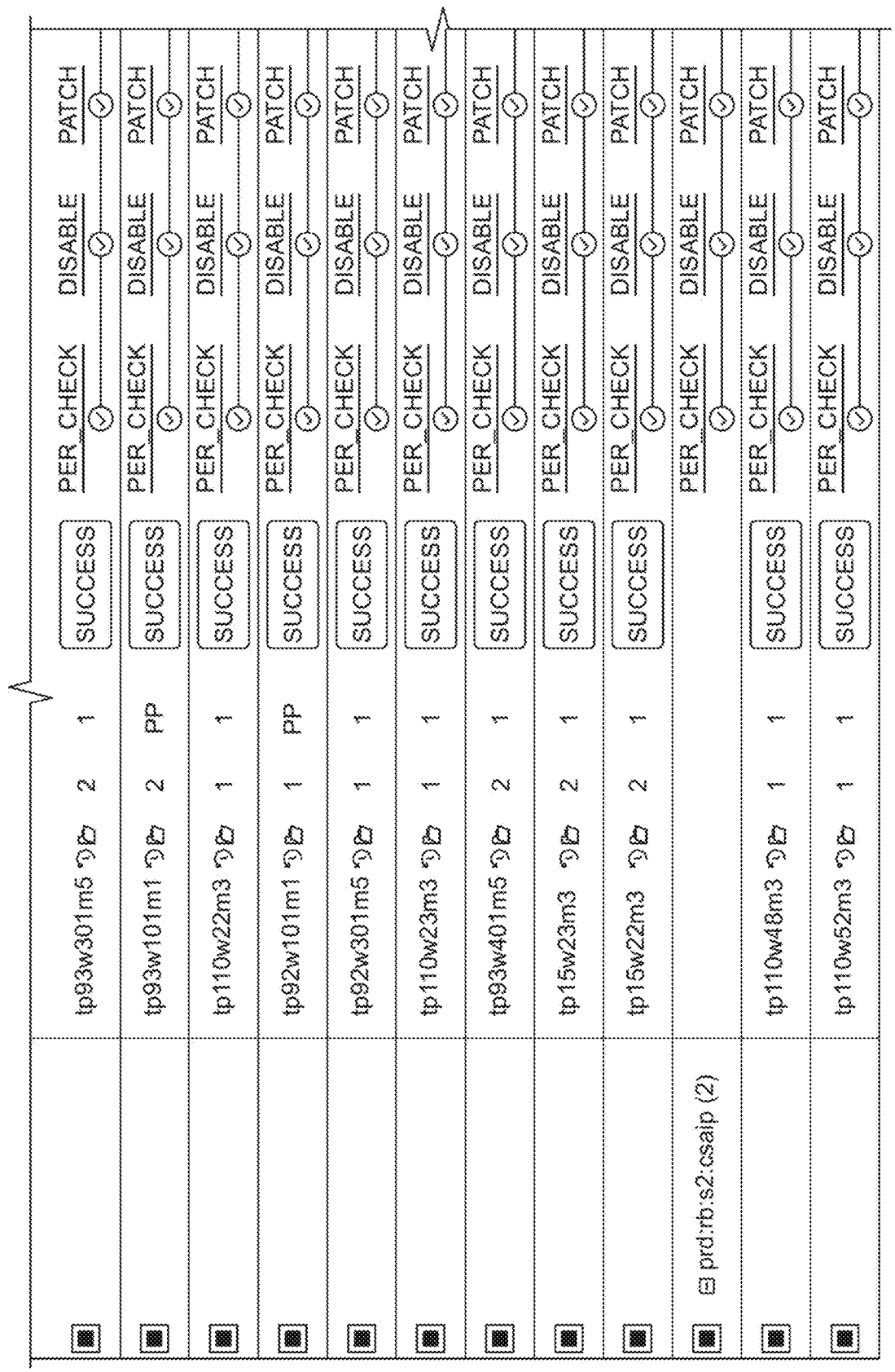
FIG. 12B (Cont. 3)

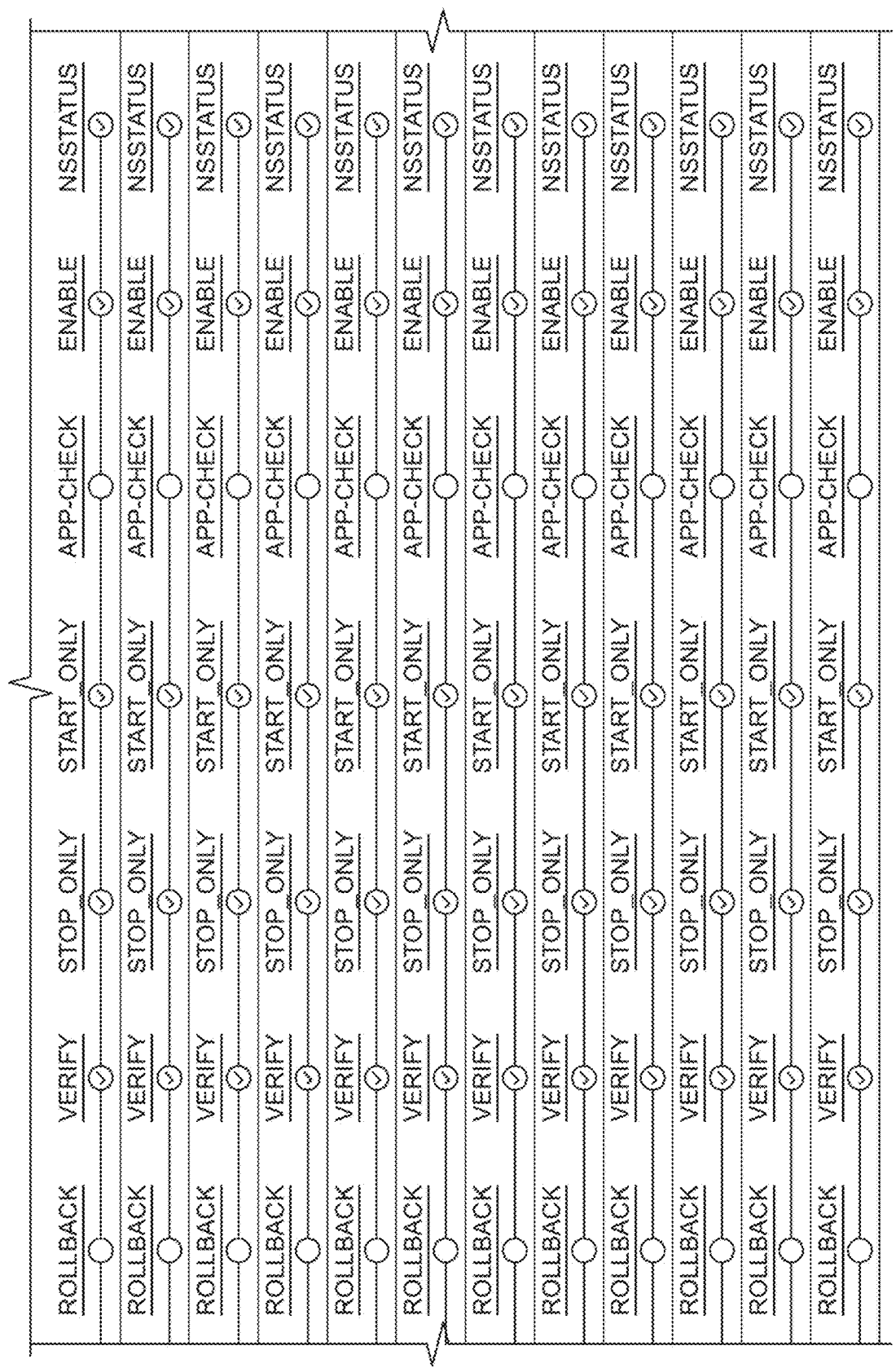
FIG. 12B (Cont. 4)

| | | | | | | |
|---|---|---|---|---|---|---|
| cnguyen | 11 days ago | s2_webapp_aip | w301 | 2024-12-02T19:19:00 | 20241105.0.el7 | enable |
| cnguyen | 11 days ago | s2_webapp_aip | w101 | 2024-12-02T19:19:00 | 20241105.0.el7 | enable |
| cnguyen | 11 days ago | s2_webapp_aip | w22 | 2024-12-02T19:19:00 | 20241105.0.el7 | enable |
| cnguyen | 11 days ago | s2_webapp_aip | w101 | 2024-12-02T19:19:00 | 20241105.0.el7 | enable |
| cnguyen | 11 days ago | s2_webapp_aip | w301 | 2024-12-02T19:19:00 | 20241105.0.el7 | enable |
| cnguyen | 11 days ago | s2_webapp_aip | w23 | 2024-12-02T19:19:00 | 20241105.0.el7 | enable |
| cnguyen | 11 days ago | s2_webapp_aip | w401 | 2024-12-02T19:19:00 | 20241105.0.el7 | enable |
| cnguyen | 11 days ago | s2_webapp_aip | w23 | 2024-12-02T19:19:00 | 20241105.0.el7 | enable |
| cnguyen | 11 days ago | s2_webapp_aip | w22 | 2024-12-02T19:19:00 | 20241105.0.el7 | enable |
| cnguyen | 11 days ago | s2_webapp_aip | w48 | 2024-12-02T19:19:00 | 20241105.0.el7 | enable |
| cnguyen | 11 days ago | s2_webapp_aip | w52 | 2024-12-02T19:19:00 | 20241105.0.el7 | enable |

FIG. 12B (Cont. 5)

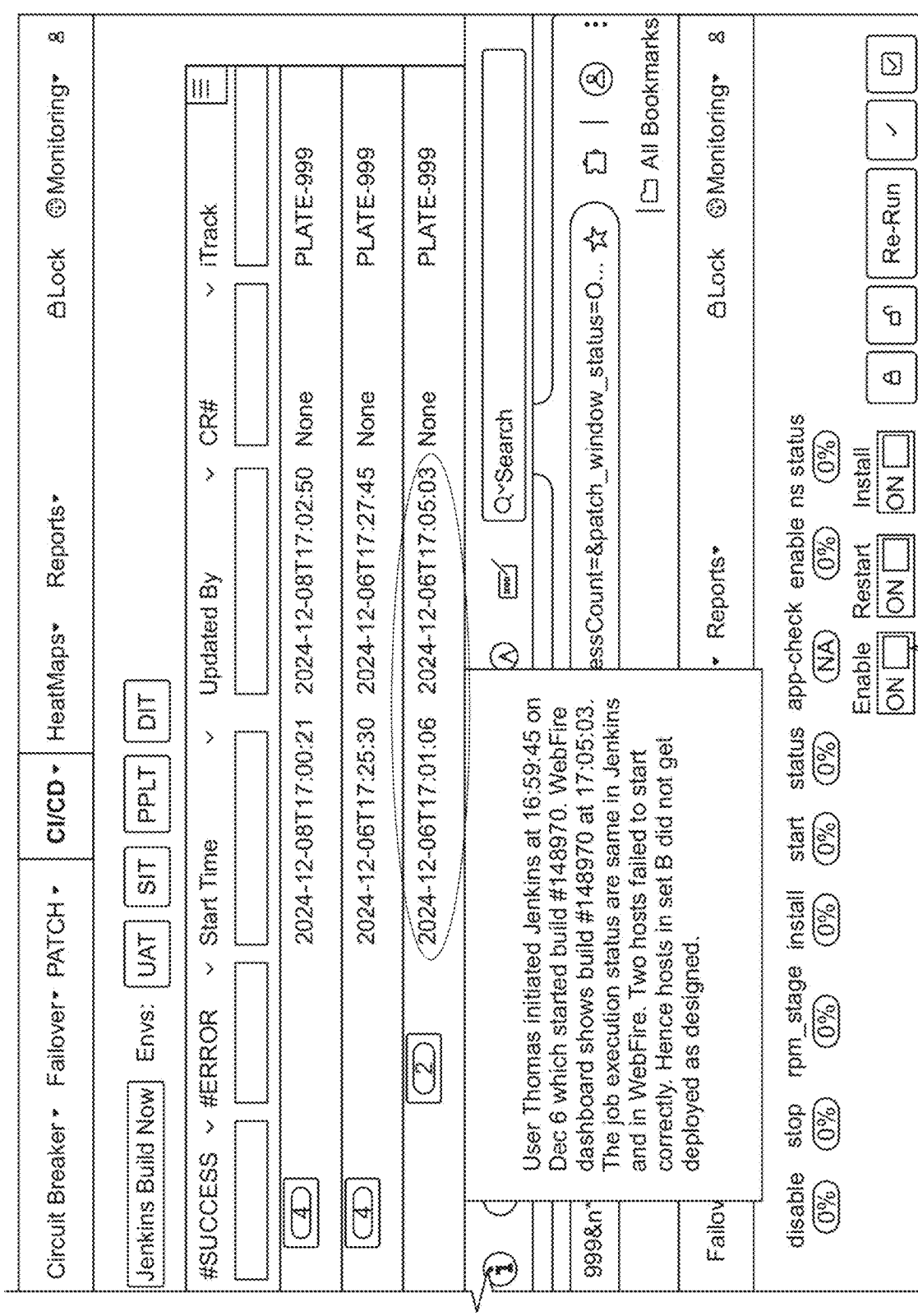
FIG. 12C (Cont. 1)

| ∨ | ⊞ EASI *0 | ∨ HOST * | ∨ CH ∨ | Mode | ∨ STATUS * | ∨ PIPELINE STATUS |
|---|---|---|---|---|---|---|
| ∨ | ⊞ sit:cs:web:spa_content (2) | | | | | |
| ∨ | | sit19w32m15 ⓖ | 1 | 1 | | |
| ∨ | | sit23w40m15 ⓖ | 1 | 1 | ERROR | |
| ∨ | ⊞ sit:cs:webapp:spaproxy (2) | | | | | |
| ∨ | | sit21w32m15 ⓖ | 1 | 1 | | |
| ∨ | | sit21w40m15 ⓖ | 1 | 1 | | |
| ∨ | ⊞ sit:rb:web:spa_content (2) | | | | | |
| ∨ | | sit22w32m15 ⓖ | 1 | 1 | ERROR | |
| ∨ | | sit22w40m15 ⓖ | 1 | 1 | | |
| ∨ | ⊞ sit:rb:webapp:spaproxy (2) | | | | | |

Total Items: 8 (Showing Items: 12)

|◁ ◁ 1 /1 ▷ ▷| 200 ∨ items per page

FIG. 12C (Cont. 2)

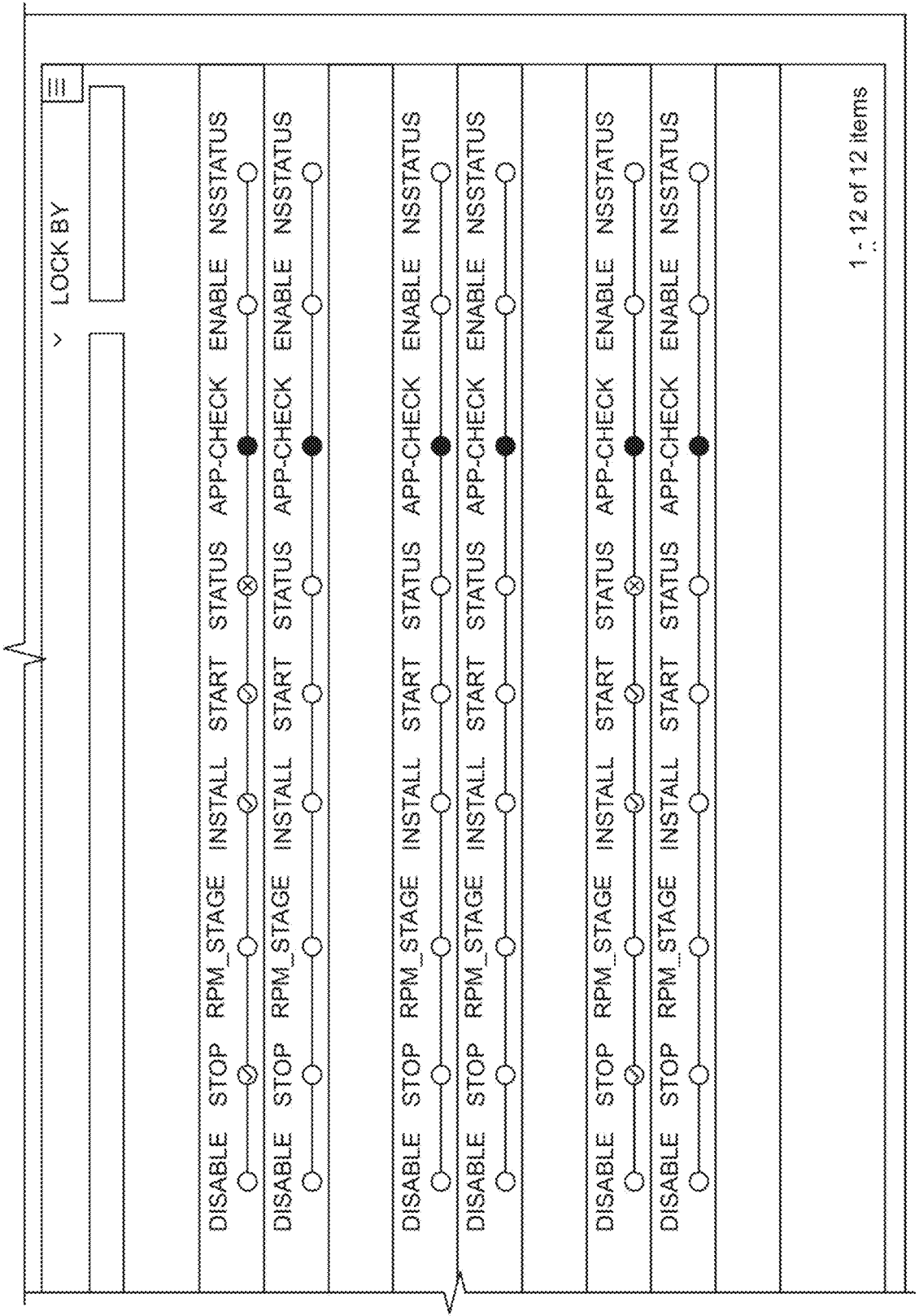
FIG. 12C (Cont. 3)

| External Links | Timestamp | VCS Group | STOMP PORT |
|---|---|---|---|
| | a few seconds a | 0 | 61313 |
| | a few seconds a | 0 | 61313 |
| | a few seconds a | 0 | 61313 |
| | a few seconds a | AMQ11_APP | 61613 |
| | a few seconds a | AMQ11_APP | 61613 |
| | a few seconds a | AMQ12_APP | 61623 |
| | a few seconds a | AMQ12_APP | 61623 |
| | a few seconds a | AMQ13_APP | 61633 |
| | a few seconds a | AMQ13_APP | 61633 |
| | a few seconds a | AMQ14_APP | 61643 |
| | a few seconds a | AMQ14_APP | 61643 |
| | a few seconds a | AMQ17_APP | 61713 |
| | a few seconds a | AMQ17_APP | 61713 |
| | a few seconds a | AMQ18_APP | 61723 |
| | a few seconds a | AMQ18_APP | 61723 |
| | a few seconds a | AMQ19_APP | 61753 |
| | a few seconds a | AMQ19_APP | 61753 |
| | a few seconds a | AMQ20_APP | 61763 |
| | a few seconds a | AMQ20_APP | 61763 |

FIG. 13 (Cont. 2)

SYSTEM AND METHOD FOR MONITORING AND MANAGING COMPUTERIZED RESOURCES IN A COMPUTER CLUSTER ENVIRONMENT

FIELD OF THE INVENTION

The present invention relates generally to monitoring and managing computerized resources within a computerized cluster environment, and more specifically to deploying software applications in a distributed environment (e.g., a cloud environment).

BACKGROUND OF THE INVENTION

Modern computing environments, including cloud platforms and distributed computer clusters, require efficient resource management and orchestration to ensure seamless deployment, scaling, and maintenance of applications. As organizations increasingly adopt cloud-based infrastructures and microservices architectures, the complexity of managing computing resources, network configurations, and interdependencies between services has grown significantly. Traditional manual deployment and resource allocation methods are not only time-consuming but also prone to errors, inefficiencies, and downtime, which can negatively impact system performance and availability.

As computerized applications and services become more distributed, the need for sophisticated orchestration mechanisms that can operate across heterogeneous cloud environments and hybrid infrastructures has become increasingly critical. There is a need for improved computerized resource management and orchestration tools capable of efficiently deploying and managing applications in complex computer clusters and cloud environments while minimizing operational overhead and downtime.

SUMMARY

Embodiments of the invention may provide a system and method for managing computerized resources, which may, for example: associate a first server instance with a plurality of keys defining, e.g.: a stage within a software development lifecycle, application information, a middleware type, and an operational capability (where each of the plurality of keys may refer to a corresponding database); determine or discover application dependencies and/or database dependencies based on one or more of the plurality of keys; and execute computer tasks within a computer cluster based on the determined dependencies, where the computer cluster comprises the first server instance associated with the keys.

Some embodiments may provide a user interface (UI) to display real time information describing, e.g., tasks running on the computer cluster, the status of tasks and/or instances, mappings between keys, and the like.

Computer tasks executed according to some embodiments may be included in a deployment process of a software application, where the deployment process includes or involves a plurality of task orchestration tools.

Some embodiments may reassign computer tasks from a first server instance to a second server instance based on determined dependencies and keys (also referred to as "EASI" keys or information) associated with the instances.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which reference numerals may indicate corresponding, analogous, or similar elements, and in which:

Figure 11B:
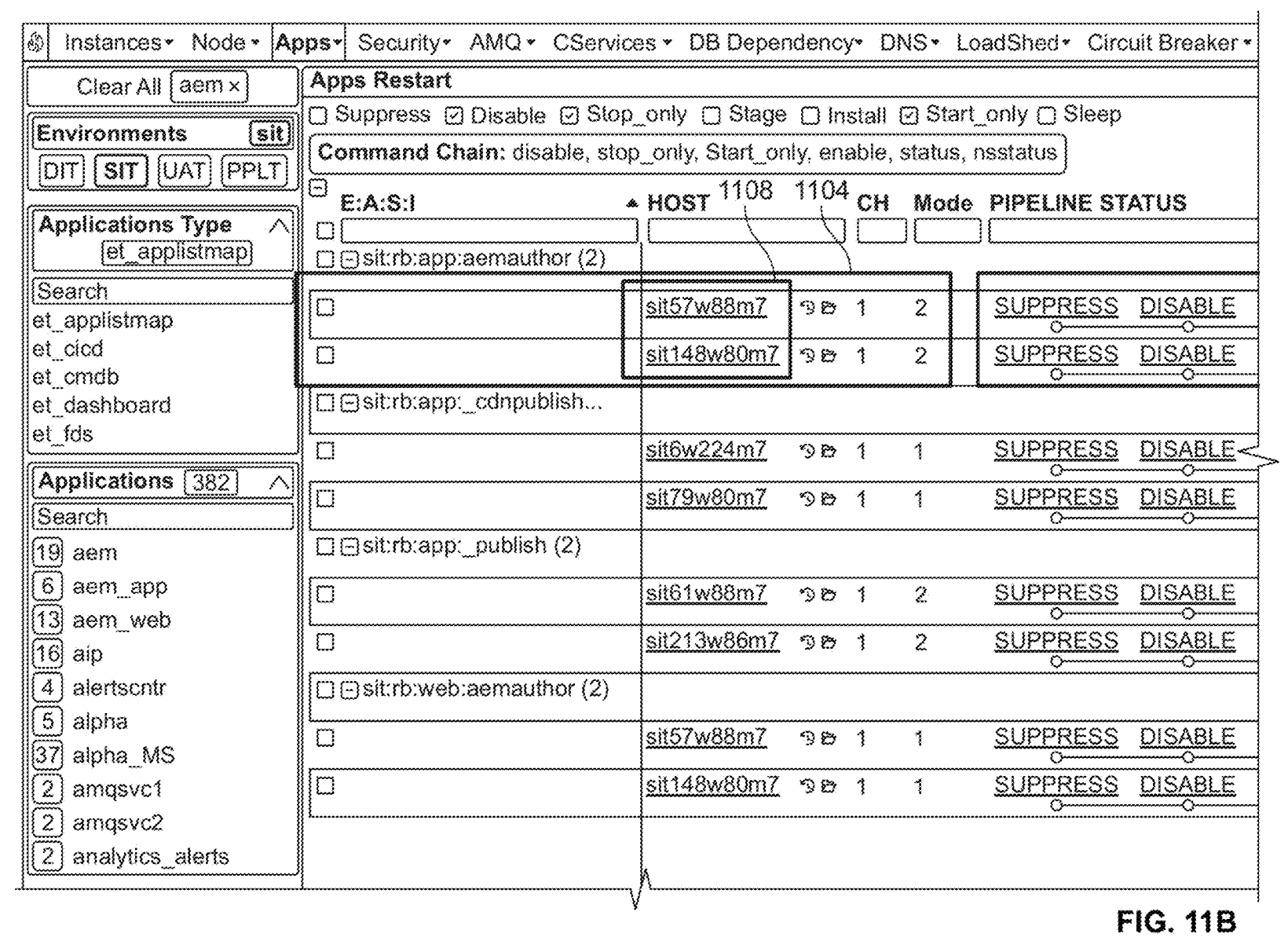
Figure 11C:
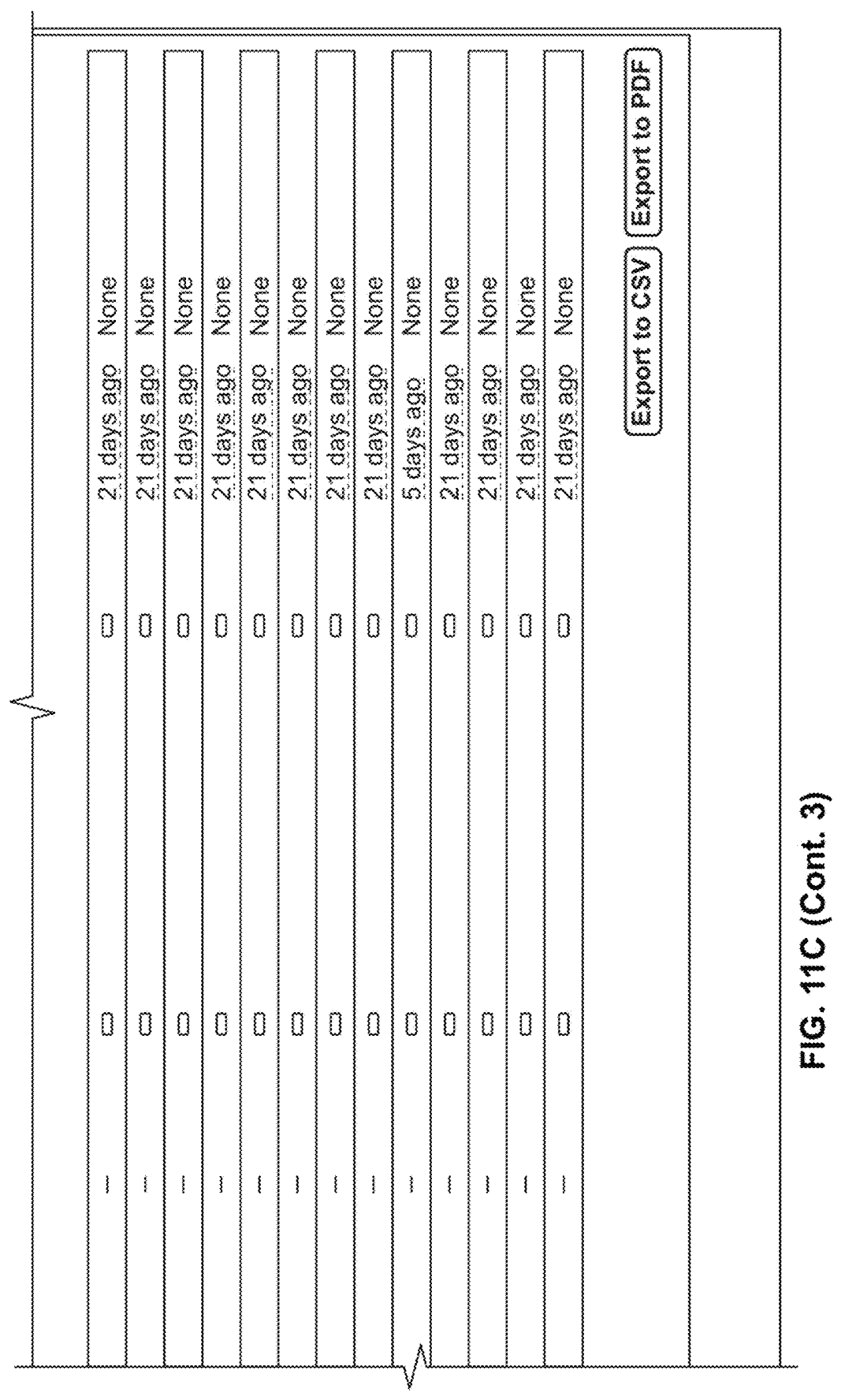
Figure 11D:
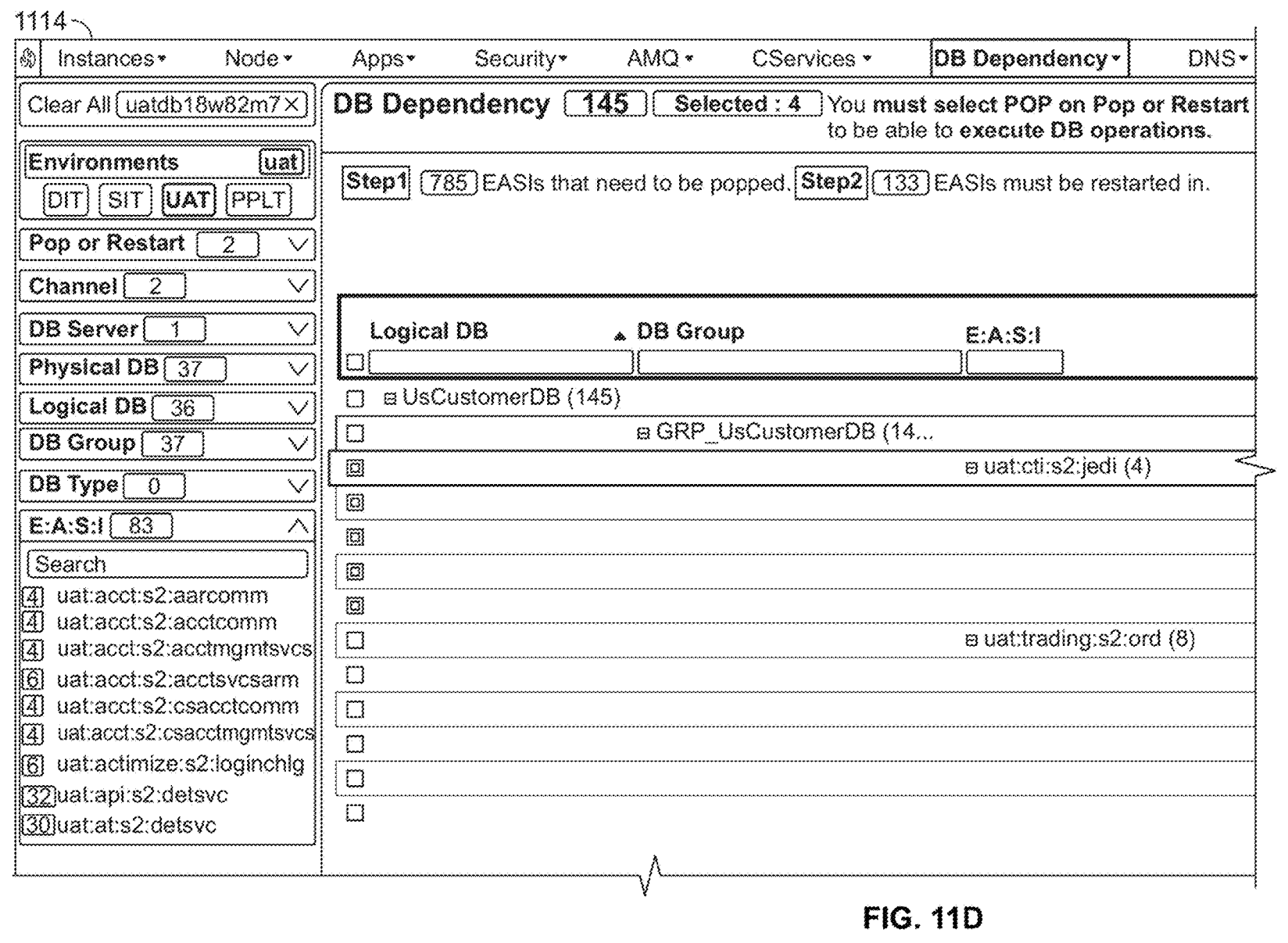
Figure 11D:
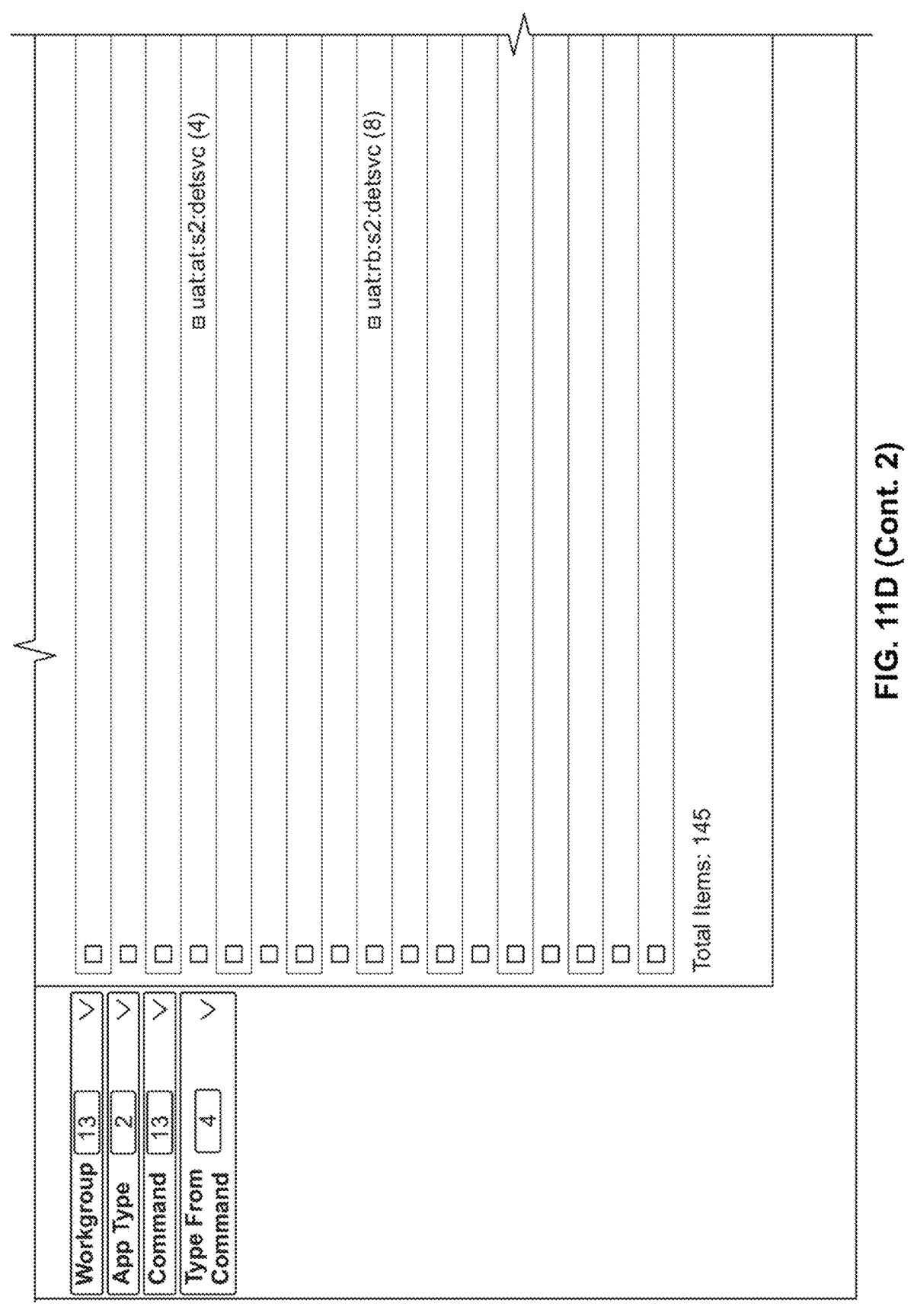

FIGS. 11A-E show an example user interface according to some embodiments of the invention;

FIGS. 12A-D show an example user interface for super orchestration according to some embodiments of the invention;

FIG. 13 shows an example user interface for message queue management according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Some embodiments of the invention may associate server instances with database keys (e.g., "EASI" keys), and manage and/or monitor computer resources based on these keys and a corresponding database framework. Some embodiments may discover or determine application or database dependencies involving applications, instances or machines in accordance with the associated keys, and perform various computerized operations, e.g., in a computer cluster, in an efficient and scalable manner using the relevant resources and/or instances.

Some embodiments of the invention may provide a web-based system and method for, e.g., providing visibility into applications and associated servers and enabling remote execution of commands or operations on these systems in real-time. A custom centralized web-based system management application according to some embodiments may incorporate a unique framework that integrates, for example, company-wide configuration, and that enables comprehensive remote command execution. Some embodiments may comprise a web-based user interface that displays information about applications running on various servers and/or server instances, including, inter alia, their system configurations and operational status. Additionally, the system may allow authorized users to remotely execute commands on the applications and servers through a web interface, facilitating real-time control and management of these systems.

Figure 1:
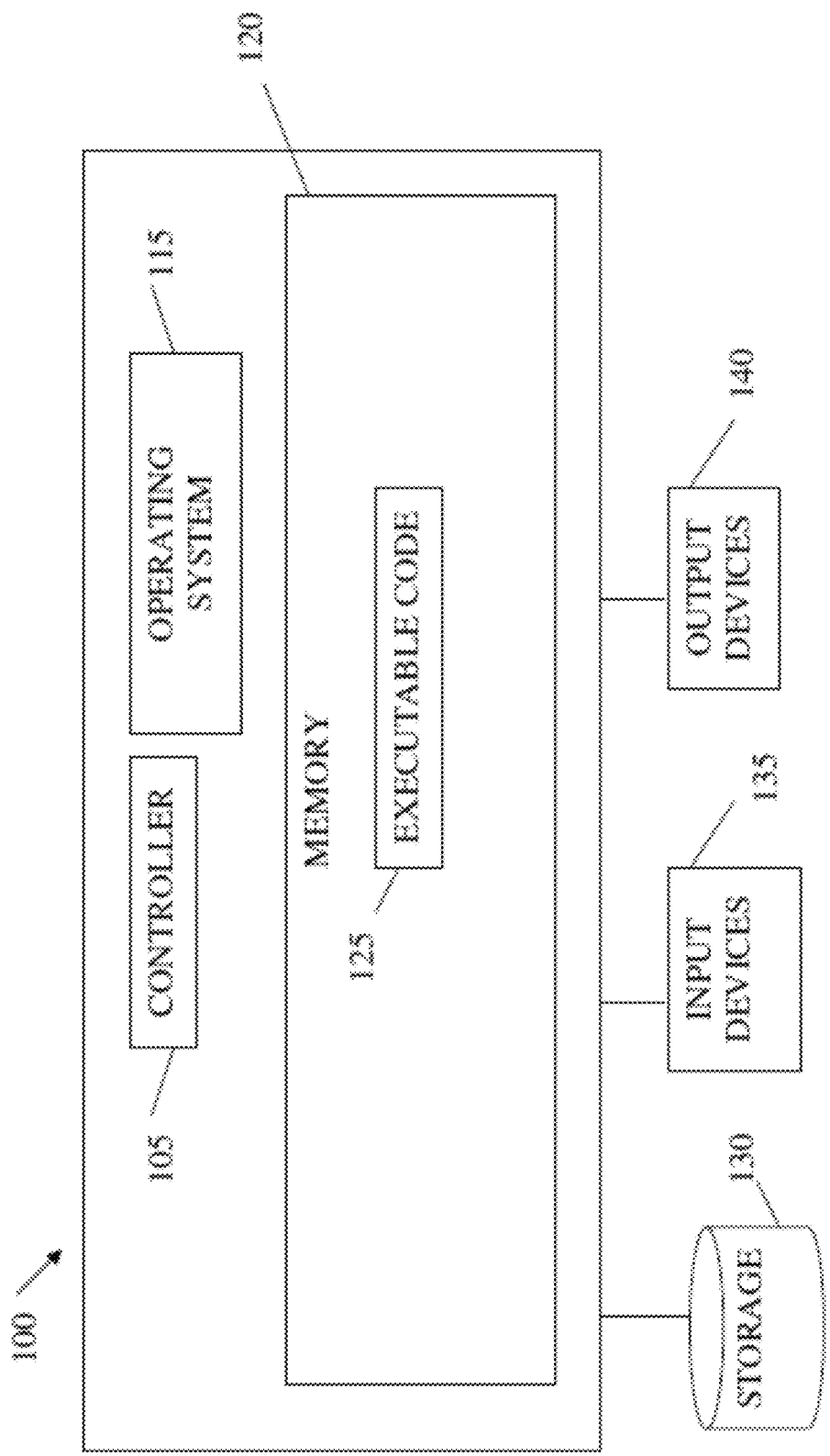
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

In computer cluster environments (such as for example enterprise environments, where an organization or company maintains a plurality of computational resources to perform operational tasks), a plurality of computer servers may be used, e.g., concurrently or in parallel, to provide high-performance computing, scalability, and redundancy (which may refer to replicating and/or replacing nodes or machines within the cluster for increased fault tolerance and preventing overall system failures, e.g., in case specific nodes/machines are malfunctioning). Within these environments, in-house inventory may refer to hardware and software resources—such as servers, storage devices, and networking components—that a computer cluster or organization maintains and manages internally to support computational tasks. To optimize resource allocation and job scheduling, custom workflows may be implemented, which may refer to automated processes for computerized task/memory load balancing, data distribution, and failure recovery for nodes/machines within the cluster. These workflows may be managed through a console or platform, which may be or may include a centralized interface that may provide administrators with real-time monitoring, configuration controls, and performance analytics for the entire cluster. Some embodiments of the invention may provide a standardized framework and platform which may enable supporting and executing custom workflows for efficient workload management, resource utilization, and system stability within computer cluster environment.

While some nonlimiting embodiments of the invention may refer to enterprise environments by way of example, different embodiments may be used in computer cluster environments unrelated to any commercial or economic activities, and the like. For example, some embodiments may be used to manage and optimize the performance, resource utilization, and system stability of high performance computing (HPC) clusters for scientific calculations and/or simulations. Additional or alternative embodiments may be used in different contexts.

Managing and maintaining applications and servers may be a complex and challenging task, especially when dealing with many distributed systems (such as, e.g., a cloud computing cluster including many physical or virtual computer systems performing tasks in a coordinated manner). Traditional monitoring and management tools may require on-premises installations, specialized software, or direct access to the systems, which may be time-consuming and inefficient. Additionally traditional systems and tools often require specific technology stacks or programming languages, adding complexity to integration and/or deployment of applications on distributed systems and clusters. Moreover, commercial software may not provide custom views or information that may describe or reflect a given organization's or company's specific applications, deployments, servers, and configurations.

A custom system management web application according to some embodiments, which may be used to perform some or all of the protocols and procedures described herein, may be referred to as the System Management Web Platform (SMWP). According to some embodiments, SMWP may be reimplemented as a web application and/or as a Java rich client (or "fat" client). Additional or alternative implementations may be used in different embodiments. SMWP, a full-stack system or resource management, may include, for example, a web based interface (including, e.g., a graphical user interface), a plurality of appropriate application programming interfaces (API; which may be based, for example, on the Django REST API building framework), a plurality of distributed tasks management elements or tools (which may be based, for example, on the Celery Python-based framework), and/or a plurality of modules or software components (which may be used, for example, to perform the various processes and operations described herein). Additional or alternative elements may be included in a system management application or platform according to different embodiments.

A deployment as used herein may refer to the process of releasing, updating, or scaling applications and services across infrastructure (such as for example in a computer cluster and/or cloud environment). Computerized operations involved in deployments according to various deployment strategies may include, in some embodiments, monitoring systems and/or tracking performance and errors. Patching, which may refer to applying updates to fix security vulnerabilities, bugs, or performance issues and which may be performed, e.g., as part of deployment processes according to some embodiments.

A host or node as used herein may be referred to as a computerized unit or device (which may for example be a physical machine or a virtual machine) that may provide computational resources such as for example processing power, storage, or services to other devices, users, or applications. Some embodiments may allow assigning tasks or applications to appropriate hosts, monitor these hosts to provide real time information about the host's activity and operational status (e.g., whether the host is running properly, if it is online or offline, if bugs were encountered, and the like).

Some embodiments of the invention may provide a web-based system and method for monitoring and managing applications and servers within computer cluster environments (including for example enterprise environments). Some embodiments may be applied specifically to operational tools with the ability to, e.g., integrate in-house inventory and custom workflows and operations (such as for example orchestration of change requests, reassignments of task/memory loads, and the like) in a single operational console—and may provide visibility (which refers to the ability to monitor, track, and gain real-time information about systems, processes, or data) as well as the ability to execute relevant computerized actions.

A discovery process may refer to the automated identification and mapping of interdependencies between applications, orchestration components or layers, databases, and the like, to ensure seamless integration and efficient resource management. Discovery processes according to some embodiments may involve, for example, querying relevant databases or registries describing states of instances/machines/hosts, monitoring task/memory load, network traffic, analyzing configuration files, and/or leveraging orchestration tools to detect how applications interact with databases and orchestrators, e.g., in real time or near real time (which may be defined, for example, as processing and responding to events or changes in a state or status of a machine, host, or instance within a few seconds from their occurrence).

Some embodiments may include, for example, a plurality of components such as, e.g., described in Table 1.

1. Centralized data repository/data discovery process: some embodiments may maintain a centralized repository that may store and organize collected information about applications, servers, and their respective configurations (which refer to the specific settings, parameters, and arrangements that define how a system, software, or device operates to meet desired functional and performance requirements). In some embodiments, the repository may automatically detect and integrate new hosts into the system, ensuring up-to-date inventory—or that all resources in the system are monitored. In some embodiments, repository or discovery components or subcomponents may include, e.g.:
   i. Server discovery module, which may automatically discover and identify applications running on various servers within a computer network such as, e.g., an enterprise network, along with their associated system configurations and operational status (such as, e.g., running, offline, and the like).
   ii. Application discovery module, which may contain the mapping of an application to its application stack (which may refer to a collection of software components, including operating systems, frameworks, libraries, and applications, that collectively run a specific program or service; an application stack may be denoted ASI).
   iii. Database dependency discovery module, which may provide visibility into applications database links, connections, and operational dependencies.
   iv. A super orchestrator discovery module, which may, e.g., automatically identify and integrate multiple lower-level orchestration tools or systems to manage and coordinate complex workflows across diverse environments.
   v. A message queue or broker (such as for example the Apache ActiveMQ message broker) management discovery module.
2. Intelligent command mapping: some embodiments may associate available commands with compatible hosts, for example based on target host's configurations, installed software, and user permissions—as may be documented in dedicated repositories or databases (and, e.g., may be described using key or EASI information). In some embodiments this may be part of a database dependency discovery module.
3. Remote command execution module: some embodiments may enable, for example through web-based interface, authorized users to remotely execute commands on the applications and servers in real-time (e.g., by a user interface or graphical user interface), enabling efficient management and control of these systems. Some embodiments may support simultaneous execution of commands across multiple hosts, with intelligent queuing and load balancing. In some embodiments, the module may support automated policies which may enforce and/or change management rules, support dynamic selection of deployment strategies, and ensure that users are not impacted by changes—for example by dynamically shifting traffic and/or task/ memory loads away from hosts or areas of a cluster or plant where commands are being executed, e.g., using a super orchestrator (see nonlimiting examples herein).

4. Access control and security: some embodiments may incorporate robust access control and security measures, for example to ensure that only authorized personnel can access and interact with the applications and servers
5. Web-based user interface (UI): some embodiments may provide a web-based user interface that may display the collected information in a user-friendly and intuitive manner, allowing system operations teams to easily navigate and visualize the applications and servers. It may provide users with an intuitive way to browse through an organization's or company's information technology infrastructure and to select target hosts for command execution.

Table 1.

Additional or alternative components may be included in different embodiments.

Some embodiments of the invention may improve computerized resource management technology and offer advantages over prior or existing solutions such as, for example:

Centralized monitoring and control: a web-based interface according to some embodiments may provide a centralized platform for monitoring and controlling applications and servers (e.g., through EASI keys and associated server instance management) across the cloud and/or enterprise environment, improving operational efficiency and reducing the need for multiple specialized tools.

Remote access and management: some embodiments may provide an ability to remotely execute commands on applications and servers/instances, which may eliminate the need for physical access or on-premises installations, and enable efficient management of computerized resources and/or hosts from any location.

Improved visibility and transparency: some embodiments may provide comprehensive visibility into applications, servers, and their configurations—e.g., by providing a consistent framework and operational hierarchy (e.g., through EASI keys and associated server instance management) enabling better decision-making, proactive management, and optimized utilization of computerized resources.

Risk mitigation: some embodiments may integrate multiple critical operations designed to address production issues. Features provided by some embodiments may enable computerized systems or clusters, as well as users, to quickly respond to crisis situations, such as for example site slowness or failure, by automatically taking corrective or failure-prevention actions, which may also reduce the potential for human errors.

Scalability and flexibility: some embodiments may provide a web-based architecture that may allow for easy scalability and flexibility, accommodating, e.g., growth and changing needs within a computerized cluster, e.g., of an enterprise environment.

Enhanced security and access control: access control and security measures provided by some embodiments of the invention (which may be built-into some embodiments and may include, e.g., database failover management and/or reassignments of task/memory load among instances/machines) may ensure that only authorized personnel can interact with the applications and servers, mitigating potential risks and threats.

Audit trail and usage metrics: some embodiments may provide a robust audit trail mechanism that may be used to record critical information about the user actions and system events. It may serve as a valuable resource, e.g., for troubleshooting issues, ensuring accountability, maintaining transparency, and providing valuable insights into application usage patterns.

A web-based system and method for monitoring and controlling applications and servers according to some embodiments of the invention may represent a novel and inventive solution for, e.g., enterprise systems and computerized cluster or cloud environments. For example, by providing centralized visibility, remote management capabilities, and robust security measures, some embodiments of the invention may address challenges associated with managing computer systems, distributed applications and servers-improving operational efficiency, and reducing the complexity of system management tasks.

Some embodiments may include or use the Celery task queue system to execute tasks asynchronously and handle background jobs or scheduled tasks. In this context, a Celery task may refer to an asynchronous unit of work or operation that is executed in the background by a Celery worker (which may for example be running on a node or server instance, or on a plurality of such), typically used for handling time-consuming or periodic tasks, e.g., in Python applications. Additional or alternative task types or execution/management frameworks may be used in different embodiments.

Figure 2:
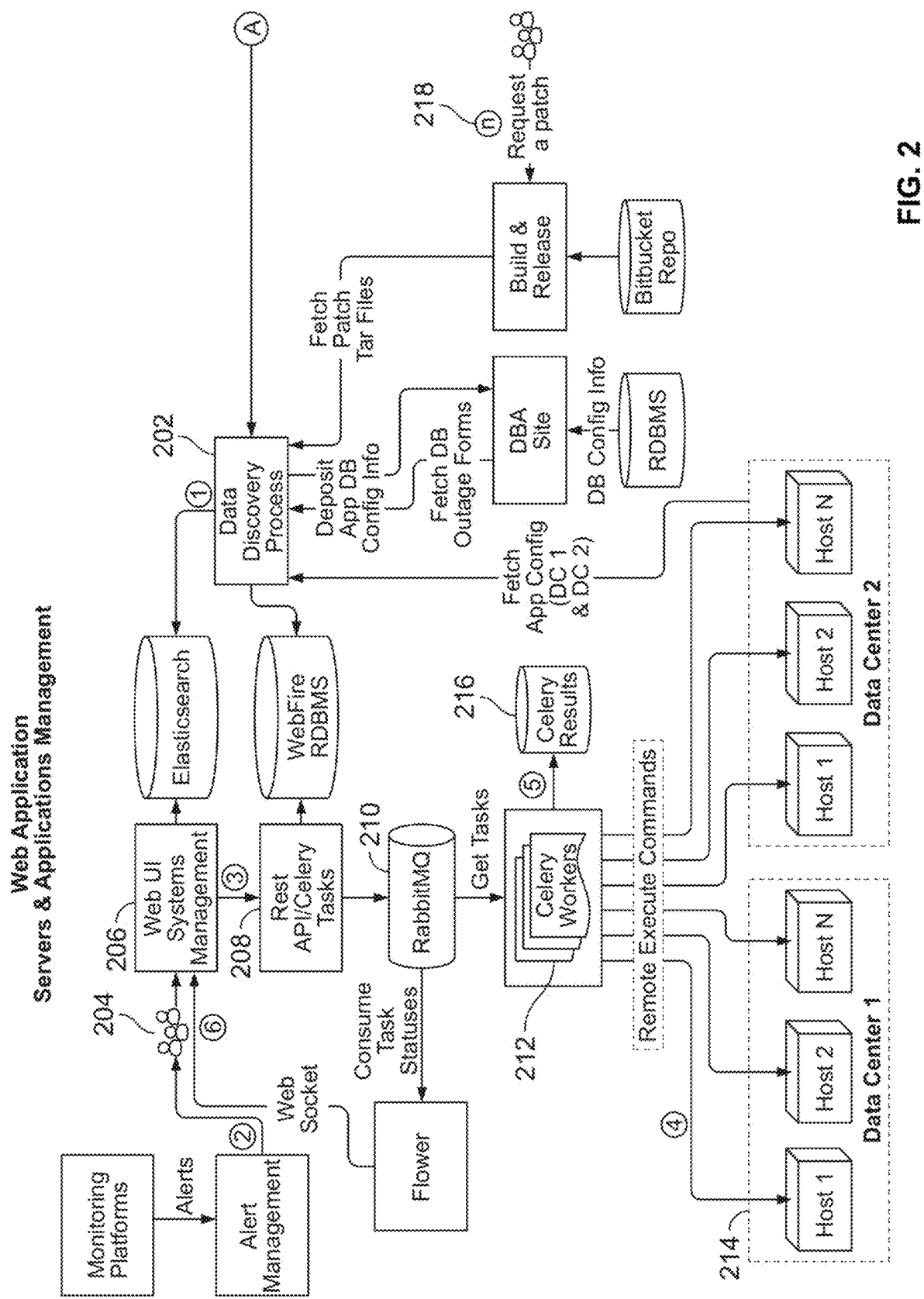
FIG. 2 shows an example system architecture and workflow diagram according to some embodiments of the invention.
Figure 2:
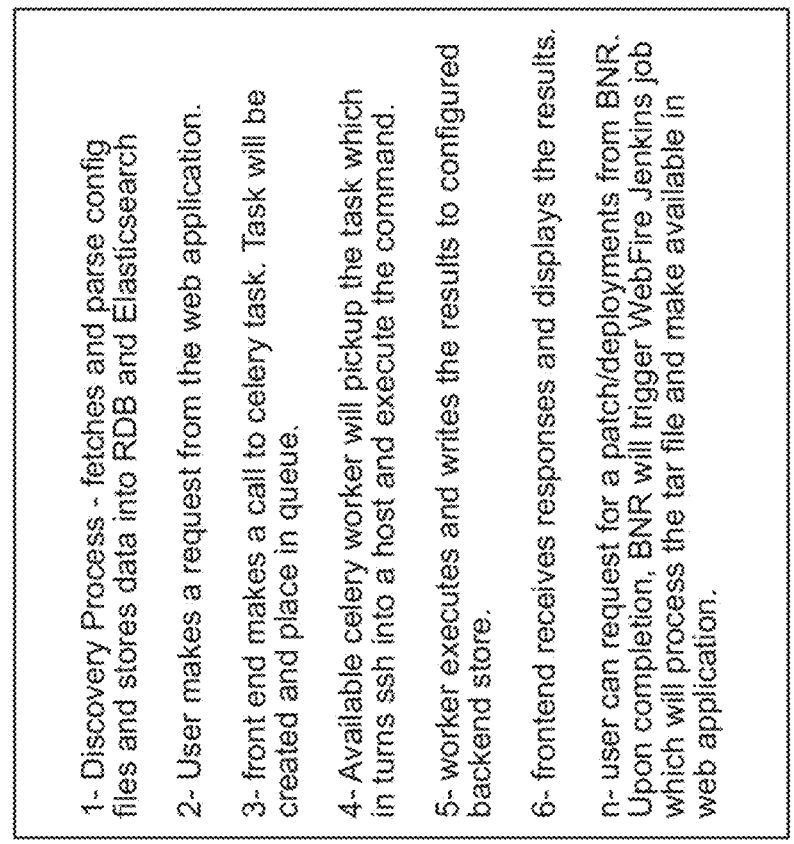
Figure 2:
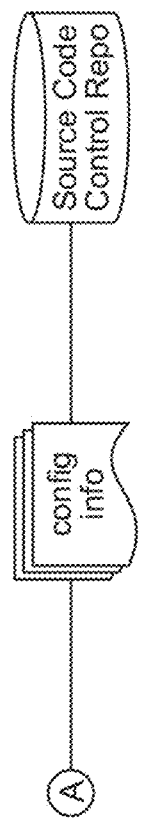

FIG. 2 shows an example system architecture and workflow diagram according to some embodiments of the invention.

A discovery process 202 according to some embodiments may fetch and parse configuration or config files and may store relevant data items or fields in a relational database and/or integrate them into a search engine (such as for example using Elasticsearch). A user 204 may send or transmit a request, e.g., from a web interface or user interface (UI) 206 to perform computerized operations, such as for example send change requests or execute deployment related operations, which may include computerized resource management (such as, e.g., assigning or reassigning task and/or memory loads among server instances), monitoring the status of instances/machines, and the like. The UI or frontend 206 may, for example, request a Celery task 208, and a task may be created and may be placed in an appropriate queue 210 (such as for example a message queue). A Celery worker 212 may receive the task from the queuing system and provide the task to a host 214 for execution. The host, worker or node 214 may execute the task and write results to a dedicated data store 216 (e.g., a backend store), and the UI 206 or frontend may then receive and display the results. In some embodiments, users may send a request initiating a patch or deployment process 218 (for example using a graphical user interface), and the request may be processed and executed for example based on dependencies discovered by some embodiments of the invention, e.g., using an appropriate discovery process. Additional or alternative components and/or operations may be included in different embodiments.

Some embodiments may provide a centralized data repository and data discovery process. ETMeta as used herein may refer to a repository or database (which may be implemented, e.g., as colon-delimited flat-file database) that contains comprehensive data essential for managing computerized resources and systems according to some embodiments of the invention. It may serve as the foundation for a custom system management web application according to some embodiments of the invention.

A node or host as used herein may refer to a computerized unit (such as for example a physical machine or virtual machine) deployed and running within a computerized cluster, which may have its own allocated resources such as for example CPU/GPU cores, memory, storage, and the like (such as for example described with reference to FIG. 1), and which may be used, e.g., as a host for running various computer programs or applications.

A server instance (such as for example an instance described by or associated with EASI keys) may be a virtual or physical machine that runs applications/services within a computer cluster or cloud environment. It may operate as part of a broader infrastructure, where multiple instances in some embodiments run across or may include one or more hosts or nodes, which may provide the underlying physical or virtualized hardware resources (and which may include e.g., physical computer processors and/or memory resources). In an example operational hierarchy according to some embodiments, a server instance may exist at a mid-level abstraction—for example above the raw host/node and below higher-level units like workgroups or clusters. At lower levels, hosts or nodes may provide computational power, networking, and storage, while at higher levels, instances in some embodiments may be managed collectively—for example through orchestration tools, enabling scalable and resilient deployments.

In an example cloud-based computerized cluster or platform according to some embodiments of the invention, a node/host may be a physical server running multiple virtual machines (VMs) or containers that support various services. These nodes in some embodiments may be assigned computerized tasks through a channel, such as a message queue (such as, e.g., the Apache Kafka or ActiveMQ message queueing tools). An instance may be a virtual machine or container running a program or service (e.g., a scientific computation, a fraud detection process, and the like) using one or more channels and nodes/hosts. A workgroup in some embodiments may consist of multiple instances across different nodes—which may, e.g., collaborate and execute tasks in parallel.

Some embodiments may include associating a first server instance with a plurality of keys, each of the plurality of keys defining one or more of: a stage within a software development lifecycle, application information, a middleware type, and an operational capability, wherein each of the plurality of keys refers to a corresponding database.

For example, keys such as EASI keys (referring to environments, application, server, and instance) may be assigned or associated with, or may define or describe a particular or individual server instance or operational layer including a plurality of hosts or nodes. EASI as used herein is an acronym representing an identifier or name of an instance, which may include a plurality of fields, keys, or components, such as for example four components: environment (E), application (A), server(S), and instance (I). These components may be defined in respective tables within ETMeta (which may include, e.g., separate tables, each describing environments, application, server, and instance tables, respectively) and may be associated with, e.g., a server instance. Keys such as, e.g., [E, A, S, I] may act or serve as foreign keys referring to these tables. Foreign keys, in this context, may refer for example to database constraints that establish a link between two databases or tables (e.g., between the "environments" and the "application" tables, such that all four keys of an EASI—describing environments, application, server, and instance—are defined for and associated with a computational unit managed by some embodiments of the invention). An EASI may provide or may be used as a structured identifier for each instance within the cluster.

Nonlimiting example key or EASI components are described in Table 2:

- Environment (E): may specify or describe a stage within a software development lifecycle, such as for example deployment, testing, and the like. Examples: DIT and PRD.
- Application (A): application information may specify or may be associated with, e.g., a username which may be authorized to manage the instance.
- Server(S): may specify or may categorize a type of middleware (and/or of hardware and/or software) which may be used in the environment, such as for example web servers, docker containers, or specific application servers such as, e.g., Tomcat containers. This classification may be used in identifying a specific server type and its role within a system's architecture.
- Instance (I): may specify or may describe a specific, computerized functional unit and/or process within the system-representing a distinct operational or functional capability or service performed by a given system/machine (virtual or physical, or a combination of such)/part of a cluster.

Table 2.

Additional or alternative examples may be used in different embodiments.

Foreign keys (such as for example EASI keys) may define server instances by linking tables that store instance details. For example, in some embodiments, a server/host table or database—which may for example track or monitor hosts/nodes (e.g., physical computing resources) within the cluster—may have a foreign key (e.g., denoted as "S" in EASI) referencing or corresponding to the server/host database's primary key (e.g., an identifier for a given node), which may be used to ensure each instance is associated with a valid host or machine. An example server or host database and example instance database including foreign keys to the hosts table are provided in Tables 3-4:

TABLE 3

| Server ID (Primary Key) | Server Name | Location |
| --- | --- | --- |
| 1 | Server A | US-East |
| 2 | Server B | US-West |
| 3 | Server C | EU-Central |

TABLE 4

| Instance ID | Instance Name | Server ID (Foreign Keys) |
| --- | --- | --- |
| 1 | Server A | 1, 2 |
| 2 | Server B | 3 |

In some embodiments, each foreign key may refer to a single, corresponding primary key or database: for example, the instance database in Table 4 includes a single foreign key (Server ID) corresponding or referring to the host database in Table 3, and does not include additional foreign keys referring to the same host database. The "Server ID" foreign key in the instance database may be said to refer to the server database and its primary key (Server ID), and the latter database and primary key may be said to "correspond" to the foreign key in the instance database. Additional or alternative keys may be used in different embodiments.

"Middleware" as used herein may refer to software components (external to a specific application or software program) acting as intermediaries between different software applications/programs (or mediating between software components within different applications/programs). Middleware may facilitate communication, data exchange, and integration of different software components, e.g., found in separate (and otherwise independent) software applications or units. It may provide services such as authentication, message brokering, or application programming interface (API) management. A middleware type as used herein may refer to a specific category of middleware, such as message-oriented middleware (MOM) such as for example the Apache Kafka or ActiveMQ message queuing tools for event-driven communication, database middleware such as for example the open database connectivity (ODBC) standard for database connectivity, or middleware for remote procedure calls (RPC) such as for example the gRPC protocol. Middleware may contrast with, e.g., end-user applications (e.g., web browsers, email clients) and low-level system software (e.g., operating systems, device drivers), as it may primarily enable interoperability between these layers rather than directly interacting with users or hardware. "Middleware" according to some embodiments may refer to a server or server type. Servers may be classified according to a middleware type, which may identify a server's role within the system's architecture. Nonlimiting examples of middleware based classifications include, e.g., "Oracle Tuxedo" (a middleware platform for distributed, computerized transaction processing), "Apache Tomcat" (an open-source web server and servlet container for running Java-based web applications), "Docker" (a containerization platform that enables developers to package applications and their dependencies into lightweight, portable containers), and the like. Additional or alternative examples may be used in different embodiments.

An "operational capability" of a server instance or EASI as used herein may refer to the instance's ability to perform designated functions based on its resources, configurations, and role within a system. Operational capability may include or refer to processing power, memory allocation, network bandwidth, and software services running on the instance. For example, a web server instance may have the capability to handle 100,000 concurrent requests per second, while a database server instance may support high-throughput transactional processing with automated failover mechanisms. Additionally, a compute-intensive instance may be optimized or have the capacity for machine learning workloads, utilizing graphical processing units (GPUs) to accelerate model training. The operational capability of an instance may be managed through scalability policies, monitoring tools, and workload distribution mechanisms, e.g., to ensure performance and reliability. According to some embodiments, an operational capability or service (described by the letter "I" in EASI) may refer to an instance name or identifier. An instance according to some embodiments may refer to a specific functional unit within the system (such, for example, by a physical server or machine, or by a container, node, or virtual machine, running a specific program or code, and/or performing a specific operational function or functionality). Nonlimiting example operational functions or functionalities may include, e.g., computerized transaction or data transfer processing (including, but not limited to, electronic trading and/or an exchange of data between different computer components remotely connected over a communication network)—which may for example represent a distinct operation or service. Nonlimiting example instance names include, e.g.: "prd:app1:docker:data_transfer_processing" and "prd:app1:docker:data_transfer_confirm", which may describe two different instances of the same application ("app1") of server type docker—each performing a different operational function (e.g., data transfer processing, and confirming a data transfer was performed, respectively). Additional or alternative examples may be used in different embodiments.

Some example database keys or components that may be used as part of a definition of an EASI (and, in some embodiments, may be documented or stored as separate files or databases) according to some embodiments of the invention are provided in Table 5:

TABLE 5

| Key/File | Example Fields | Usage/Description |
| --- | --- | --- |
| deployments | environment:application:server:instance:\<br>node:configuration:start_mode:teams:tag | Source of authority for an application's inventory/hosts<br>Assigns an EASI to a host (node)<br>Assigns a configuration template repository to an EASI<br>Each host may have multiple EASIs assigned |
| packages.linux.intel | environment:application:server:instance:\<br>package:version:os:architecture:tag | Defines software inventory<br>Assigns packages/versions to particular EASIs<br>Allows customization by Operating System or by other assigned deployment tag |

TABLE 5-continued

| Key/File | Example Fields | Usage/Description |
| --- | --- | --- |
| properties | environment:application:server:instance:\host:property:value | Multi-purpose key/value pair assignments, may be used to expand configuration mappings/templates |
| applistmap | myapp:start order(must be an integer):EM application name:EM server name:EM instance | Logical mapping of an application stack that may be used for monitoring, restarting and entire application stack. |
| machines | nodename:description:metagroup:workgroup:interface:master[,...]:os:processor | \Defines the inventory of hosts<br>Node names and descriptions<br>Data center location (metagroup)<br>Workgroup assignment |
| commands | server:configuration:command:command line | Defines list of commands available for a given server (the 'S' in an EASI). A server may have multiple entries/commands. |

Additional or alternative keys or components may be used in different embodiments.

Deployments as used herein may refer to the process of distributing and installing software applications, updates, or patches to various environments, such as development, testing, and production environments, for example, to ensure that the software operates correctly and efficiently. This process may involve configuring the software, verifying its functionality, and making it available for use by end users or other systems.

A data processing and integration component of the system may ensure accurate and efficient management of applications and servers. This process may begin with a discovery phase, where input data may be fetched from multiple units, systems, or data sources. Key fields from each dataset of a plurality of datasets may be extracted and stored in a relational database (RDB) which may be, e.g., a database separate and distinct from the databases from which fields are extracted. In some embodiments, datasets and relevant keys may include or may document information referring to, for example:

Server discovery: may include EASI and host information, which may be crucial for managing resources and deployments.

Application discovery: may include mappings between application, EASI, and host for managing an application stack.

Database dependency discovery: may include mappings from an application's configurations to a database's configurations, as well as metadata for managing dependencies between applications and databases.

Super orchestrator discovery: may document or describe a custom workflow that may include change request management, package information, and flexible deployment strategies (see nonlimiting examples herein).

Message queue or ActiveMQ management discovery: may include or provide logical mappings for ActiveMQ clusters.

An integration phase may involve mapping information (such as for example information processed during a preceding data processing procedure) to the corresponding applications and servers, effectively linking in-house inventory and custom workflows (e.g., using the EASI framework). A comprehensive data processing and integration framework according to some embodiments of the invention may ensure that the system provides a consistent and reliable interface for operational tasks, enabling users to navigate and execute commands seamlessly.

Figure 3:
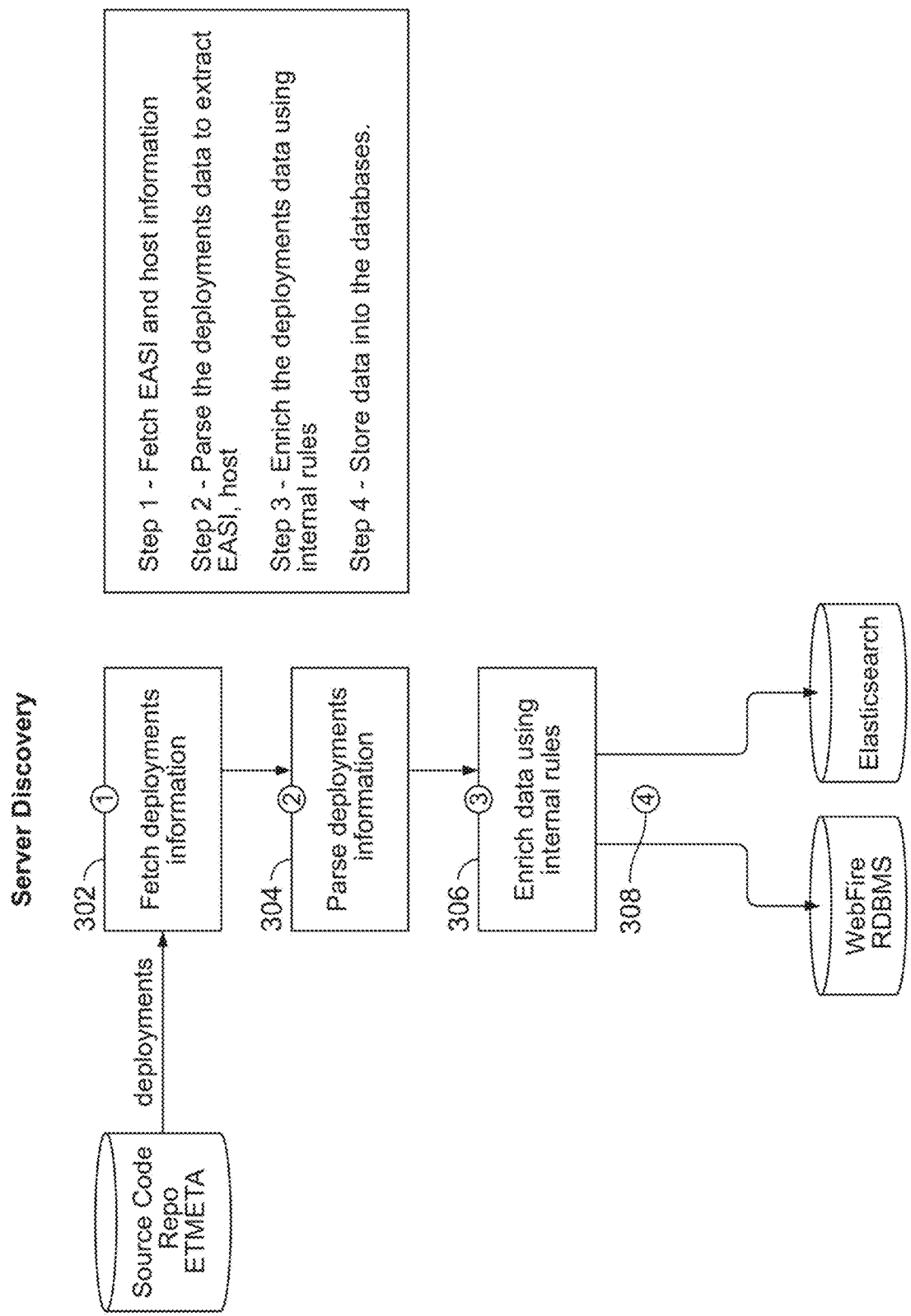
FIG. 3 shows an example server discovery process according to some embodiments of the invention.

FIG. 3 shows an example server discovery process according to some embodiments of the invention.

Server or host discovery according to some embodiments of the invention may enhance visibility into deployment status, work group, and channel. This may be achieved by incorporating additional fields that may be used in linking in-house inventory. A server discovery according to some embodiments may integrate servers/hosts/EASI units by identifying EASI and associated server/host name, and selecting an EASI/host/server or a plurality of such for performing computerized tasks. This may ensure comprehensive data integration and may facilitate efficient management and analysis of deployment processes. According to some embodiments, specifying both EASI and host name (and/or additional fields) may be required and used for executing computerized commands/tasks or automation of such commands/tasks. For example, the EASI name or identifier "prd:app1:docker:data_transfer_processing" may be specified for executing a command or task by that specific EASI, as may be requested or commanded by platforms or consoles according to different embodiments of the invention.

Example operations that may be performed as part of a server discovery process according to some embodiments are provided in Table 6:

TABLE 6

| Operation | Description | File Names | Fields | Inputs | Outputs | Additional Notes |
|---|---|---|---|---|---|---|
| Fetch deployment (depl) and/or EASI and host information 302 | A depl*txt may store some core system inventory data such as EASI and host | depl*.txt | EASI, host | — | depl.txt | Core systems inventory data |
| Parse the depl data 304 | Clean the deployments*txt data and parse to get the EASI, host and additional fields | depl.txt depl.csv | EASI, host mode, type, | depl.txt | depl.0.csv | Formatted depl data |
| Enrich depl data 306 | Use internal rules and logic to inject/create additional fields. | depl.0.csv | EASI, host, mode, type, env, work_group, channel | depl.0.csv | depl.csv | The additional fields may provide visibility into the deployment status, work group, and channel, and may be used for effectively linking in-house which may be managed by EASI or by host/server. |
| Store data into databases 308 | Records Management System (RMS) may store the schemas to scale the inventory data. | depl.csv | EASI, host, mode, type, env, work_group, channel | depl.csv | deployments.json | Data may be stored in both RMS and Elasticsearch. The deployments.json may store data query directly from Elasticsearch. |

According to some embodiments, data or information such as for example EASI and/or host names and/or their properties may be extracted or obtained using a server discovery process. Using a centralized discovery process and database configurations, EASI and host information may be extracted and stored in dedicated database or databases (e.g., within the SMWP platform). Additional or alternative operations may be used in different embodiments.

Figure 4:
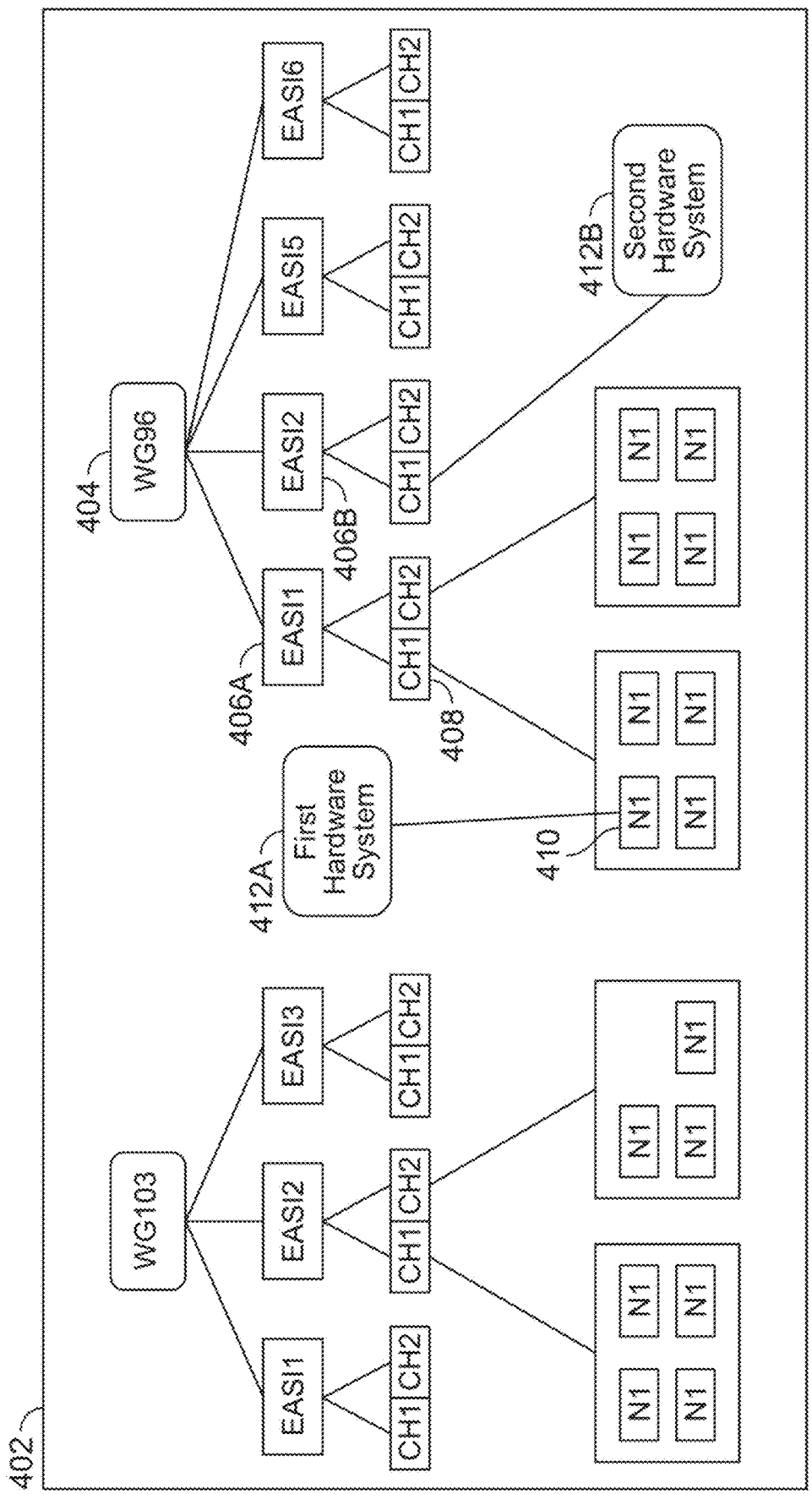
FIG. 4 shows an example operational topology according to some embodiments of the invention.

FIG. 4 shows an example operational topology according to some embodiments of the invention.

An operational topology of computerized entities in a computerized cluster or cloud environment 402 that may be managed by some embodiments of the invention may include, for example, workgroup 404, instance or EASI 406A-B, channel 408, and node or host 410. In some embodiments, a workgroup (WG) 404 may include a plurality of EASI instances—such as for example a first server instance 406A and a second server instance 406B, which may, in turn, include a plurality of channels 408. Channels 408 within a given EASI instance may include one or more nodes or workers 410 which may include, e.g., compute and/or memory resources for performing computerized tasks (such as for example tasks involved in software program testing, deployment, and the like). In some embodiments, instances may be associated with different hardware hosts or machines: for example, first server instance 406A may be associated with, or may include, e.g., channels and/or nodes associated with a first hardware system, server, or machine 412A, and second server instance 406B may be associated with, or may include, e.g., channels and/or nodes associated with a second hardware system, server, or machine 412B, where second hardware system 412B is a computer system physically separate and distinct from first hardware system 412A, and where the two hardware systems may communicate over a data/communication network (some embodiments may perform failover management or task/memory load balancing operations—which may include, e.g., reassigning tasks/memory load from first server or hardware system 412A to second server or hardware system 412B, e.g., in case of failure in first server or hardware system 412A). An operational hierarchy may be used in some embodiments to introduce levels of abstraction to define functional units in the cluster and to facilitate execution of specific tasks by specific functional units. According to some embodiments, computer tasks may be reassigned among instances in a cluster (e.g., from first instance 406A to second instance 406B), for example to shift, balance, or offload task or memory load among the instances and/or as part as database failover management operations.

For instance, an example cloud-based fraud detection system may be managed using an operational hierarchy according to some embodiments, e.g., for efficient processing. A workgroup (such as, e.g., "Fraud Analytics") may include multiple instances (which may be, e.g., Amazon web services (AWS) EC2 servers) handling data ingestion, pattern recognition, and anomaly detection. Channels (such as for example Kafka message queues) may distribute real-time transaction data to and/or within instances, e.g., to ensure smooth task allocation. Each host within an instance and/or channel (which may be, e.g., a physical/virtual machine) may execute specific computations-one may process raw transactions, another may apply machine learning models, and a third may store flagged transactions for review. Additional or alternative functional hierarchies may be used in different embodiments.

Some embodiments of the invention may perform operations to choose a deployment strategy, such as for example: patching odd or even number boxes, shifting traffic, and patching an entire workgroup. According to some embodiments, choosing a deployment strategy may involve performing operations that ensure minimal downtime and risk while updating or deploying applications. One example process may include patching odd or even number servers/instances/nodes, where servers with odd-numbered identifiers may be patched first, followed by even-numbered ones, reducing the likelihood of a full system failure. Another example process may include shifting traffic, which may involve gradually redirecting accesses from old to new versions/deployments using techniques such as for example blue-green deployments, canary releases, or load balancer adjustments to monitor stability before full rollout. In some cases, e.g., for larger-scale updates, patching an entire workgroup may be necessary, where all instances within a workgroup may be upgraded simultaneously, which may require scheduled downtime or redundancy planning. The choice of a specific deployment strategy or process may depend on factors like system criticality, user impact, rollback mechanisms, and infrastructure flexibility.

Some embodiments may include determining application dependencies based on one or more of the plurality of keys associated with server instances (e.g., EASI information associated with an instance or instances).

Figure 5:
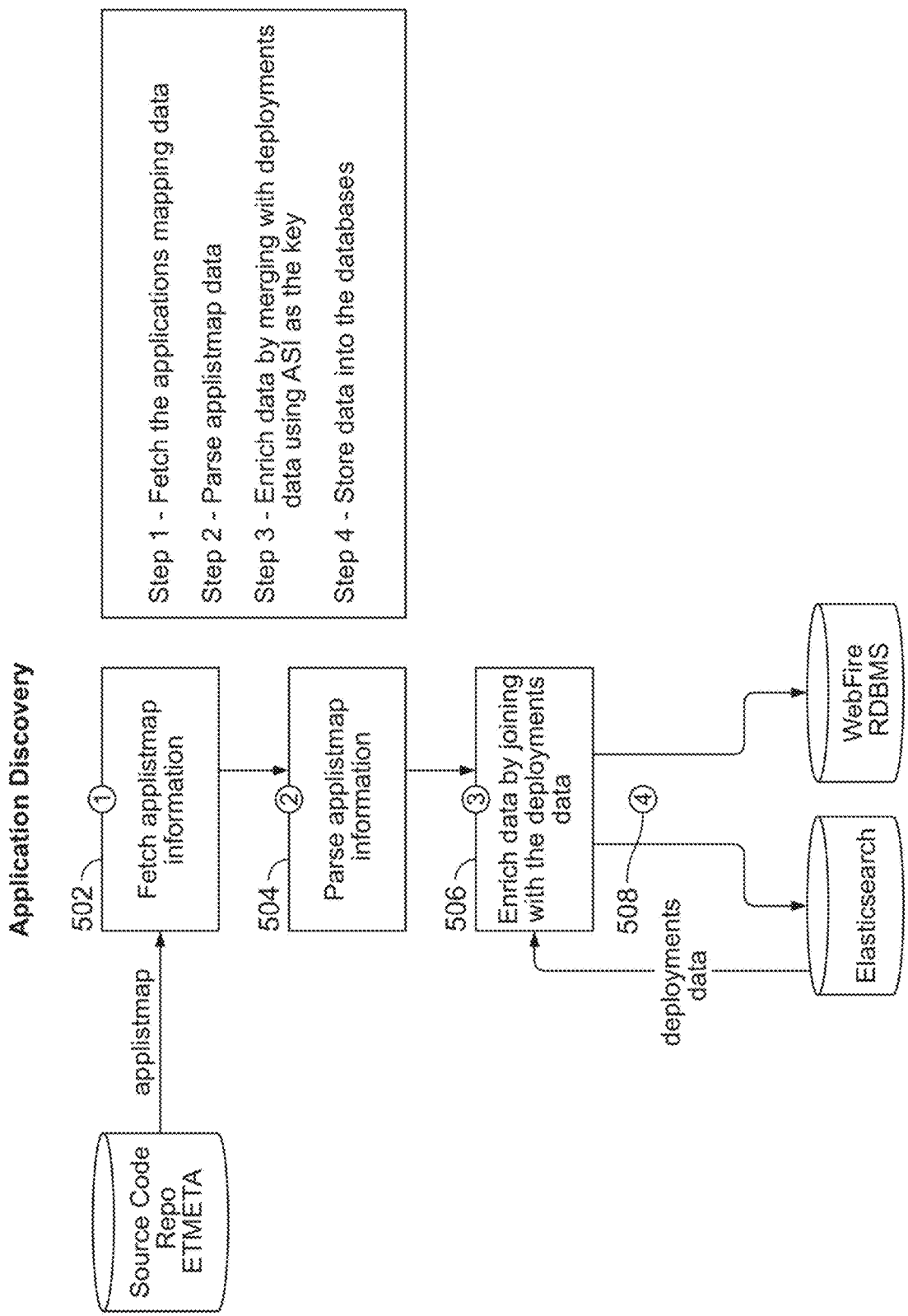
FIG. 5 shows an example application discovery process according to some embodiments of the invention.

FIG. 5 shows an example application discovery process according to some embodiments of the invention.

An application discovery process may determine/generate and/or maintain "applistmap" data, which may include the mapping of an application to its application stack (may be denoted ASI) describing, e.g., dependencies or links between applications. A comprehensive dataset may provide detailed information about each application, including its hierarchical stack level and associated applications, environments, and the like (as, e.g., described by EASI keys and relevant databases). A stack_level may be used in constructing the application's stack hierarchy and determining, e.g., a sequence of restarts, which should be performed in descending order for any given application—for example for preventing operational failures. This mapping may enable the efficient management and integration of applications within a deployment process. In some embodiments, application discovery and the determining or discovering of application dependencies may include, and/or may be performed based on or using EASI entries or keys associated with server instances.

Example operations that may be performed as part of an application discovery process according to some embodiments of the invention are provided in Table 7:

TABLE 7

| Operation | Description | File/Key Names | Fields | Inputs | Outputs | Additional Notes |
|---|---|---|---|---|---|---|
| Fetch applications mapping data 502 | The applistmap data may include the mapping of an application to its ASI, i.e., application stack | applistmap.txt | application_name, description, runbook, stack_level, ASI, | — | applistmap.txt (may be included as EASI keys and relevant databases) | Clean and save to applistmap.txt |
| Parse applistmap data 504 | Parse the text file to retrieve all data described in the data fields. | applistmap.txt | application_name, description, runbook, stack_level, associated EASI keys. | applistmap.txt | applistmap.0.csv | |
| Enrich data 506 | Correlate dataset by ASI with the deployments.csv by ASI | deployments.csv | application_name, description, runbook, stack_level, EASI, environment, | applistmap.0.csv deployments.csv | applistmap.csv | This step may integrate two datasets to generate comprehensive application |

TABLE 7-continued

| Operation | Description | File/Key Names | Fields | Inputs | Outputs | Additional Notes |
|---|---|---|---|---|---|---|
| | | | host, work_group, channel | | | mapping data. The resulting data may include the application_name, all associated ASI that are part of the application, runbook, descriptions, and the host/server. This integration ensures a detailed and complete view of each application's stack, facilitating efficient management and deployment processes. |
| Store data into databases 508 | RMS contains the schemas to support the application mapping data. | applistmap.csv | application_name, description, runbook, stack_level, EASI, environment, host, work_group, channel | applistmap.csv | applistmap.json | Data may be stored in both RMS and Elasticsearch. The applistmap.json contains appmap data query directly from Elasticsearch. Users may query for one more application stack using Elasticsearch filters. |

Additional or alternative operations may be used in different embodiments.

Some embodiments may include determining database dependencies based on one or more of the plurality of keys associated with server instances (e.g., EASI information associated with an instance or instances).

Figure 6:
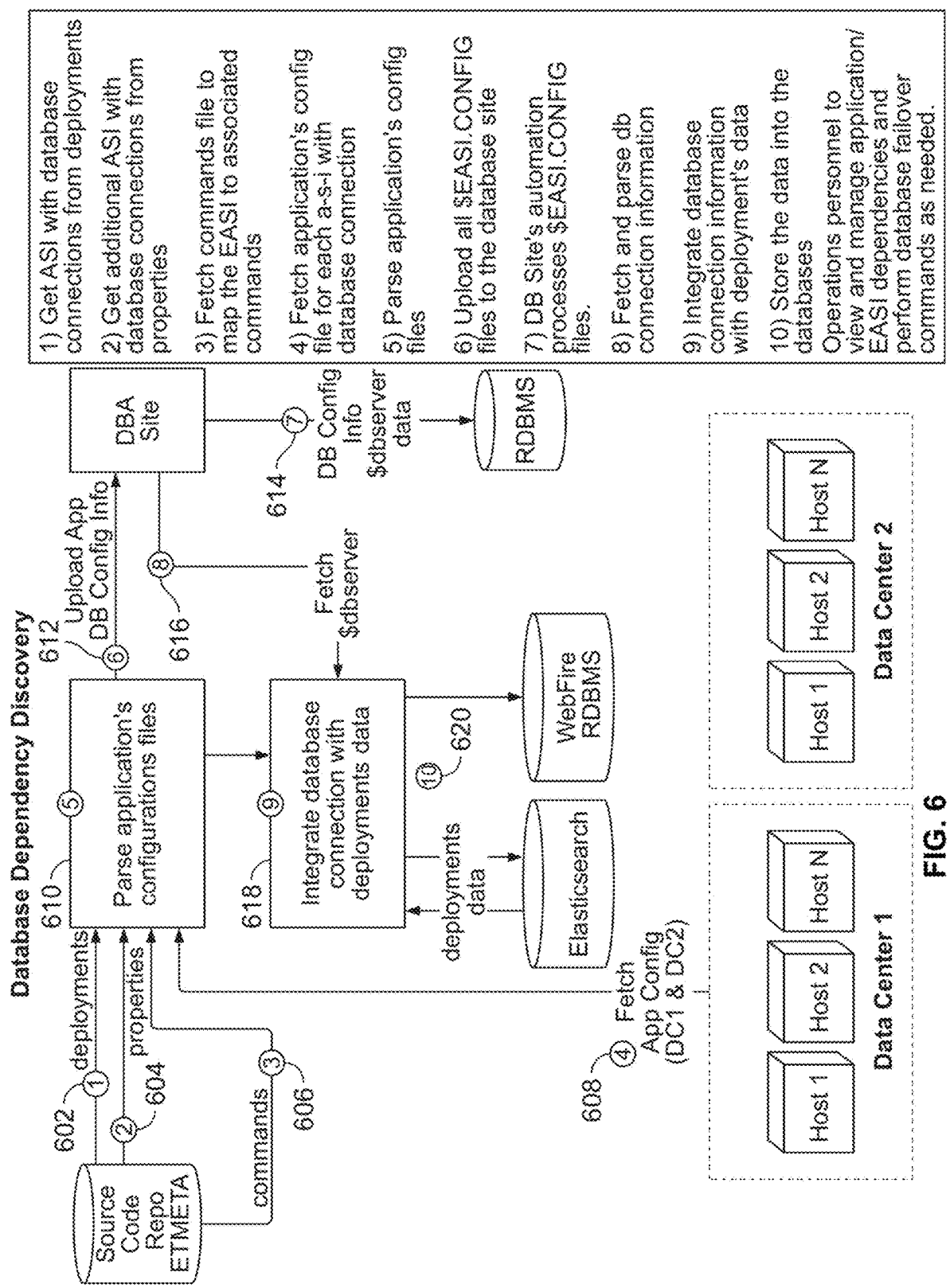
FIG. 6 shows an example database dependency discovery process according to some embodiments of the invention.

FIG. 6 shows an example database dependency discovery process according to some embodiments of the invention.

A database dependency discovery or management process according to some embodiments of the invention may provide visibility into applications' database connections, references, or links. Specifically, it may identify which applications are connecting to or communicating with a given database server. A single database server may host multiple databases, categorized, for example, into physical, logical, and group levels. A logical database may contain one or more groups, and each application may connect to one or more of these groups. In some embodiments the determining or discovering of database dependencies may include, and/ or may be performed based on or using EASI entries or keys assigned to or associated with server instances.

A database dependency discovery process may begin with ETMeta and/or with the deployments file, which may include key or EASI and host information (as, e.g., described by EASI keys and relevant databases). From this file, some embodiments may select all EASI entries that have database connections between them, and may compile a unique list based on the results. In some embodiments, identifying EASI entries with database connections may be performed based on the 'S' in EASI, where 'S' stands for server. Example servers may include, e.g., "s2", "app", and "web". While "web" may have no direct database connection, its internal s2 middleware may connect to databases (DBs). Finding EASI with database connections may be performed based on searching through the ETMeta/properties file. It may include EASI entries with one or more key-value pairs. The process may search through the properties file looking for keywords such as, e.g., DBDOMAIN and DATABASE_*. Results may be added to the list of EASI with database connections.

For each key or EASI in the list, some embodiments may look up the corresponding hostname and, for example, execute or perform an rsync command to fetch the application's configuration. Some embodiments may parse these configuration files to get the resource_name, server_name, logical_db, db_domain, and db_group for each EASI. The parsed application configuration may be uploaded to the database site using a naming convention of the form $EASI-.CONFIG. The database site may process these uploaded configurations and may generate $db_server.csv files, which may include details such as db_server, physical_db, logical_db, db_group, and EASI.

Some embodiments may fetch all database description (e.g., $db_server.csv) files from the database site and may populate the data into the appropriate relational database and/or into a search engine such as for example Elasticsearch. A frontend may provide a "manage database dependency" view or interface, displaying or presenting database servers and/or tasks or processes running on them. Operations personnel or users may view and manage application/EASI dependencies that may be filtered or organized, for example, by the following keywords or criteria: db_server, logical_db, physical_db, db_group, or EASI. In addition to viewing the dependencies for any given db_server, logical_db, physical_db, or db_group, users may select and perform database failover commands as needed. This structured approach provided by some embodiments of the invention may enable efficient management and monitoring of database dependencies, facilitating smooth operations and quick response to any issues and risks that may arise.

Some example operations that may be performed as part of a database dependency discovery process according to some embodiments of the invention are provided in Table 8:

TABLE 8

| Operation | Description | File Names | Fields | Inputs | Outputs | Additional Notes |
|---|---|---|---|---|---|---|
| Get ASI with database connections from depl 602 | Use the S in the ASI to get list of ASI that have database connections | depl.txt | EASI keys or entries | — | ASI.0.txt | ASI, the S stands for server and may be used to identify middleware/ framework types. Examples: s2, app, docker |
| Get Additional ASI with database connections from properties 604 | properties file contains key and value and there are several keys that are used for database configuration | proper\ ties.txt | EASI, key, value | — | ASI.1.txt | Sample entry with format: EASI, key, value EASI, DB_DOMAIN, DOMAINAB CW33 |
| Get commands file to map commands server to EA(Server)I 606 | Map the AServer I from ASI.db.0.txt list to command's server to get list of commands | com\ mands.txt ASI.0.txt ASI.1.txt | server, configuration, command, command_line EASI | — | ASI.\ commands.txt | Intelligent Commands Mapping command's server → command is one to many as instance can have many commands. |
| Fetch application's config file for each ASI with database connection 608 | Lookup the host name for each ASI in order to fetch the dynamic applications's config file | ASI.0.txt ASI.1.txt depl.txt | EASI, host | ASI.0.txt ASI.1.txt depl.txt | List of folders/ directories with this naming convention: $EASI: *.config *properties | Retrive all relevant application config files to be used to get database connection information. The application config files come in multiple formats. |
| Parse application's config files 610 | Apply multiple parsers to process the applications' | $EASI: *.config *properties | resource_name, server_name, logical_db, db_domain, db_group | Directory where all $EASI's application can be | List of all parsed config files with this naming | This step is crucial as it bridges the gap between multiple generations of |

TABLE 8-continued

| Operation | Description | File Names | Fields | Inputs | Outputs | Additional Notes |
|---|---|---|---|---|---|---|
| | config files to get the database connection information. | | | found | convention: $EASI.CONFIG | applicaiton configurations. It addressed the challenges posed by different frameworks, computer languages, and configuration management systems. By accurately mapping database dependencies, this step ensures seamless integration and compatibility, facilitating effective application and database connection management. |
| Upload all $e-a-s-i.CONFIG files to the database site 612 | Nightly process that uploads parsed configuration files to the database site as part of the workflow. | $EASI.\CONFIG files | resource_name, server_name, logical_db, db_domain, db_group | None | Uploaded $EASI.CONFIG files on the database site's server | The process may follow the SDLC, each environment has its own associated server. The upload process involves placing the config files to the corresponding server for each environment: SIT, DIT, UAT, DR, PRD. |
| Database site processes $EASI.CONFIG files. 614 | Nightly process on the database (DB) site to process the database config files. It integrates the application $EASI.CONFIG files with database's configuration. | $EASI.\CONFIG files database config information | db_server, physical_db, server_name, logical_db, db_domain, db_group, EASI | $db_server.txt | List of $db_server.txt, one per database server. $db_server.txt | DB site may include detailed information and may map the given DB_DOMAIN to the appropriate physical and logical db and db_server. It generates db connection info for each of the db_server. |
| Fetch and parse db connection information 616 | Our process needs to get the complete application's database configuration from the database site. | $db_server.txt $db_server.csv | db_server, physical_db, logical_db, db_group, EASI | $db_server.txt | db_connection_data.0.csv | Complete db connection information for all EASI with db connections. |
| Integrate database connection | correlate dataset with the | db_connection_data.0.csv deplcsv | db_server, physical_db, logical_db, | db_connection_data.0.csv depl.csv | app_db_data.csv | All applications with database |

TABLE 8-continued

| Operation | Description | File Names | Fields | Inputs | Outputs | Additional Notes |
|---|---|---|---|---|---|---|
| information with deployment's data 618 | deployments.csv using EASI as the key | ASI.\ commands.txt | db_group, EASI, environment, host, mode, work_group, channel, command, command_line | | | connections may be integrated with deployment's information. |
| Store the data into the databases 620 | Complete applications' database connections are stored in both RMS and Elasticsearch. | app_db_ data.csv | db_server, physical_db, logical_db, db_group, EASI, environment, host, mode, work_group, channel | app_db_ data.csv | app_db_ data.json | Generated data may be indexed in Elasticsearch. index: app_db_data Data is also stored in RMS app_db_data.json contains data for one more $dbserver based on the search query. |

Additional or alternative operations may be used in different embodiments.

According to some embodiments, database information (including, for example, server/host data, EASI data, and additional data and information described herein) may be stored in a relational database and/or in a search engine such as for example the Elasticsearch engine. Some or all of the databases described herein may be established or constructed as part of a database dependency discovery. For example, a dedicated database dependency representational state transfer (REST) endpoint may include or may provide the integrated data required for database management and/or orchestration processes: all EASI/hosts connected, for example, to a given database server may be discovered and integrated into relevant databases. Some example data and/or information items that may be extracted or organized using a database dependency REST endpoint are provided in Tables 9-10:

TABLE 9

```
api/dbdependency/
{
  "count": 85604,
  "next":
"http://app15w607m3.etrade.com:8000/api/dbdependency/?db_server=db171w607m3&li
mit=100&offset=100",
  "previous": null,
  "results": [
  {
  "id": 114908204,
    "dbserver":"db101w101m1",
    "logical_db":"AuthenDB_ro",
    "physical_db": "AuthenDB",
    "db_group":"GRP_AuthenDB_ro",
    "db_group_id":3,
    "easi":"prd:rb:s2:user",
    "node":"tp427w101m1",
    "workgroup":"w101",
    "datacenter":"m1",
    "dbtype":"sybase",
    "command_type":"pop",
    "easi_id":12175,
    "channel":1,
    "es_em_id":"03aec5739218af88842762a5f7123473395f14dd",
    "mode":"PP",
    "discovery_type":"standard"
  }
  {
  ...
  }
  ]
```

TABLE 10

(Nonlimiting example data in .csv format:)
{"id": 114908204,"dbserver":"db101w101m1","logical_db":"AuthenDB_ro","physical_db":
"AuthenDB","db_group":"GRP_AuthenDB_ro","db_group_id":3,"easi":"prd:rb:s2:user",
"node":"tp426w101m1","workgroup":"w101","datacenter":"m1","dbtype":"sybase","co
mmand_type":"pop","easi_id":12175,"channel":1,"es_em_id":"be1df80f2085c4ba62be8f
107edd95e7e882a6e1","mode":"PP","discovery_type":"standard"}
{"id":114908205,"dbserver":"db101w101m1","logical_db":"AuthenDB_ro","physical_db:"
"AuthenDB","db_group":"GRP_AuthenDB_ro","db_group_id":3,"easi":"prd:rb:s2:user",
"node":"tp427w101m1","workgroup":"w101", "datacenter":"m1", "dbtype":"sybase","co
mmand_type":"pop","easi_id":12175,"channel":1,"es_em_id":"03aec5739218af8884276
2a5f7123473395f14dd","mode":"PP","discovery_type":"standard"}
{"id":114908206,"dbserver":"db101w101m1","logical_db":"FactDB_ro","physical_db":
"FactDB","db_group":"GRP_FactDB","db_group_id":67,"easi":"prd:etcommon:s2:cspsvc",
"node":"tp230w107m1","workgroup":"w107","datacenter":"m1","dbtype":"sybase","co
mmand_type":"pop","easi_id":11419,"channel":1,"es_em_id":"a4389cdb14f7529363761
2e4268c980030aa88c8","mode":"PP","discovery_type":"standard"}

Additional or alternative data and/or information items may be extracted and/or managed by different embodiments.

A user interface according to some embodiments may display database dependency and/or management information—e.g., for a given database server. This information may be further filtered by various criteria such as for example database types or features (e.g., logical_db, physical_db, db_group, etc.) which, in some embodiments, may be organized as columns in the database(s).

Some embodiments may include executing one or more computer tasks within a computer cluster based on the one or more determined dependencies (where, e.g., the computer cluster includes instances associated with key or EASI information describing dependencies).

For example, during application deployment, various computer tasks may be performed or executed by some embodiments to ensure proper functionality, scalability, and resource allocation. These tasks may include provisioning and configuring virtual machines or containers (e.g., using appropriate tools and/or platforms such as for example the Terraform, Kubernetes, or Docker tools or equivalents), setting up load balancers (e.g., Nginx, AWS elastic load balancing (ELB)), initializing and migrating databases (e.g., running schema migrations with Flyway or Liquibase), and configuring application programming interface (API) gateways (e.g., AWS API Gateway, Kong).

In some embodiments, the computer cluster includes a second server instance, and the executing of the one or more computer tasks includes reassigning one or more of the computer tasks from the first server instance to a second server instance based on: one or more of the determined dependencies, and a second plurality of keys, wherein the second plurality of keys is associated with the second server instance.

Some embodiments may perform task reassignment operations between computerized instances or server instances (e.g., between a first computerized server instance and a second computerized server instance), e.g., in a computer cluster or computerized cloud environment based on application and database dependencies (such as, e.g., described or documented in EASI keys/information and corresponding databases corresponding to the first instance and the second instance, respectively). In some embodiments this may include monitoring system metrics (e.g., CPU, memory, I/O usage, for example using tools such as the Prometheus or Datadog tools). For example, when tasks or jobs (e.g., Celery or Sidekiq jobs) or a microservice (e.g., deployed via Kubernetes pods) running on a first instance experiences high load or requires closer proximity to a database, orchestration tools according to some embodiments may dynamically reassign or offloading relevant tasks and/or transfer database entries to a second instance with better resource availability or lower network latency compared to the first server instance. In some embodiments, reassignment may be automated through, e.g., autoscaling policies, load-aware scheduling, and dependency-aware workload placement strategies to optimize application performance and resilience.

In some embodiments, reassigning one or more of the computer tasks (e.g., from a first server instance to a second server instance) may reduce a computerized task load and/or a memory load from a server instance (e.g., from the first server instance).

Some embodiments may perform task reassignment or offloading operations between a first computerized server instance and a second computerized server instance where, e.g., the first server instance is associated with a first hardware host, and wherein the second server instance is associated with a second hardware host. For example, if a first server instance, associated with a first hardware host or system, is experiencing overheating and/or high CPU usage/task load or memory consumption/load due to an unexpectedly high workload, some embodiments may automatically migrate specific tasks or memory loads to a second server instance located on a different hardware host/system. Such a reassignment may ensure that resource-intensive operations, such as database queries or heavy computation, are offloaded to the second server instance, which may have more available resources. Thus, dynamic task reassignment or offloading processes according to some embodiments may help maintain optimal system performance, prevent server overload or reduce task or memory loads from relevant servers, instances, or hosts, and ensure a seamless user experience without manual intervention. Such operations may be managed by an orchestrator or super orchestrator according to some embodiments that may monitor resource metrics and EASI information and automate the redistribution of tasks in real time based on predefined thresholds.

A nonlimiting example workflow for assigning or reassigning processes or tasks and/or for handling overloaded instances (for example using or based on real-time EASI information) is provided in Table 11:

1. Monitoring and Data Collection
   Visible information may include, e.g.: real-time metrics such as for example CPU usage, memory usage, task queue length, and EASI information.
   How Information is Received:
   Metrics may be collected, e.g., using monitoring tools such as for example the Prometheus and/or Nagios system monitoring tools.

EASI information may be fetched from a centralized configuration database and updated in real-time, for example using a dedicated REST API.

2. Manual Evaluation and Decision Making

Visible information may include, e.g.: current load on each server/instance/EASI, threshold limits for CPU and memory usage (which may be for example predetermined or preconfigured), current task or message queue lengths.

How Information is Received:

Metrics/alerts may be pulled or extracted periodically (e.g., every X minutes, where for example X=30) from relevant databases established using the monitoring tools for the relevant server/instance/EASI.

EASI information may be queried from the EASI or configurations database.

Decision Making:

In some embodiments, in case thresholds for resource use (e.g., processing, memory usage, and the like) are exceeded for a given server/instance/EASI, remedial automated actions may be executed to mitigate the load, such as for example to reduce number of processes or scaling up resources (which may include, e.g., adding processing cores or memory components to the relevant instance or EASI). Some embodiments may accordingly scale up or scale down the number of processes assigned to a server/instance/EASI in order to balance task/memory loads effectively. For example, upon exceeding a threshold T=8 GB for memory use, some embodiments may automatically reassign or reschedule one or more computer tasks or processes—such as for example tasks pending in a message or task queue—from a first instance or EASI "prd:app1:docker:optimization_calculations1" to a second, different instance or EASI "prd:app1:docker:optimization_calculations2". The first and second instances or virtual machines between which tasks are reassigned may, for example, be executing on different physical servers and/or in different data centers. In another example, if threshold T is exceeded, some embodiments may pause or terminate one or more of the tasks being executed on the first instance and reschedule the paused/terminated tasks to the second instance. In case threshold T is not exceeded, some embodiments may not interrupt, reassign or reschedule tasks running on the first instance, and let the tasks reach completion. Task reassignment and scheduling may be performed using the Celery and/or Kubernetes frameworks; however, additional or alternative task management and orchestration tools may be used in different embodiments.

In some embodiments, a system administrator may manually evaluate the collected metrics against predefined thresholds and decide on the remedial actions to be performed.

Table 11.

Additional or alternative operations may be performed as part of a process for assigning or reassigning task/process/memory loads according to different embodiments.

Figure 7:
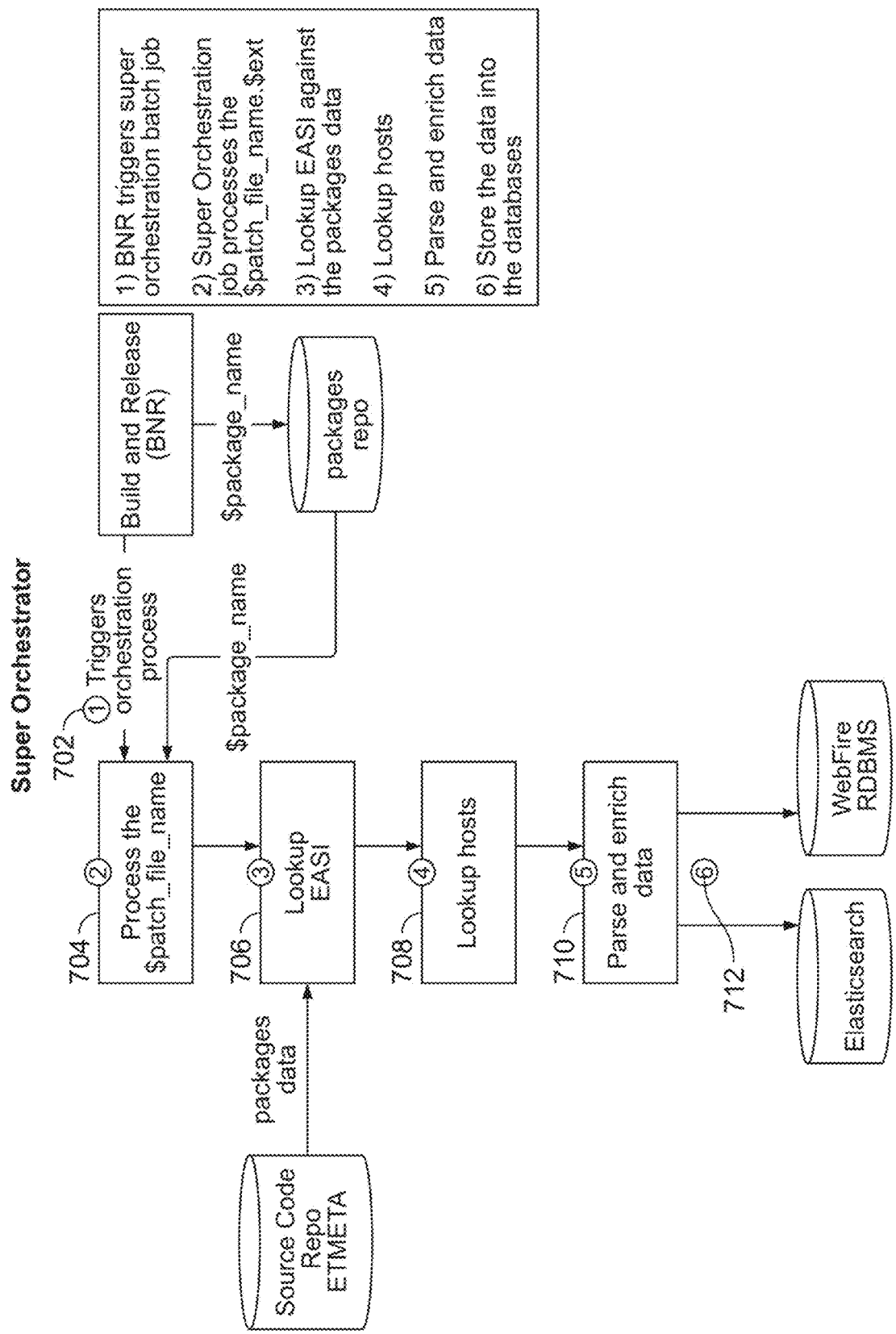
FIG. 7 shows an example super orchestrator discovery process according to some embodiments of the invention.

FIG. 7 shows an example super orchestrator discovery process according to some embodiments of the invention.

As part of orchestration or super orchestration according to some embodiments, a variety of computerized operations may be executed or performed, e.g., to automate and coordinate the deployment, management, and scaling of applications across distributed environments. For example, this may involve setting up network policies to control traffic flow between microservices and/or task reassignment between nodes/instances, configuring persistent storage using dynamic volume provisioning, and managing container health checks to ensure services are running correctly. It may also include automating rolling updates to application services, reassigning and executing workloads based on resource utilization metrics, performing automated backups of databases, and triggering scaling actions through cloud service providers (e.g., AWS Auto Scaling, Microsoft Azure VM Scale Sets, and the like) to accommodate varying traffic patterns. Additionally, orchestration tools such as for example the Ansible or Terraform tools may execute or perform configuration management tasks, such as installing libraries, patching servers, and setting up environments for continuous integration/continuous deployment (CI/CD) pipelines.

According to some embodiments, orchestration and/or super orchestration processes may include a backend discovery process, where one or more data sources may be fetched and parsed, e.g., according to the format of ETMeta and/or the relevant server/host/EASI information. In some embodiments, the data may be stored in relational database, for example in CSV, and JSON formats. Data extracted and/or parsed may result, e.g., from various processes or procedures described herein, such as for example server discovery, application discovery, database dependency discovery, and ActiveMQ management discovery processes.

Change requests or commands as used herein may refer to computerized requests to modify or update components within an application or infrastructure (and/or, e.g., within a deployment environment or a different environment), which may initiate when new requirements, issues, or optimizations arise. These requests may be tracked and documented in dedicated databases, e.g., to ensure proper approval and oversight. Some embodiments may use 3-day change requests/commands—which may be a specific type of change request expected to be reviewed, implemented, and tested within a 3-day window—which may be used for example for time-sensitive updates that need to be completed quickly but still require some level of planning and coordination. In some embodiments, these change requests or commands may involve computerized tasks such as for example deploying patches to address security vulnerabilities, upgrading software versions, or reconfiguring infrastructure components. In some embodiments, change requests may be automated and managed through orchestration tools such as, e.g., the Jenkins and/or Ansible tools, which may ensure that changes are applied across multiple systems consistently, with minimal disruption, and within the defined time frame.

In some embodiments, when a new patch is created, a patch generation process may include performing or executing an HTTP POST to a dedicated patch REST endpoint. This may be described by a corresponding database record, which may be created in the SMWP database or databases. The patch endpoint may also include a REST hook that may trigger a patch discovery process. The information in the patch may include, for example, a change request number or identifier (CR), package name, version number, Jira ticket (e.g., by the Jira Software or service desk queue), and the like. A super orchestrator discovery process according to some embodiments may map patches to relevant EASIs and hostnames. A dedicated UI patch dashboard may display available patches by pulling the information from the patch endpoint. There may be a one-to-many mapping from each patch to its associated patch entries. The patch entries may be, for example, in JSON format and may be stored in SMWP databases and/or Elasticsearch. From the patch dashboard, a user may select a change request, and the UI may pull the patch entries for the selected change request from Elasticsearch. Specific patches may be deployed and/or managed according to the various processes and operations described herein. Additional or alternative operations may be used in different embodiments.

An algorithm or workflow for emergency and change requests/commands may provide a consistent interface, e.g., for operations teams, or for multiple such teams. Some embodiments may translate and verify change requests, map EASI entries, retrieve package information, and allow for automatic execution of computer tasks within a computer cluster, for example based on determined dependencies (such as, e.g., application dependencies and/or database dependencies among instances within the cluster). Some computer tasks executed/performed and/or orchestrated by some embodiments may include the selection and customization of deployment strategies. Key features according to some embodiments may include, for example, a consistent facade for users or operations personal that may hide the underlying automation infrastructure, communication using a given company's or organization's specific change management terminology, translation and verification of change requests (CRs) and/or additional requests or tickets (such as for example tickets used within a project management platform such the JIRA software platform), mapping EASI entries (e.g., determined for or associated with one or more instances within the cluster) into host lists and change groups, and retrieving package information from the package server. Additionally, the algorithm may allow users or operations personal to choose a deployment strategy, preview and customize change sets, and execute/perform deployments, e.g., with a single click on a dedicated UI-once changes are reviewed and approved.

Super orchestration as used herein may refer to the automated coordination and management of multiple orchestration systems, e.g., to optimize resource allocation, workload distribution, and system performance. By intelligently scheduling updates and dynamically rerouting or reassigning tasks across different instances, super orchestration according to some embodiments may allow for minimizing patches without disrupting the system or clusters, which may ensure that updates are applied in a rolling manner or to redundant components while maintaining continuous availability and stability.

Some example operations that may be performed as part of a super orchestrator discovery process according to some embodiments of the invention are provided in Table 12:

TABLE 12

| Operation | Description | File Names | Fields | Inputs | Outputs | Additional Notes |
|---|---|---|---|---|---|---|
| A "build and release" (BNR) process or different process triggers super orchestration batch job 702 | A "build and release" or compiling process may generate a package for deployments which triggers our super orchestration data discovery job | $patch_file name\.$ext | | CR, JIRA, bitbucket module | $patch_file_ name\.$ext | A user/developer may initiate a change request and changes may be built and stored in $patch_file_ name.$ext |
| Super Orchestration job may process the $patch_file_ name.$ext 704 | The batch job receives the new package to be deployed. It parses the patch file name for information. | $patch_file_ name\.$ext | package_ name, package_ version, CR, JIRA | $patch_file_ name.$ext | package_ name, package_ version, CR, JIRA, timestamp | $patch_file_ name.\$ext follows this file naming convention: $package_name.\ $version.\ $CR.\ $JIRA.$ext |
| Lookup EASI | EASI and/or dependency information may be required in order to determine where the package can be deployed. The package_name will be used to do a lookup from the ETMETA packages data. | $package_ name.\ $version packages.\ linux.intel* | package_ name, package_ version CR, JIRA, create_date package_ name, package_ version, EASI | $patch_file_ name\.$ext Packages. linux.intel | $patch_ data.0.csv | patch_data.csv contains: package_name, package_version, EASI,, create_date, JIRA, CR |

TABLE 12-continued

| Operation | Description | File Names | Fields | Inputs | Outputs | Additional Notes |
|---|---|---|---|---|---|---|
| Lookup hosts 708 | host may also be required for the execution of the super orchestration. | $patch_data.0.csv deployments* | package_name, package_version, CR, JIRA, create_date, EASI EASI, host workgroup, channel | $patch-data.csv deployments* | $patch_data.1.csv | patch_data.1.csv contains: package_name, package_version, CR, JIRA, create_date, EASI, host |
| Parse and enrich data 710 | Based on the provided EASI and host, we use internal rules and logic to generate additional data fields: workgroup and channel, for flexible deployment strategies | $patch_data.1.csv | | $patch-data.1.csv | $patch_data.csv | Final dataset for one super orchestration: package_name, package_version. CR, JIRA, create_date, EASI, host, workgroup, channel |
| Store the data into databases 712 | Each $patch_file_name. $ext will have an associated $patch_data. csv where an orchestration may be identified by the file naming convention $package_name.\ $version$CR.\ $JIRA.\ $ext | | package_name, package_version, CR, JIRA, create_date, EASI, host, workgroup, channel | | super_orchestration.json | Generated data may be indexed to Elasticsearch. index: super_orchestration package_name, package_version, CR, JIRA, create_date, EASI, host, workgroup, channel Data is also stored in RMS super_orchestration.json contains data for one more $patch_file_name. $ext based on the search query. |

Additional or alternative operations may be used in different embodiments.

Figure 8:
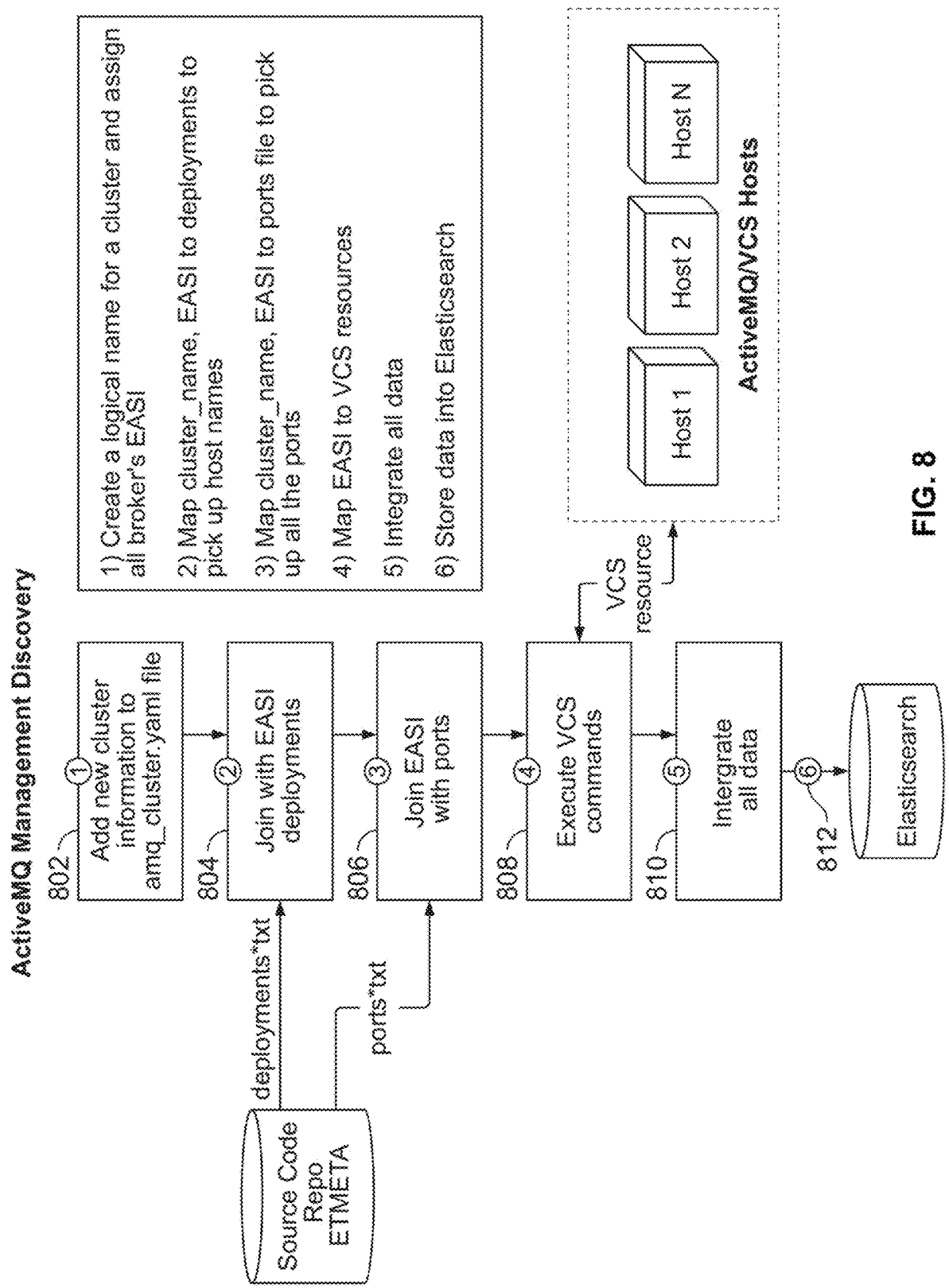
FIG. 8 shows an example active message queue (MQ) management discovery process according to some embodiments of the invention.

FIG. 8 shows an example active message queue (MQ) management discovery process according to some embodiments of the invention.

As the number of message queues used within a cluster environment (such as for example ActiveMQ clusters) grows, e.g., (e.g., from 2-3 clusters to over 10 clusters), there may be a need to provide a simple, integrated way to manage them. An ActiveMQ cluster may include, for example, one or more message brokers connecting to or communicating with each other, for example, via master-slave or network-of-brokers communication protocols or relationships. Each cluster may be dedicated to a specific functional area. ActiveMQ management according to some embodiments may provide a logical mapping of an EASI to its cluster. The cluster name may be a unique text string that may help operations and development teams identify their ActiveMQ brokers. Other data may include master, slave, multiple ports required to manage the brokers, and the like.

Some embodiments may ensure the availability of applications and services by clustering multiple servers together. If one server, instance, or host in the cluster fails, the workload may automatically be transferred to another instance, or host in the cluster, minimizing downtime and ensuring continuous operation. In some embodiments, this may be achieved, for example, using a VCS (Veritas Cluster Server) cluster—which may refer to a high-availability cluster software solution developed by Veritas Technologies.

Example operations that may be performed as part of an active message queue (MQ) management process according to some embodiments of the invention are provided in Table 13:

TABLE 13

| Operation | Description | File Names | Fields | Inputs | Outputs | Additional Notes |
|---|---|---|---|---|---|---|
| Create a logical name for a cluster and assign all broker's EASI 802 | Update amq_clusters.yml and add the new logical_name and its associated ActiveMQ broker EASI. This file may include all logical_name and EASI info for all ActiveMQ | amq_clusters.yml | cluster_name, EASI | logical_name EASI | amq_cluster.yml | May be performed as a manual step |
| Map cluster_name, EASI to deployments to pick up the hosts 804 | | amq_cluster.yml deployments.txt | cluster_name, EASI, host | amq_cluster.yml deployments.txt | activemq_data.0.csv | |
| Map cluster_name, EASI to ports file to get all the ports 806 | | amq_cluster.yml ports.txt | cluster_name, EASI, admin_port, stomp_port, jms_port, openwire_port | amq_cluster.yml ports.txt | activemq_data.1.csv | |
| Map EASI to VCS resource 808 | Execute VCS command which on VCS hosts to get VCS resource information | amq_cluster.yaml | EASI, host, vcs_resource | activemq_data.0.csv | activemq_data.2.csv | This may be applicable for production where VCS is available. The resource information is required to run VCS commands. |
| Integrate data 810 | Join all datasets by EASI and generate the final ActiveMQ Mgmt data | activemq_data.0.csv activemq_data.1.csv activemq_data.2.csv | cluster_name, EASI, admin_port, stomp_port, jmx_port, openwire_port, host, vcs_resource | activemq_data.0.csv activemq_data.1.csv | activemq_data.csv | |
| Store the data in the database 812 | Index data to Elasticsearch. UI will fetch and display all ActiveMQ clusters along with all fields as described in Fields column above | activemq_data.csv | cluster_name, EASI, admin_port, stomp_port, jms_port, openwire_port, host, vcs_resource | activemq_data.csv | Elasticsearch index activemq_cluster | The SMWP UI for ActiveMQ Management may provide ability to filter by cluster_name, EASI. |

Additional or alternative operations may be used in different embodiments.

A super orchestrator according to some embodiments of the invention may streamline workflows for emergency and change requests (such as for example 3-day change requests), which may involve multiple teams and provide a coherent interface for users (such as, e.g., system administrators, operations personnel, and the like). According to some embodiments, a super orchestrator may translate and verify change requests, map key (e.g., EASI) entries, retrieve package information, and allow for the selection and customization of deployment strategies.

A super orchestrator according to some embodiments of the invention may provide the nonlimiting example features described in Table 14:
- Consistent facade for users/operations personnel or administrators: some embodiments may provide a unified interface that may abstract underlying automation infrastructure.
- Communication using company-specific terminology: some embodiments may ensure all communications are performed using the company's specific change management language.
- Translation and verification: some embodiments may translate and verify change requests (CRs) and, e.g., JIRA tickets (e.g., issues tracked within the JIRA software or platform) or similar tickets.
- Mapping key or EASI entries: some embodiments may map EASI entries into host lists and change groups.
- Package information retrieval: some embodiments may retrieve package information, e.g. from the relevant server (e.g., a package server).
- Deployment strategy selection: some embodiments may allow users to choose and customize deployment strategies.
- Preview and customization: some embodiments may enable preview and customization of change sets (which may be, e.g., collections of changes or modifications to a codebase, configuration, or other system components, typically grouped together for version control or deployment purposes).
- Single-button deployment: some embodiments may facilitate execution of deployments with a single button once changes are reviewed and approved (e.g., by a system administrator or operations officer).

Table 14.

Additional or alternative features and/or operations may be used in different embodiments.

Some embodiments may perform one or more computer tasks based on determined dependencies (such as, e.g., EASI information, application/database dependencies, and the like)—where computer tasks are included in a deployment process, the deployment process comprising one or more Jenkins workflows (or deployment workflows involving the Jenkins automation framework used for, e.g., continuous integration and continuous delivery (CI/CD) in software development).

For example, a super orchestrator according to some embodiments of the invention may perform orchestrations including or involving, e.g., SMWP deployments and/or Jenkins deployments. Additional or alternative orchestration types may be used in different embodiments. Example Jenkins deployments and flows that may be performed and/or orchestrated in some embodiments include, e.g. a CI/CD pipeline to deploy a web application, a blue-green deployment (may switch traffic between environments, e.g., to ensure zero-downtime updates), a canary deployment (may gradually rolls out new changes to a subset of users), and an infrastructure-as-code (IaC) pipeline (may provision cloud resources before deploying applications).

SMWP based deployments according to some embodiments may be initiated, e.g., from a SMWP user interface (UI). The super orchestrator may manage the deployment process, ensuring all tasks are executed/performed as per the defined strategy.

According to some embodiments of the invention, a deployment may be triggered and controlled by a Jenkins pipeline. A hook from Jenkins to SMWP may be established, for example, via a custom callback using the Ansible automation engine. All steps executed in the Jenkins pipeline may be visible to SMWP, which may provide real-time monitoring and updates. This comprehensive approach may ensure seamless automation, improved reliability, and effective management of deployment flows, whether initiated by a SMWP UI or by Jenkins pipelines.

Figure 9:
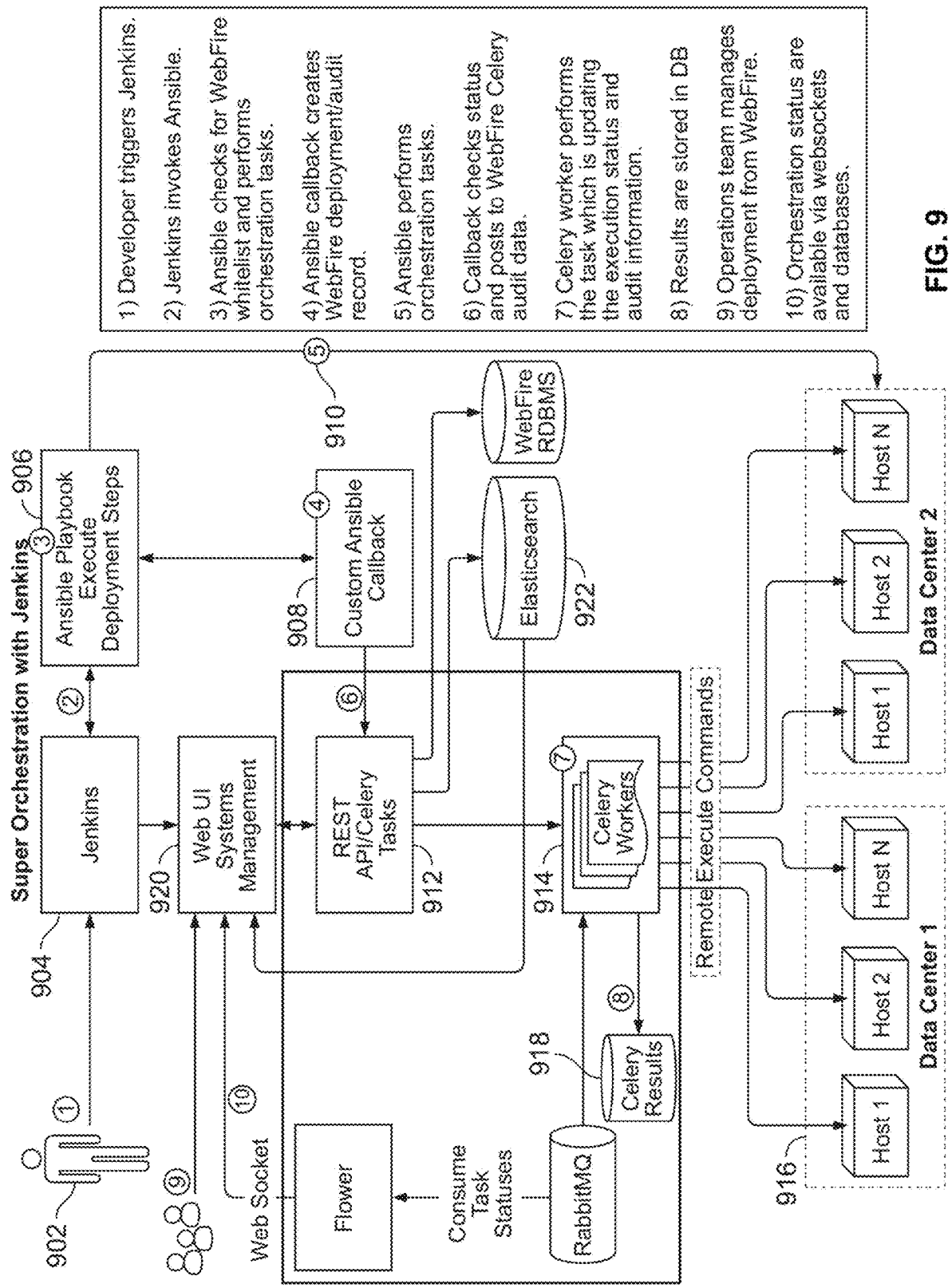
FIG. 9 shows an example super orchestration process including a Jenkins flow according to some embodiments of the invention.

FIG. 9 shows an example super orchestration process including a Jenkins flow according to some embodiments of the invention.

In some embodiments, one or more computer tasks are included in a deployment process of a software application, the deployment process comprising one or more task orchestration tools.

Some embodiments may integrate a plurality of orchestration and/or automation tools. For example, a user or developer 902 may trigger (e.g., by sending a change request) the Jenkins orchestration tool or engine 904, which may in turn invoke the Ansible automation tool or engine 906 to perform monitoring or audit tasks 908 as well as orchestration and/or automation tasks 910 (e.g., as part of deploying a computerized application). The Jenkins engine 904 and/or the Ansible engine 906 may communicate via an appropriate interface (e.g., an application programming interface (API)) with a task scheduling and execution engine or tool such as for example the Celery task scheduling tool 912, and workers (such as for example Celery workers 914) may be assigned or reassigned computerized tasks (including, e.g., a task load and a memory load) by one or more of orchestration engines or tools (such as for example the Jenkins tool or engine 904 and/or the Ansible tool or engine 906). Workers performing tasks, e.g., on hosts 916 in a given workgroup or data center, may periodically (e.g., every X seconds, e.g., X=10) send status updates and tasks execution status—as well as task outputs or results 918—which may be documented in relevant databases and/or in a search engine 922 such as for example the Elasticsearch engine. In some embodiments, computerized tasks (such as for example tasks to be executed as part of deploying a software application or program) may be requested or managed by operations personal, system administrators, or other users 902—using a dedicated user interface 920 (allowing, e.g., to monitor and/or manage computerized resources and/or computerized task execution according to EASI information or other information) which may be integrated with the various orchestration and scheduling engines within the system (e.g., using appropriate APIs) to provide, e.g., task and/or orchestration status via appropriate databases and/or WebSocket. Additional or alternative components, such as for example orchestration and/or task scheduling tools, may be used or be integrated by different embodiments.

Figure 10:
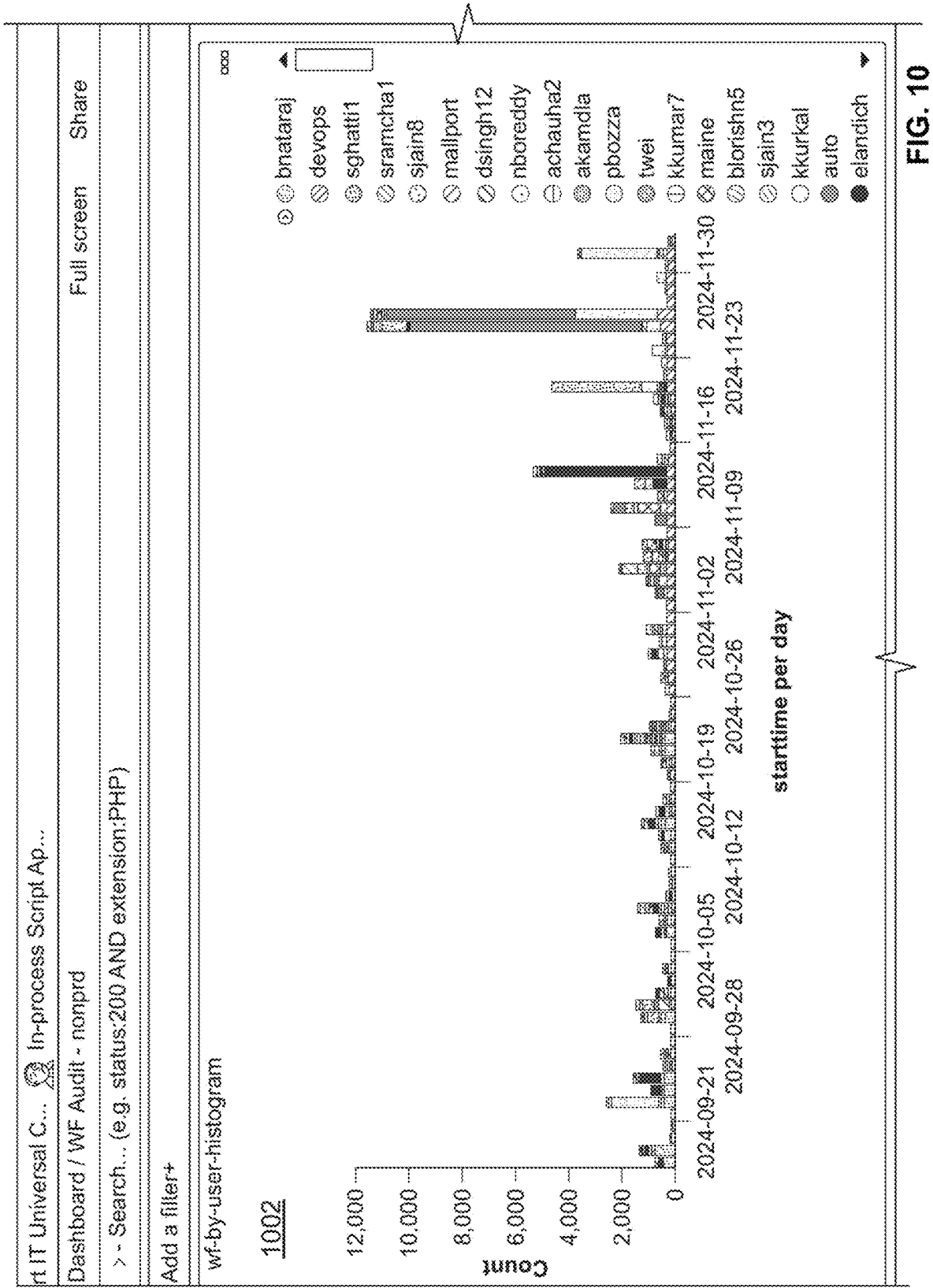
FIG. 10 shows example audit features and information displayed in a user interface according to some embodiments of the invention.
Figure 11A:
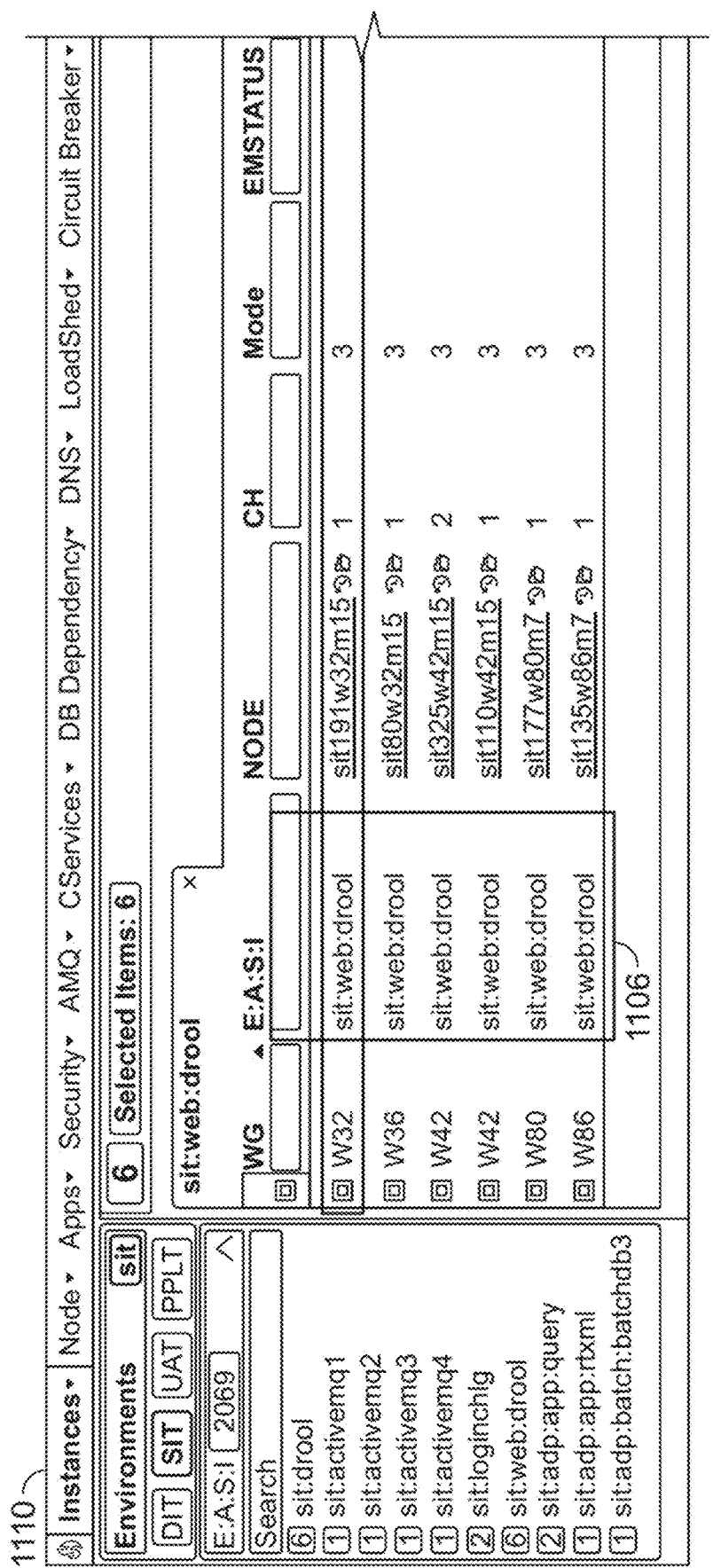
Figure 11A:
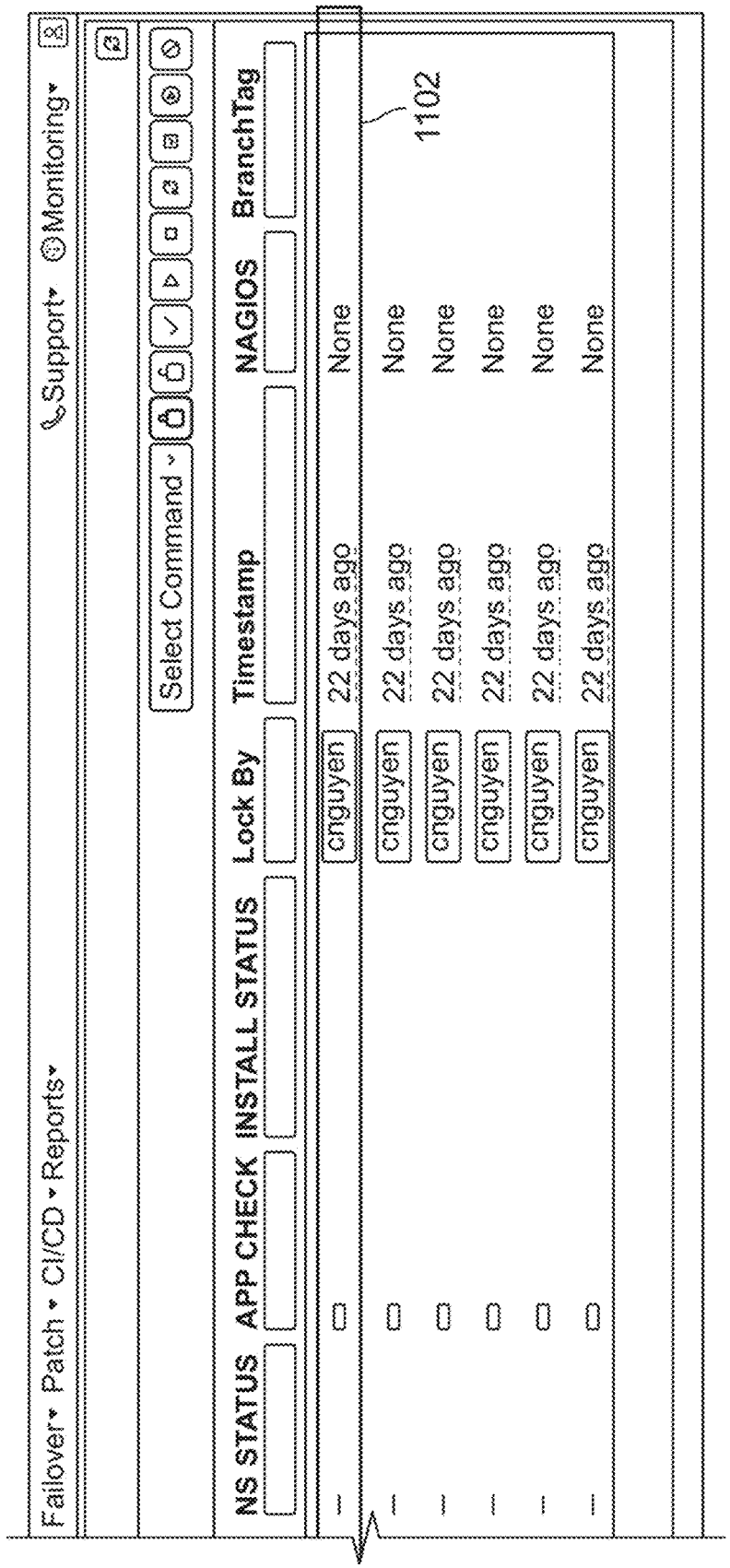
Figure 11E:
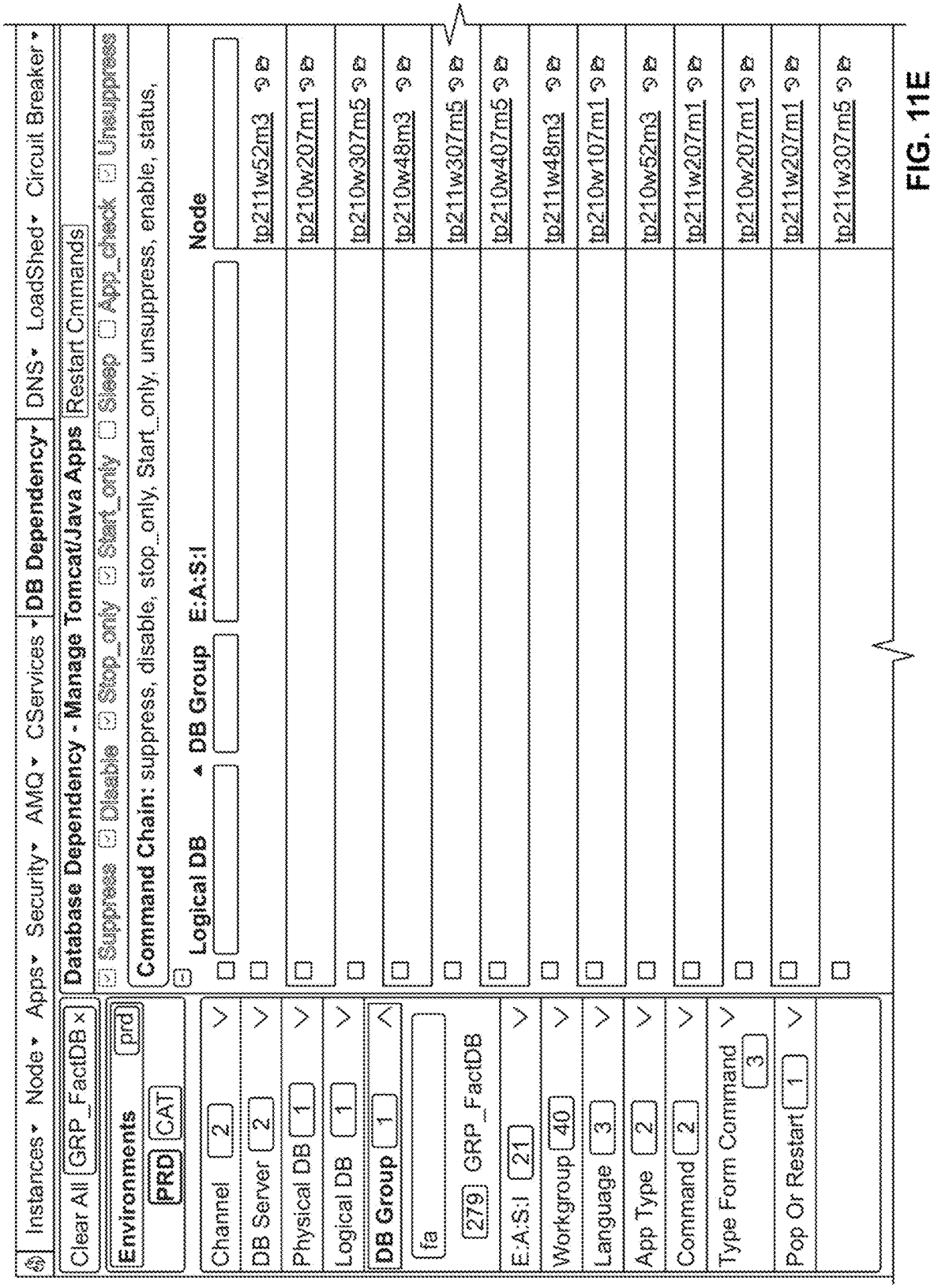
Figure 12B:
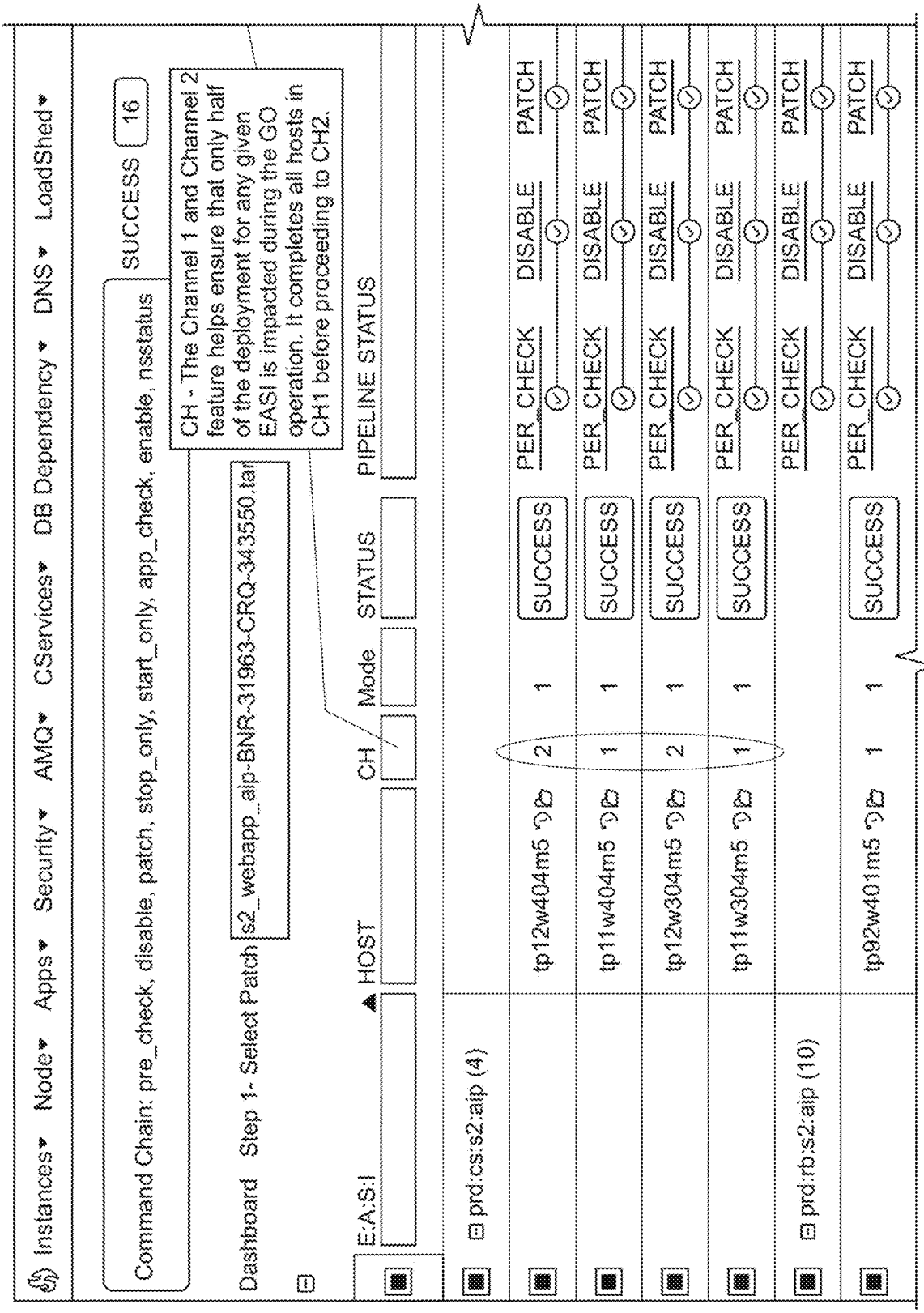
Figure 12C:
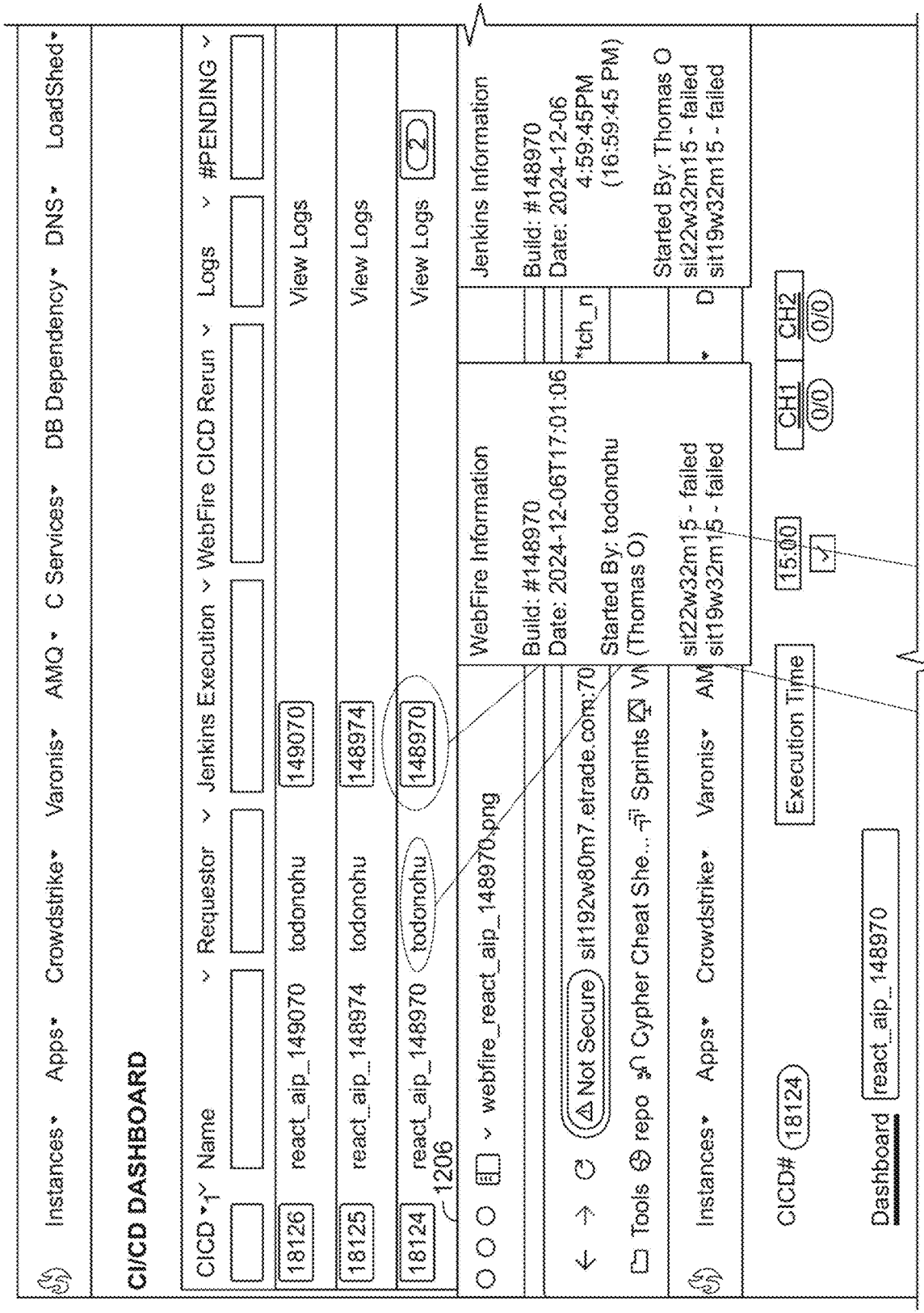
Figure 12D:
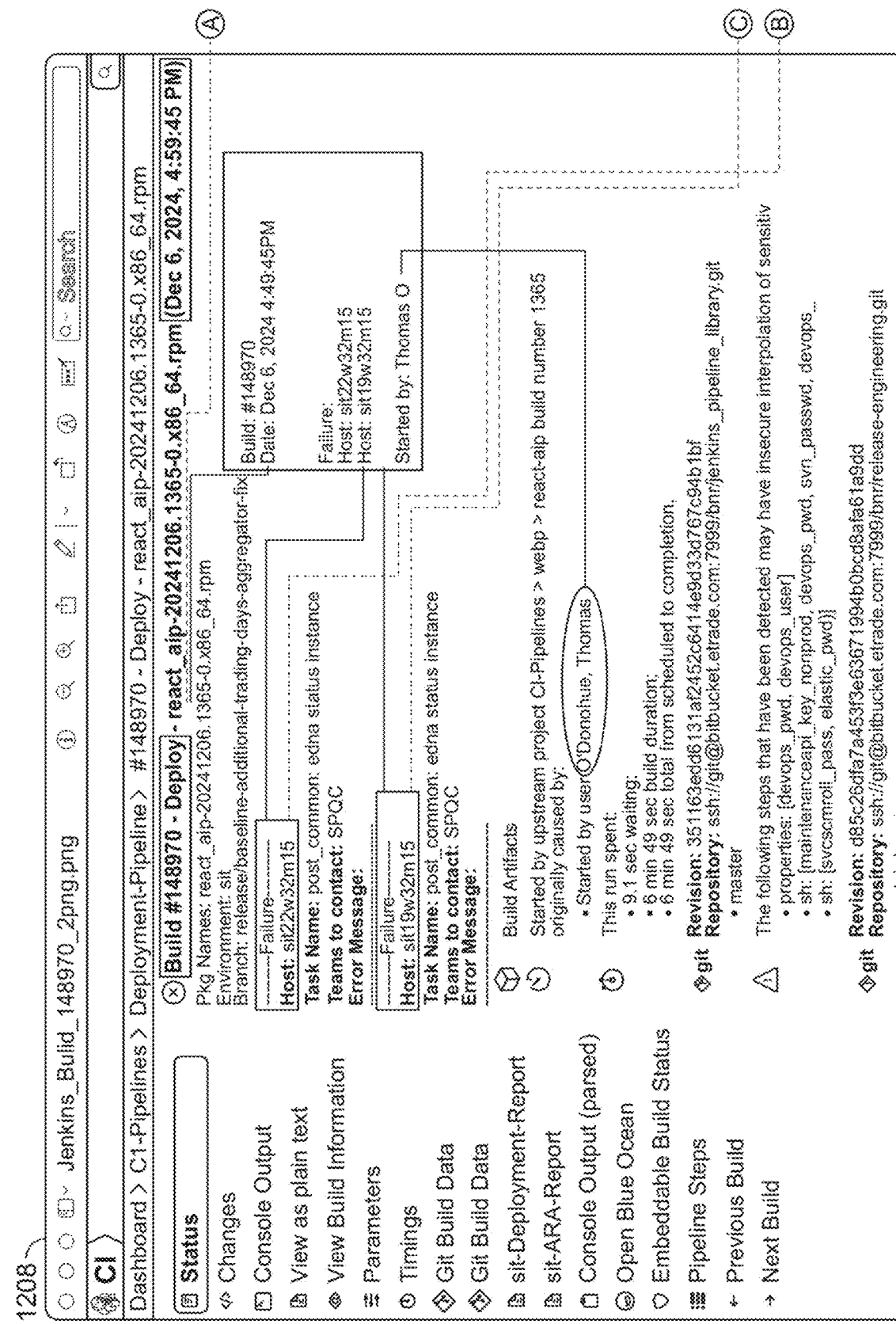
Figure 12D:
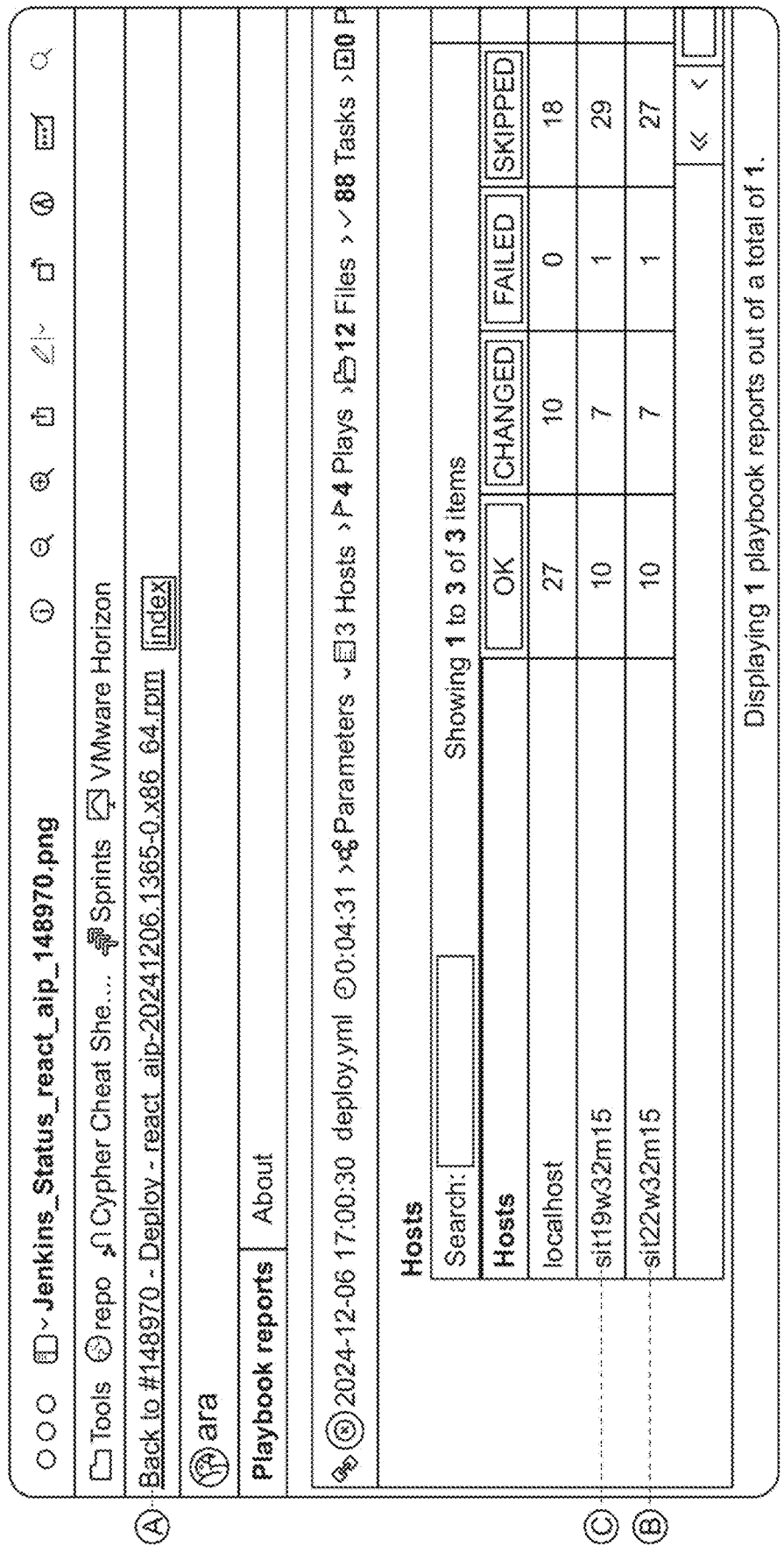

FIG. 10 shows example audit features and information displayed in a user interface according to some embodiments of the invention.

Some embodiments may include displaying a computerized task load on a graphical user interface (GUI), wherein the displayed computerized task load is associated with the plurality of keys.

In some embodiments of the invention, access control, security and audit features may for example be built into a SMWP backend, and any action or operation initiated through the web application (e.g., for a given EASI) may be captured and documented and, e.g., displayed/presented on a GUI 1002 alongside additional information (e.g., a computerized task loads for a plurality of tasks running on a given instance, EASI, or node 1004 in the cluster/cloud environment by different groups of users 1006—where the task load and relevant instance may be associated with or described by specific EASI keys 1008) in real time or near real time. For example, a Celery audit task may be invoked as part of task execution. Information captured and stored as part of auditing may include, for example: who (e.g., an identifier for a user executing an action), what (e.g., an identifier for the task or operation executed by the user), when (e.g., timestamp information), and where (e.g., location information for the user or host on which the task or operations are executed).

FIGS. 11A-E show an example user interface according to some embodiments of the invention.

Some embodiments may provide a UI for performing system management operations, allowing to manage various system components, e.g., by the relevant EASI, application, host, and database dependency.

According to some embodiments, mappings 1102, 1104 between a key or EASI 1106 (which may refer to a plurality of keys associated with or assigned to a computerized server instance or instances 1108 including one or more hosts/nodes/workers, the keys defining for example: a stage within a software development lifecycle, application information, a middleware type, and an operational capability, where each of the plurality of keys may refer to a corresponding database), host, and environment may integrated into a UI for system management, or a system management UI 1106. A status 1112 for an EASI, host, node, and the like example computer operations or actions that may be initiated or triggered using the UI, e.g., for a given EASI, host, group, or environment, may include: stop, start, status check, restart, NetScaler start, Netscaler stop, and NetScaler status (for example, the NetScaler appliance, a network optimization and application delivery controller (ADC), may be used for balancing traffic and managing network resources. The NetScaler start command may initiate the appliance, the NetScaler stop command may halt its operations, and the NetScaler status command may display or present its current operational state). According to some embodiments, various mappings, such as for example a mapping of an application, EASI, host, and environment, and/or a mapping of an EASI, host, work group, and environment may be integrated into the UI. Example operations that may be initiated or triggered using the UI include: stop, start, status, restart, NetScaler enable, Netscaler disable, and NetScaler status.

Some embodiments may perform database dependency management operations using a UI 1114. For example, a mapping 1116 of a database server, physical, logical, group, EASI, host, work_group, command, and environment may be integrated into the system management UI. According to some embodiments, database failover operations may include, for example: stop group (e.g., for a workgroup or a group of machines/server instances), start group, status group, and restart group, which may be referred to as pop operations. Some example computer operations may be performed or executed according to some embodiments, e.g., using buttons 1118.

According to some embodiments, a database failover may be handled by invoking a restart, or by restarting a machine, instance, host, and the like—for example using a dedicated UI according to some embodiments of the invention. This may be applicable, for example, to applications that do not support database failover commands. Database failover operations 1120 according to some embodiments may include, e.g.: stop, start, status, restart, NetScaler enable, Netscaler disable, and NetScaler status. Additional database failover operations may include reassigning task/memory loads between instances (e.g., between a first server instance to a second server instance).

Additional or alternative UI functionalities and operations may be used in different embodiments.

FIGS. 12A-D show an example user interface for super orchestration according to some embodiments of the invention.

In some embodiments, the executing of the one or more computer tasks (such as for example tasks reassigned from a first server instance to a second server instance) is performed based on a computerized request received in real time from a user interface (UI), the user interface displaying real time information describing one or more applications running on the computer cluster.

Some embodiments may provide a super orchestration dashboard or UI that may be used, for example, by system administrators, operations personnel, and/or other users. A super orchestrator according to some embodiments may streamline, e.g., emergency and change requests 1202 (such as for example 3-day change requests) involving for example multiple teams. It may, for example, receive, translate and/or verify change requests, map EASI entries, retrieve package information, and allow for the selection and customization of deployment strategies. In some embodiments, a Super Orchestration Dashboard may be implemented in SMWP. Additional or alternative implementations may be used in different embodiments.

In some embodiments, an orchestrator's or super orchestrator's user interface (UI) may receive change requests 1202 (e.g., from a computer system operated by a system administrator or operations users) in real time, allowing users to initiate updates or modifications to applications running on a cluster or in a computerized cluster environment directly through the interface. In some embodiments, the UI may collect and provide live data or information on the status and performance of applications, such as resource utilization, task assignments, and container health, enabling users to quickly assess the current state of the cluster and make informed decisions when submitting change requests, such as scaling applications or reassigning workloads between server instances.

In some embodiments, a super orchestration UI or dashboard may display or present information and/or allow performing operations such as for example translation and verification of, e.g., change requests (CRs) and JIRA tickets, displaying and/or editing mappings of, e.g., package_name, package_version, CR, JIRA, create_date, EASI, host, workgroup, channel, and more, which may be integrated into a System Management UI.

Some orchestration or super orchestration operations according to some embodiments may include, for example: pre-check, NetScaler disable, deploy/install, verify, stop, start, paycheck, Netscaler enable, and NetScaler status.

Additional or alternative orchestration operations may be used in different embodiments.

A GO button 1204 may be used to trigger and/or perform all operations shown in the pipeline. If all entries are selected, the GO operation may separate or segregate the execution into two batches: all entries in batch or channel 1 (CH1) may be executed first, and once successfully completed, some embodiments may start the execution for batch or channel 2 (CH2). Additionally, if an operation in CH1 fails, some embodiments may not proceed to perform operations on CH2. This may serve as a safety feature, e.g., to ensure that only part of the deployment for any given EASI is impacted by a failed execution of an operation or operations.

Some embodiments may perform super orchestration capabilities using a Jenkins and SMWP Integration. Some example embodiments may relate to deployments performed using the Jenkins automation framework. An integration of the Jenkins framework with SMWP may allow managing different deployments using a single process and framework. According to some embodiments, the integration may be achieved using a custom Ansible callback which may, e.g., capture the status for each Jenkins deployment step and may send information to SMWP Celery task.

A SMWP super orchestration dashboard 1206 may show or display or present all whitelisted Jenkins deployments, for example in near real-time. For each deployment run, users may view the execution status of the pipeline, as well as manage it from SMWP.

Window 1208 shows an Jenkins job #148970 triggered by user Thomas O on Dec. 6, 2024, at 16:59:45. The SMWP dashboard may shows the same build number 148970, requested by todonohu, which may be Thomas O's username. The timestamp on the SMWP dashboard may show Dec. 6, 2024, at 17:05:03, indicating it took about 5 minutes for job 148970 to complete.

The SMWP pipeline may provide the status for each step for all the hosts that are part of the orchestration. The orchestration status of job 148970, for example, shows 2 failures: sit19w32m15 and sit22w32m15, which may for example be correlated with information shown on the Jenkins site. Users may view and may execute any necessary commands to complete the orchestration if needed.

Figure 13:
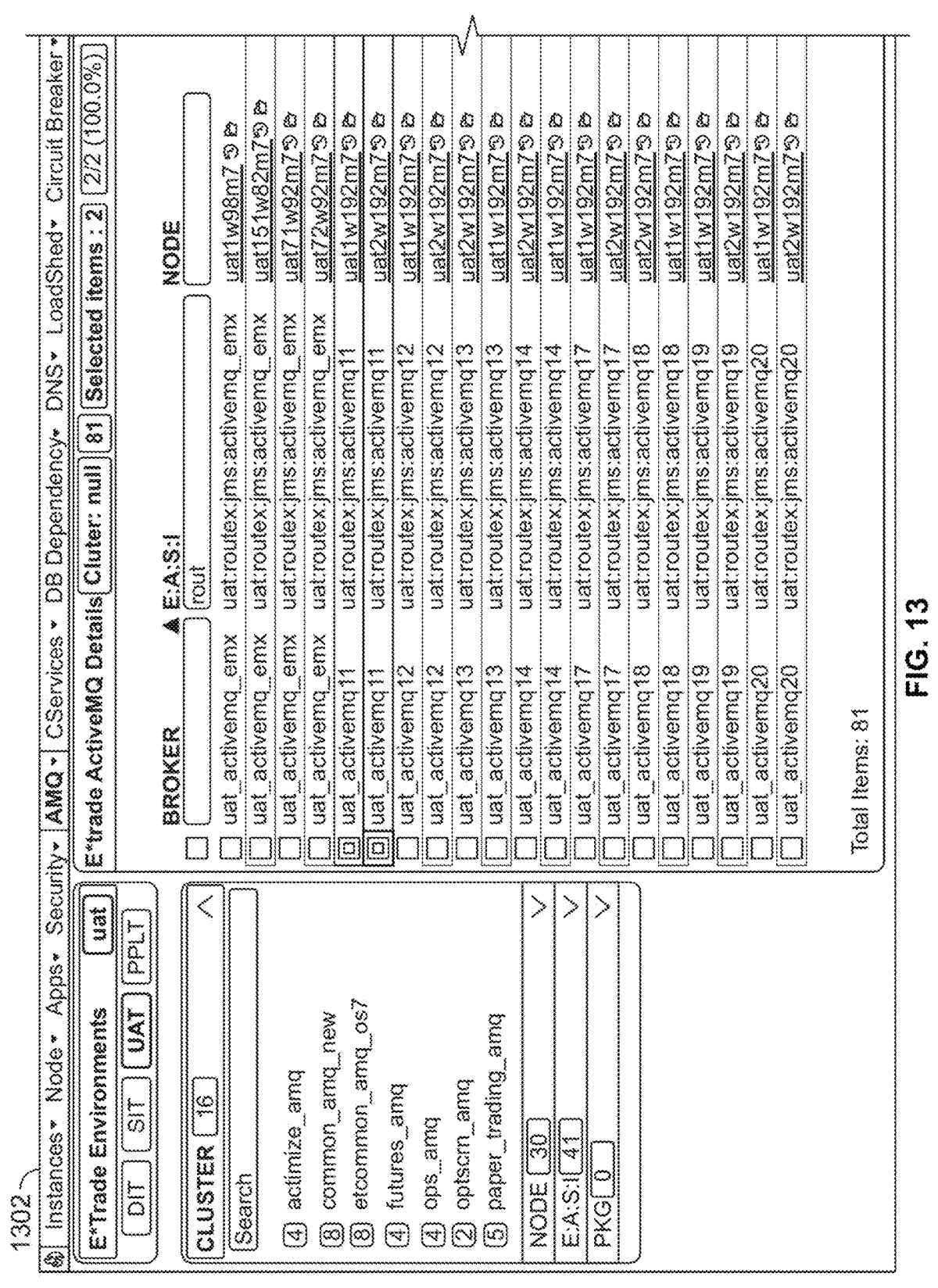
Figure 13:
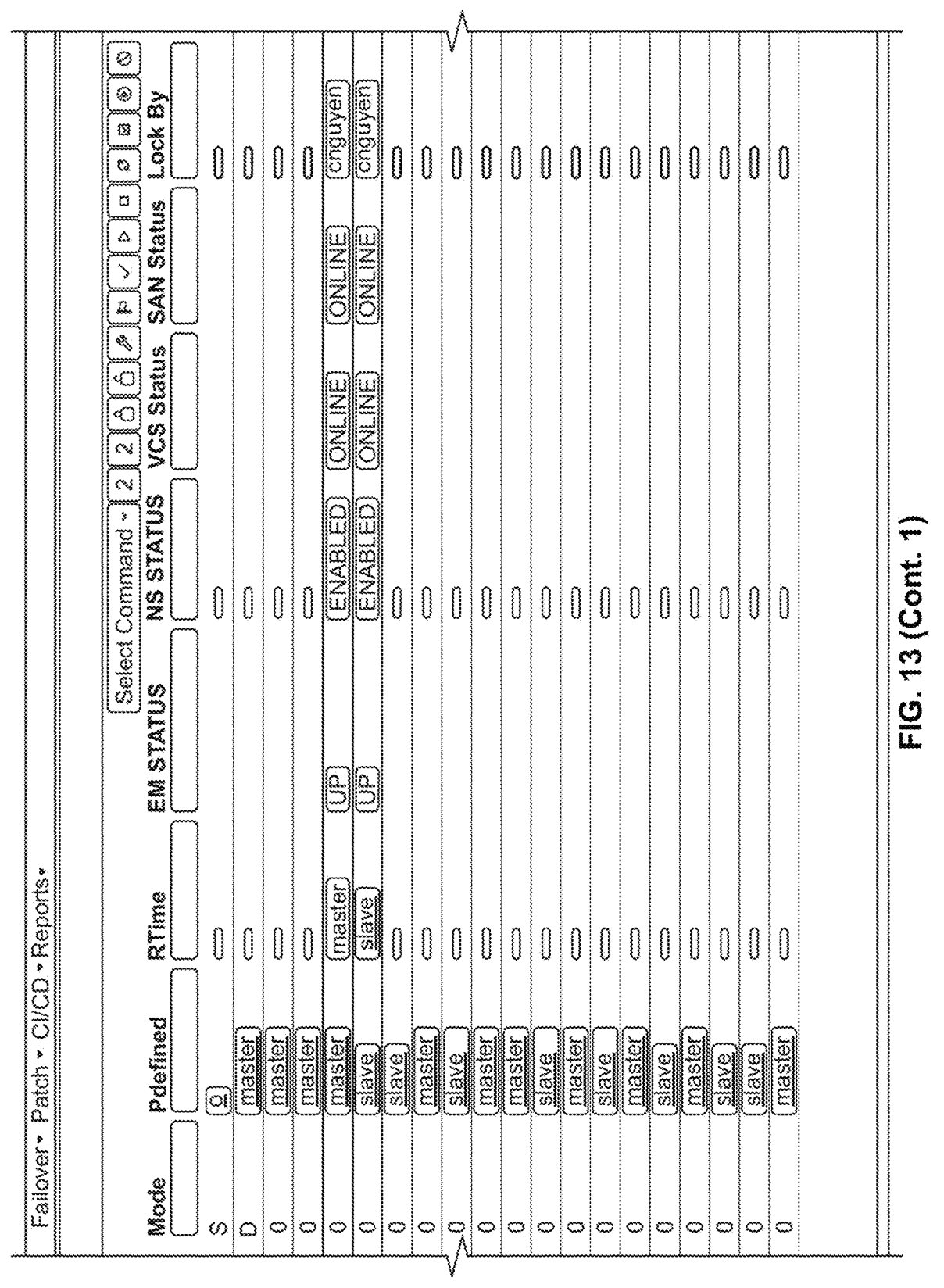

FIG. 13 shows an example user interface for message queue management according to some embodiments of the invention.

In some embodiments, mappings of, e.g., cluster, EASI, host, master_or_slave, admin_port, stomp_port, openwire_port, and environment may be integrated into a UI such as for example a system management GUI.

Message queue (such as for example the ActiveMQ message queue) management operations according to some embodiments may include, e.g.: stop, start, status, restart, Netscaler enable, Netscaler disable, Netscaler status, VCS cluster status, VCS online, and VCS offline. Some embodiments may include additional or alternative features such as for example hyperlinks to an ActiveMQ admin console, and more.

A cluster management view 1302 may provide users with the capability to manage by cluster. Some embodiments may collect and display or present information about relationships between instances, hosts or machines, such as for example information about a host being a master and slave or a different host or machine. A status for a given instance or host may include multiple fields or sub-statuses such as for example: instance status, master or slave, VCS online or offline, and more.

Figure 14:
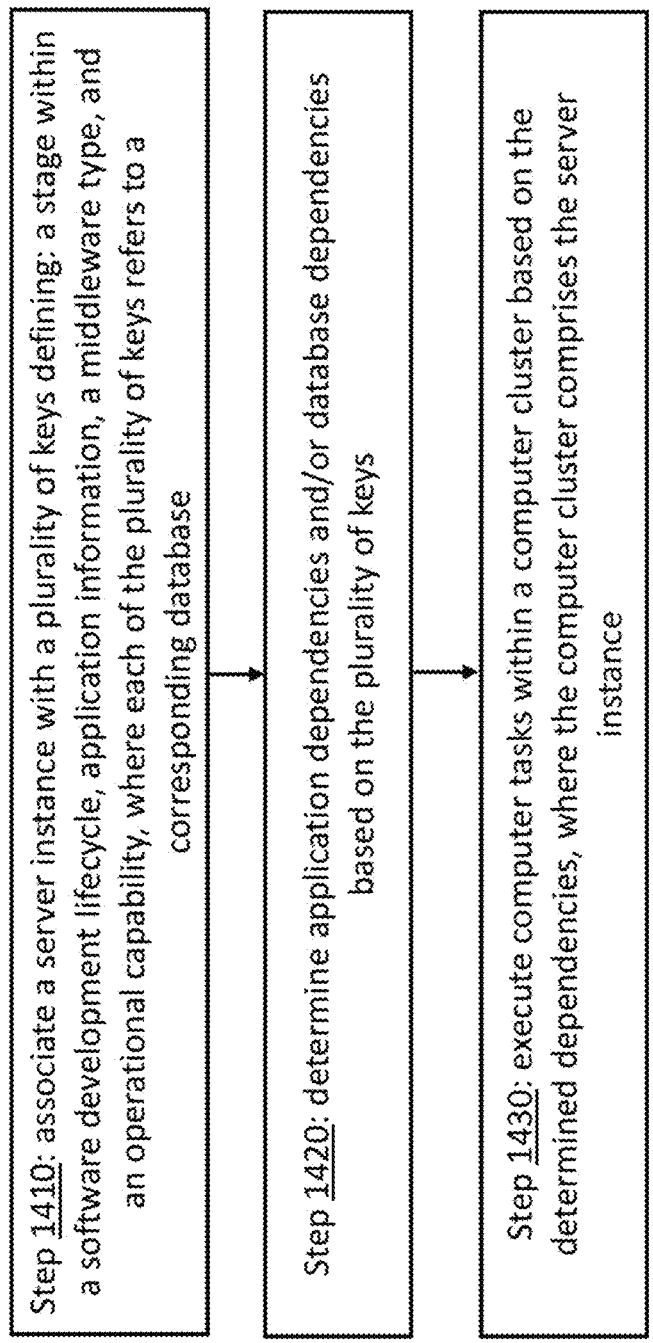
FIG. 14 shows an example process for managing computer resources according to some embodiments of the invention.

FIG. 14 shows an example process for managing computer resources according to some embodiments of the invention.

Some embodiments may associate a server instance (such as for example a virtual or physical machine, or a plurality of such, within a computer cluster or cloud environment) with a plurality of keys—such as for example EASI keys or information—where each of the plurality of keys defines one or more of: a stage within a software development lifecycle, application information, a middleware type, and an operational capability (operation 1410). According to some embodiments, each of the plurality of keys (e.g., in an EASI defining or associated with a server instance) may refer to a corresponding database in system's memory. Some embodiments may determine application dependencies and/or database dependencies based on one or more of the plurality of keys (e.g., dependency information may be determined according to or using EASI information, which may be used to enrich raw data and may be integrated into corresponding databases or search engines such as, e.g., Elasticsearch; operation 1420). Some embodiments may execute computer tasks within a computer cluster (such as, e.g., apply patches and deploy software applications and/or artifact to various environments, and/or execute change requests, and/or perform database failover management operations) based on the determined dependencies, wherein the computer cluster comprises the first server instance, or the server instance associated with EASI keys (operation 1430). Additional or alternative operations may be performed in different embodiments.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computerized method of managing computer resources, the method comprising, using one or more computer processors:
   associating a first server instance with a plurality of keys, each of the plurality of keys defining one or more of: a stage within a software development lifecycle, application information, a middleware type, and an operational capability, wherein each of the plurality of keys refers to a corresponding database;
   determining one or more of: application dependencies and database dependencies, the determining based on one or more of the plurality of keys; and
   executing one or more computer tasks within a computer cluster based on the one or more determined dependencies, wherein the computer cluster comprises the first server instance, wherein the computer cluster comprises a second server instance, and wherein the executing of the one or more computer tasks comprises reassigning one or more of the computer tasks from the first server instance to the second server instance based on: one or more of the determined dependencies, and a second plurality of keys, wherein the second plurality of keys is associated with the second server instance.

2. The method of claim 1, wherein the first server instance is associated with a first hardware host, and wherein the second server instance is associated with a second hardware host.

3. The method of claim 1, wherein the executing of the one or more computer tasks is performed based on a computerized request received in real time from a user interface (UI), the user interface displaying real time information describing one or more tasks running on the computer cluster.

4. The method of claim 1, wherein the reassigning one or more of the computer tasks reduces one or more of: a computerized task load, and a memory load from the first server instance.

5. The method of claim 1, comprising displaying a computerized task load on a graphical user interface (GUI), wherein the displayed computerized task load is associated with the plurality of keys.

6. The method of claim 1, wherein the one or more computer tasks are included in a deployment process of a software application, the deployment process comprising one or more task orchestration tools.

7. A computerized system for managing computerized resources, the system comprising:
   a memory; and
   one or more computer processors configured to:
      associate a first server instance with a plurality of keys, each of the plurality of keys defining one or more of: a stage within a software development lifecycle, application information, a middleware type, and an operational capability, wherein each of the plurality of keys refers to a corresponding database;
      determine one or more of: application dependencies and database dependencies, the determining based on one or more of the plurality of keys; and
      execute one or more computer tasks within a computer cluster based on the one or more determined dependencies, wherein the computer cluster comprises the first server instance, wherein the computer cluster comprises a second server instance, and wherein the executing of the one or more computer tasks comprises reassigning one or more of the computer tasks from the first server instance to a second server instance based on: one or more of the determined dependencies, and a second plurality of keys, wherein the second plurality of keys is associated with the second server instance.

8. The system of claim 7, wherein the first server instance is associated with a first hardware host, and wherein the second server instance is associated with a second hardware host.

9. The system of claim 7, wherein the executing of the one or more computer tasks is performed based on a computerized request received in real time from a user interface (UI), the user interface displaying real time information describing one or more tasks running on the computer cluster.

10. The system of claim 7, wherein the reassigning one or more of the computer tasks reduces one or more of: a computerized task load, and a memory load from the first server instance.

11. The system of claim 7, wherein one or more of the processors are to display a computerized task load on a graphical user interface (GUI), wherein the displayed computerized task load is associated with the plurality of keys.

12. The system of claim 7, wherein the one or more computer tasks are included in a deployment process of a software application, the deployment process comprising one or more task orchestration tools.

13. A computerized method of managing computer systems in a cloud environment, the method comprising, using one or more computer processors:
   assigning a plurality of keys to a first computerized instance, each of the plurality of keys defining one or more of: a stage within a development lifecycle, application information, a middleware type, and an operational functionality, wherein each of the plurality of keys refers to a corresponding repository;
   discovering one or more of: application dependencies and repository dependencies, the discovering based on one or more of the plurality of keys; and
   performing one or more computer tasks within a computerized cloud environment based on the one or more discovered dependencies, wherein the computerized cloud environment comprises the first computerized instance, wherein the computerized cloud environment comprises a second computerized instance, and wherein the performing of the one or more computer tasks comprises offloading one or more of the computer tasks from the first server instance to the second computerized instance based on: one or more of the discovered dependencies, and a second plurality of keys, wherein the second plurality of keys is associated with the second computerized instance.

14. The method of claim 13, wherein the first computerized instance is associated with a first hardware system, and wherein the second computerized instance is associated with a second hardware system.

15. The method of claim 13, wherein the performing of the one or more computer tasks is performed based on a command received in real time from a graphical user interface (UI), the user interface presenting real time information describing one or more computer tasks running in the computerized cloud environment.

16. The method of claim 13, wherein the offloading of the one or more of the computer tasks reduces one or more of: a computerized task load, and a memory load from the first computerized instance.

17. The method of claim 13, comprising presenting a task load on a graphical user interface (GUI), wherein the presented task load is associated with the plurality of keys.

* * * * *